United States Patent
Cui et al.

(10) Patent No.: US 12,522,756 B2
(45) Date of Patent: *Jan. 13, 2026

(54) ADHESIVE COMPOSITION AND METHODS OF FORMING THE SAME

(71) Applicant: SAINT-GOBAIN PERFORMANCE PLASTICS CORPORATION, Solon, OH (US)

(72) Inventors: Yubo Cui, Shrewsbury, MA (US); Thomas L. Adams, Gardner, MA (US); David A. Elliott, Queensbury, NY (US); James N. Gordon, Waban, MA (US)

(73) Assignee: SAINT-GOBAIN PERFORMANCE PLASTICS CORPORATION, Malvern, PA (US)

(*) Notice: Subject to any disclaimer, the term of this patent is extended or adjusted under 35 U.S.C. 154(b) by 178 days.

This patent is subject to a terminal disclaimer.

(21) Appl. No.: 16/720,158

(22) Filed: Dec. 19, 2019

(65) Prior Publication Data

US 2020/0208025 A1 Jul. 2, 2020

Related U.S. Application Data

(60) Provisional application No. 62/786,025, filed on Dec. 28, 2018.

(51) Int. Cl.
| | | |
|---|---|---|
| *C08K 5/01* | (2006.01) | |
| *C09J 7/38* | (2018.01) | |
| *C09J 133/08* | (2006.01) | |
| C08F 220/06 | (2006.01) | |
| C08F 220/18 | (2006.01) | |
| C08F 220/20 | (2006.01) | |
| C08F 226/06 | (2006.01) | |
| C08F 236/20 | (2006.01) | |
| C08F 236/22 | (2006.01) | |
| C08K 5/132 | (2006.01) | |
| C08K 5/37 | (2006.01) | |
| C08K 7/28 | (2006.01) | |

(52) U.S. Cl.
CPC ............... *C09J 133/08* (2013.01); *C08K 5/01* (2013.01); *C09J 7/38* (2018.01); *C08F 220/06* (2013.01); *C08F 220/1808* (2020.02); *C08F 220/1811* (2020.02); *C08F 220/20* (2013.01); *C08F 226/06* (2013.01); *C08F 236/20* (2013.01); *C08F 236/22* (2013.01); *C08K 5/132* (2013.01); *C08K 5/37* (2013.01); *C08K 7/28* (2013.01); *C09J 2203/00* (2013.01); *C09J 2400/14* (2013.01); *C09J 2400/22* (2013.01); *C09J 2423/106* (2013.01); *C09J 2423/166* (2013.01)

(58) Field of Classification Search
CPC ........ C09J 133/08; C09J 7/38; C09J 2400/14; C09J 2400/22; C09J 2423/106; C09J 2423/166; C09J 2203/00; C08K 5/01; C08K 5/37; C08K 5/132; C08K 7/28; C08F 220/1808; C08F 220/1811; C08F 220/20; C08F 226/06; C08F 236/20; C08F 236/22; C08F 220/06; C08F 220/18; C08F 265/06
USPC .................................................... 525/228
See application file for complete search history.

(56) References Cited

U.S. PATENT DOCUMENTS

| | | |
|---|---|---|
| 3,492,276 A | 1/1970 | Smith |
| 3,806,484 A | 4/1974 | Dargan |
| 4,117,235 A | 9/1978 | Taylor |
| 4,414,370 A | 11/1983 | Hamielec et al. |
| 4,546,160 A | 10/1985 | Brand et al. |
| 4,726,982 A | 2/1988 | Traynor et al. |
| 5,006,582 A | 4/1991 | Mancinelli |
| 5,225,470 A | 7/1993 | Mancinelli |
| 5,410,004 A | 4/1995 | Williams |
| 5,434,213 A | 7/1995 | Chen et al. |
| 5,578,683 A | 11/1996 | Koch et al. |
| 5,602,220 A | 2/1997 | Haddleston et al. |
| 5,625,005 A | 4/1997 | Mallya et al. |
| 5,644,007 A | 7/1997 | Davidson et al. |

(Continued)

FOREIGN PATENT DOCUMENTS

| | | |
|---|---|---|
| AU | 472990 B2 | 9/1973 |
| AU | 2012322689 A1 | 5/2014 |

(Continued)

OTHER PUBLICATIONS

Heuts et al., Catalytic Chain Transfer Polymerization: An Overview, Australian Journal of Chemistry, 55, 6-7 SPEC., 381-398, 2002. (Abstract only).

(Continued)

Primary Examiner — Robert S Jones, Jr.
(74) Attorney, Agent, or Firm — Abel Schillinger, LLP; Chi Suk Kim

(57) ABSTRACT

An adhesive composition may include at least about 2 wt. % and not greater than 49 wt. % of a (meth)acrylic based polymeric component A for a total weight of the adhesive composition, at least about 51 wt. % of a (meth)acrylic based polymeric component B for a total weight of the adhesive composition, and at least about 0.1 wt. % and not greater than about 30 wt. % of a tackifier component for a total weight of the adhesive composition. The (meth)acrylic based polymeric component A may have a glass transition temperature (Tg) of at least about 40° C. The (meth)acrylic based polymeric component B may have a glass transition temperature (Tg) of not greater than about 20° C. Further, the (meth)acrylic based polymeric component B may be acid-free.

9 Claims, 4 Drawing Sheets

(56) References Cited

U.S. PATENT DOCUMENTS

| | | |
|---|---|---|
| 5,648,425 A | 7/1997 | Everaerts et al. |
| 5,679,457 A | 10/1997 | Bergerson |
| 5,686,504 A | 11/1997 | Ang |
| 5,691,432 A | 11/1997 | Williams |
| 5,703,169 A | 12/1997 | Zajaczkowski et al. |
| 5,710,227 A | 1/1998 | Freeman et al. |
| 5,731,387 A | 3/1998 | Zajaczkowski |
| 5,756,605 A | 5/1998 | Moad et al. |
| 5,804,610 A | 9/1998 | Hamer et al. |
| 5,804,632 A | 9/1998 | Haddleton et al. |
| 5,840,783 A | 11/1998 | Momchilovich et al. |
| 5,936,026 A | 8/1999 | Huybrechts et al. |
| 5,981,666 A | 11/1999 | Zajaczkowski et al. |
| 6,096,420 A | 8/2000 | Wilhoit et al. |
| 6,111,027 A | 8/2000 | Wright et al. |
| 6,172,149 B1 | 1/2001 | Shah et al. |
| 6,294,591 B1 | 9/2001 | Blum et al. |
| 6,329,068 B1 | 12/2001 | Shah et al. |
| 6,348,249 B2 | 2/2002 | Meyer |
| 6,376,626 B1 | 4/2002 | Chiefari et al. |
| 6,379,791 B1 | 4/2002 | Cernohous et al. |
| 6,388,006 B1 | 5/2002 | Fujita et al. |
| 6,388,026 B1 | 5/2002 | Campbell et al. |
| 6,407,146 B1 | 6/2002 | Fujita et al. |
| 6,417,267 B1 | 7/2002 | Stockl et al. |
| 6,437,033 B1 | 8/2002 | Shah et al. |
| 6,455,634 B1 | 9/2002 | Khandpur et al. |
| 6,489,400 B2 | 12/2002 | Khandpur et al. |
| 6,503,621 B1 | 1/2003 | Ma et al. |
| 6,552,118 B2 | 4/2003 | Fujita et al. |
| 6,552,144 B1 | 4/2003 | Campbell et al. |
| 6,589,651 B2 | 7/2003 | Carlson et al. |
| 6,605,681 B1 | 8/2003 | Villalobos et al. |
| 6,608,143 B1 | 8/2003 | Fukuoka et al. |
| 6,630,239 B2 | 10/2003 | Cernohous et al. |
| 6,652,963 B1 | 11/2003 | Husemann et al. |
| 6,657,011 B2 | 12/2003 | Lau et al. |
| 6,663,958 B2 | 12/2003 | Husemann et al. |
| 6,670,417 B2 | 12/2003 | Foreman et al. |
| 6,723,786 B2 | 4/2004 | Husemann et al. |
| 6,753,079 B2 | 6/2004 | Husemann et al. |
| 6,783,850 B2 | 8/2004 | Takizawa et al. |
| 6,784,240 B2 | 8/2004 | Hasegawa et al. |
| 6,828,019 B2 | 12/2004 | Kong et al. |
| 6,887,917 B2 | 5/2005 | Yang et al. |
| 6,939,911 B2 | 9/2005 | Tosaki et al. |
| 6,964,999 B1 | 11/2005 | Nakagawa et al. |
| 6,994,904 B2 | 2/2006 | Joseph et al. |
| 7,012,114 B2 | 3/2006 | Bett et al. |
| 7,129,294 B2 | 10/2006 | Nakagawa et al. |
| 7,262,242 B2 | 8/2007 | Gielens et al. |
| 7,348,376 B2 | 3/2008 | Gelles |
| 7,462,663 B2 | 12/2008 | Kim et al. |
| 7,465,767 B2 | 12/2008 | Simal et al. |
| 7,491,758 B2 | 2/2009 | Amano et al. |
| 7,649,066 B2 | 1/2010 | Magnet et al. |
| 7,655,285 B2 | 2/2010 | Cho et al. |
| 7,671,134 B2 | 3/2010 | Casper |
| 7,691,925 B2 | 4/2010 | Amano et al. |
| 7,696,278 B2 | 4/2010 | Kim et al. |
| 7,799,853 B2 | 9/2010 | Ukei et al. |
| 7,834,104 B2 | 11/2010 | Nakamura et al. |
| 7,927,703 B2 | 4/2011 | Xia et al. |
| 7,989,525 B2 | 8/2011 | Amano et al. |
| 8,013,085 B2 | 9/2011 | Schmid et al. |
| 8,034,879 B2 | 10/2011 | Balk et al. |
| 8,101,276 B2 | 1/2012 | Paul et al. |
| 8,163,833 B2 | 4/2012 | Moeller et al. |
| 8,318,852 B2 | 11/2012 | Kim et al. |
| 8,318,859 B2 | 11/2012 | Amano et al. |
| 8,333,865 B2 | 12/2012 | Husemann et al. |
| 8,404,344 B2 | 3/2013 | Ukei et al. |
| 8,410,218 B2 | 4/2013 | Abe et al. |
| 8,440,304 B2 | 5/2013 | Paul et al. |
| 8,557,378 B2 | 10/2013 | Yamanaka et al. |
| 8,710,139 B2 * | 4/2014 | Shigetomi .............. C09J 133/10 |
| | | 428/354 |
| 8,791,207 B2 | 7/2014 | Steelman et al. |
| 8,802,785 B2 | 8/2014 | Kautz et al. |
| 8,816,011 B2 | 8/2014 | Kautz et al. |
| 8,829,117 B2 | 9/2014 | Balk et al. |
| 8,846,833 B2 | 9/2014 | Prenzel |
| 8,895,669 B2 | 11/2014 | Balk et al. |
| 8,969,495 B2 | 3/2015 | Hustad et al. |
| 9,006,362 B2 | 4/2015 | Zhu et al. |
| 9,011,995 B2 | 4/2015 | Park et al. |
| 9,238,762 B2 | 1/2016 | Schaffer et al. |
| 9,290,682 B2 | 3/2016 | Chen et al. |
| 9,359,531 B2 | 6/2016 | Sherman et al. |
| 9,410,028 B2 | 8/2016 | Prenzel et al. |
| 9,540,458 B2 | 1/2017 | Prenzel |
| 9,605,189 B2 | 3/2017 | Hirose et al. |
| 9,701,875 B1 | 7/2017 | Yarusso et al. |
| 9,938,433 B2 | 4/2018 | Kim et al. |
| 10,144,854 B2 | 12/2018 | Yoon et al. |
| 10,544,295 B2 | 1/2020 | Heemann et al. |
| 11,685,823 B2 * | 6/2023 | Person .................. C03C 25/285 |
| | | 428/34.1 |
| 12,258,495 B2 | 3/2025 | Chan et al. |
| 2001/0025083 A1 * | 9/2001 | Stark ..................... C09J 201/06 |
| | | 428/514 |
| 2002/0026020 A1 | 2/2002 | Campbell et al. |
| 2003/0114580 A1 | 6/2003 | Kim et al. |
| 2004/0010091 A1 | 1/2004 | Paquet, Jr. et al. |
| 2004/0022693 A1 | 2/2004 | Grady |
| 2004/0071919 A1 | 4/2004 | Sakurai et al. |
| 2004/0127638 A1 | 7/2004 | Mathew et al. |
| 2004/0210019 A1 | 10/2004 | Hasegawa et al. |
| 2005/0003094 A1 | 1/2005 | Grady et al. |
| 2005/0158475 A1 | 7/2005 | Bell et al. |
| 2005/0192394 A1 | 9/2005 | Jung et al. |
| 2005/0217789 A1 | 10/2005 | Eckstein et al. |
| 2005/0250887 A1 | 11/2005 | Yang et al. |
| 2006/0052563 A1 | 3/2006 | Nakagawa et al. |
| 2006/0057366 A1 | 3/2006 | Husemann et al. |
| 2006/0154097 A1 | 7/2006 | Amano et al. |
| 2007/0092733 A1 | 4/2007 | Yang et al. |
| 2007/0106011 A1 | 5/2007 | Husemann et al. |
| 2007/0128260 A1 | 6/2007 | Lau et al. |
| 2008/0176086 A1 | 7/2008 | Irifune |
| 2009/0082488 A1 | 3/2009 | Takeda et al. |
| 2009/0198016 A1 | 8/2009 | Sormani et al. |
| 2009/0234072 A1 | 9/2009 | Nakagawa et al. |
| 2010/0025083 A1 * | 2/2010 | Yang ..................... H05K 1/028 |
| | | 174/254 |
| 2010/0075129 A1 * | 3/2010 | Nagasaki ................. C09J 5/06 |
| | | 428/313.3 |
| 2010/0101723 A1 | 4/2010 | Okamoto et al. |
| 2010/0120931 A1 | 5/2010 | Zajaczkowski et al. |
| 2010/0266837 A1 | 10/2010 | Srivatsan et al. |
| 2010/0285244 A1 | 11/2010 | Kho |
| 2011/0118372 A1 | 5/2011 | Lester et al. |
| 2011/0177329 A1 | 7/2011 | Xia et al. |
| 2011/0213091 A1 | 9/2011 | Balk et al. |
| 2011/0269913 A1 | 11/2011 | Balk et al. |
| 2013/0004768 A1 | 1/2013 | Yamagata et al. |
| 2013/0011672 A1 | 1/2013 | Okamoto et al. |
| 2013/0172511 A1 | 7/2013 | Moeller et al. |
| 2013/0177758 A1 | 7/2013 | Shigetomi et al. |
| 2013/0184383 A1 | 7/2013 | Cochran et al. |
| 2013/0197156 A1 | 8/2013 | Palasz et al. |
| 2014/0044959 A1 | 2/2014 | Joo et al. |
| 2014/0057091 A1 | 2/2014 | Krawinkel et al. |
| 2014/0323604 A1 | 10/2014 | Burmeister et al. |
| 2014/0329960 A1 | 11/2014 | Klots et al. |
| 2014/0329971 A1 | 11/2014 | Prenzel |
| 2015/0044457 A1 * | 2/2015 | Chen ...................... C09J 133/08 |
| | | 526/309 |
| 2015/0322296 A1 | 11/2015 | Keite-Telgenbuscher et al. |
| 2016/0083629 A1 * | 3/2016 | Wang ..................... C09J 133/08 |
| | | 522/74 |
| 2016/0096980 A1 | 4/2016 | Wieneke et al. |
| 2016/0319169 A1 | 11/2016 | Gower et al. |
| 2017/0002236 A1 | 1/2017 | Papenbroock et al. |

(56) References Cited

U.S. PATENT DOCUMENTS

| | | | |
|---|---|---|---|
| 2017/0029548 A1 | 2/2017 | Kawai et al. | |
| 2017/0198169 A1 | 7/2017 | Dimmer | |
| 2017/0283670 A1* | 10/2017 | Yarusso | C08F 290/046 |
| 2019/0352544 A1* | 11/2019 | Lin | C09J 7/385 |
| 2020/0208024 A1 | 7/2020 | Chan et al. | |
| 2020/0208027 A1 | 7/2020 | Chan et al. | |
| 2025/0188326 A1 | 6/2025 | Chan et al. | |

FOREIGN PATENT DOCUMENTS

| | | |
|---|---|---|
| CA | 1185399 A | 4/1985 |
| CA | 2321784 A1 | 9/1999 |
| CN | 1434844 A | 8/2003 |
| CN | 1141326 C | 3/2004 |
| CN | 1572852 A | 2/2005 |
| CN | 1260316 C | 6/2006 |
| CN | 101535436 A | 9/2009 |
| CN | 103097483 A | 5/2013 |
| CN | 103396741 A | 11/2013 |
| CN | 103524966 B | 1/2014 |
| CN | 104262948 A | 1/2015 |
| CN | 105229103 A | 1/2016 |
| DE | 102012208597.00 A1 | 11/2013 |
| EP | 1433799 A3 | 6/2004 |
| EP | 1491604 A1 | 12/2004 |
| EP | 1686143 A3 | 8/2006 |
| EP | 1319053 B1 | 12/2007 |
| EP | 2268758 B1 | 12/2013 |
| EP | 02676975 A2 | 12/2013 |
| JP | S63072532 A | 4/1988 |
| JP | H02202571 A | 8/1990 |
| JP | H05017726 A | 1/1993 |
| JP | 2510627 B2 | 6/1996 |
| JP | H09505103 A | 5/1997 |
| JP | 3045673 A | 5/2000 |
| JP | 2000198853 A | 7/2000 |
| JP | 2002194175 A | 7/2002 |
| JP | 2002226590 A | 8/2002 |
| JP | 2002256045 A | 9/2002 |
| JP | 2002256226 A | 9/2002 |
| JP | 2008013770 A | 1/2008 |
| JP | 2008291071 A | 12/2008 |
| JP | 4215898 B2 | 1/2009 |
| JP | 2009249538 A | 10/2009 |
| JP | 2009249539 A | 10/2009 |
| JP | 2010150400 A | 7/2010 |
| JP | 2010254956 A | 11/2010 |
| JP | 2011026551 A | 2/2011 |
| JP | 2011052117 A | 3/2011 |
| JP | 2011184678 A | 9/2011 |
| JP | 201267280 A | 4/2012 |
| JP | 2012067279 A | 4/2012 |
| JP | 5021471 B2 | 9/2012 |
| JP | 2013018227 A | 1/2013 |
| JP | 2013018871 A | 1/2013 |
| JP | 2014162852 A | 9/2014 |
| JP | 2014214311 A | 11/2014 |
| JP | 2014533757 A | 12/2014 |
| JP | 2016041817 A | 3/2016 |
| JP | 2016523999 A | 8/2016 |
| JP | 2017014461 A | 1/2017 |
| JP | 2017025192 A | 2/2017 |
| JP | 2017095654 A | 6/2017 |
| JP | 2018123224 A | 8/2018 |
| JP | 2018159017 A | 10/2018 |
| JP | 2018193563 A | 12/2018 |
| KR | 100477938 B1 | 7/2003 |
| KR | 20040030282 A | 4/2004 |
| KR | 101148762 B1 | 5/2012 |
| KR | 101337122 B1 | 12/2013 |
| KR | 101348516 B1 | 1/2014 |
| KR | 10-20170062369 A | 6/2017 |
| WO | 9513331 A1 | 5/1995 |
| WO | 9607522 A1 | 3/1996 |
| WO | 1999003905 A1 | 1/1999 |
| WO | 9964528 A1 | 12/1999 |
| WO | 2006033148 A1 | 3/2006 |
| WO | 2009117654 A1 | 9/2009 |
| WO | 2012128294 A1 | 9/2012 |
| WO | 2013059549 A1 | 4/2013 |
| WO | 2014163300 A1 | 10/2014 |
| WO | 2015041266 A1 | 3/2015 |
| WO | 2015175963 A1 | 11/2015 |
| WO | 2016000938 A1 | 1/2016 |
| WO | 2016109173 A1 | 7/2016 |
| WO | 2016109174 A1 | 7/2016 |
| WO | 2016109176 A1 | 7/2016 |
| WO | 2016109245 A1 | 7/2016 |
| WO | 2016130504 A1 | 8/2016 |
| WO | 2016142422 A1 | 9/2016 |
| WO | 2017123488 A1 | 7/2017 |
| WO | 2018101252 A1 | 6/2018 |
| WO | 2020139672 A1 | 7/2020 |
| WO | 2020139673 A1 | 7/2020 |

OTHER PUBLICATIONS

Gibson et al., Polymerization of Methyl Methacrylate Using Four-Coordinate (Î±-Diimine)Iron Catalysts: Atom Transfer Radical Polymerization Vs Catalytic Chain Transfer, Macromolecules, 36, 8, 2591-2593, 2003. (1st page).

Allan et al., Organometallic Mediated Radical Polymerization, Progress in Polymer Science (Oxford), 37, 1, 127-156, 2012. (Abstract only).

Debuigne et al., Cobalt-Mediated Radical Polymerization of Acrylonitrile: Kinetics Investigations and DFT Calculations, Chemistry—A European Journal, 14, 25, 7623-7637, 2008. (Abstract only).

Heuts et al., Reversible Cobalt-Carbon Bond Formation in Catalytic Chain Transfer Polymerization, Macromolecules, 32, 8, 2511-2519, 1999. (Abstract only).

Suddaby et al., Catalytic Chain Transfer for Molecular Weight Control in the Emulsion Polymerization of Methyl Methacrylate and Methyl Methacrylate-Styrene, Macromolecules, 29, 25, 8083-8091, 1996. (Abstract only).

Sanayei et al., Catalytic Chain-Transfer in Polymerization of Methyl Methacrylate. I. Chain-Length Dependence of Chain-Transfer Coefficient, Journal of Macromolecular Science: Part A—Chemistry, 26, 8, 1137-1149, 1989. (Abstract only).

Haddleton et al., Radical-Addition-Fragmentation and Co-Polymerization of Methyl Methacrylate Macromonomers From Catalytic Chain Transfer Polymerization (CCTP), Polymer, 38, 25, 6207-6217, 1997. (Abstract only).

Sherwood et al., Controlled Radical Polymerisation of Methyl Acrylate Initiated by a Well-Defined Cobalt Alkyl Complex, Chemical Communications, 46, 14, 2456-2458, 2010. (Abstract only).

Neugebauer et al., Atom Transfer Radical Copolymerization of Glycidyl Methacrylate and Methyl Methacrylate, Journal of Applied Polymer Science, 124, 3, 2209-2215, 2012. (Abstract only).

Pierik, Catalytic Chain Transfer Copolymerization of Methyl Methacrylate and Butyl Acrylate, Macromolecular Chemistry and Physics, 204, 11, 1406-1418, 2003. (Abstract only).

Pierik, Catalytic Chain Transfer Copolymerization of Methyl, Methacrylate and Methyl Acrylate, Macromolecular Symposia, 165, 19-27, 2001. (Abstract only).

Datta et al., Atom Transfer Radical Polymerization of Hexyl Aerylate and Preparation of Its "All-Acrylate" Block Copolymers, Journal of Polymer Science, Part A: Polymer Chemistry, 46, 11, 3499-3511, 2008. (Abstract only).

Martchenko et al., Catalytic Chain Transfer in Polymerization of Acrylamide, European Polymer Journal, 33, 5, 713-718, 1997. (Abstract only).

Suddaby et al., Catalytic Chain Transfer in Polymerization of Methyl Methacrylate. II. Continuous Synthesis and Purification of Macromer, Journal of Applied Polymer Science, 43, 8, 1565-1575, 1991. (Abstract only).

Buchmeiser et al., CO(ACAC) 2-Mediated Radical Polymerization of Acrylonitrile: Control Over Molecular Weights and Copolymer-

(56) References Cited

OTHER PUBLICATIONS ization With Methyl Methacrylate, Macromolecular Materials and Engineering, 297, 9, 894-901, 2012. (Abstract only).

Pierik et al., High-Conversion Catalytic Chain Transfer Polymerization of Methyl Methacrylate, Journal of Applied Polymer Science, 91, 3, 1375-1388, 2004. (Abstract only).

Slavin et al., Cobalt-Catalyzed Chain Transfer Polymerization: A Review, Polymer Science: A Comprehensive Reference, 10 Volume Set, 3, 249-275, 2012. (Abstract only).

Bao et al., New Cobalt-Mediated Radical Polymerization (CMRP) of Methyl Methacrylate Initiated by Two Single-Component Dinuclear β²-Diketone Cobalt (II) Catalysts, PLoS ONE, 5, 10, e13629, 2010. (Abstract only).

Nurumbetov et al., Methacrylic Block Copolymers by Sulfur Free RAFT (SF RAFT) Free Radical Emulsion Polymerisation, Polymer Chemistry, 8, 6, 1084-1094, 2017. (Abstract only).

Bakac et al., Characterization of the structure, properties, and reactivity of a cobalt(II) macrocyclic complex, Inorganic Chemistry, 1986, 25, 23, 4108-4114. (1st page).

Grady et al., Studies of Higher Temperature Polymerization of N-Butyl Methacrylate and N-Butyl Acrylate, Macromolecular Symposia, 182, 149-168, 2002. (Abstract only).

Zhang et al., Preparation of PMMA-CO-PMPS Copolymers via Catalytic Chain Transfer Polymerization Techniqueand Evaluation of Their Apparent Chain Transfer Constants, Acta Polymerica Sinica, 7, 651-659, 2009. (Abstract only).

Xu et al., Progress in Pressure Sensitive Adhesives, Huaxue Fanying Gongcheng Yu Gongyi/Chemical Reaction Engineering and Technology, 31, 6, 556-565, 2015. (Abstract only).

Dong et al., Effect of Segment Structure on Mechanical Properties and Drug Release Behavior of Copolymer Pressure Sensitive Adhesives, Tianjin Daxue Xuebao (Ziran Kexue yu Gongcheng Jishu Ban)/Journal of Tianjin University Science and Technology, 45, 11, 1013-1019, 2012. (Abstract only).

Czech et al., Photoreactive UV-Crosslinkable Hotmelts Acrylic Pressure-Sensitive Adhesives Coated at Temperatures Between 80 and 120Å° C., Coating International, 43, 3, 26-28, 2010. (Abstract only).

Chen et al., Study on the Environmental Friendly Acrylate Pressure Sensitive Adhesive, Gaofenzi Cailiao Kexue Yu Gongcheng, 21, 6, 247-250, 2005. (Abstract only).

Ishitobi, Advanced Polymer Materials Synthesized by New Living Radical Polymerization Method (TERP), Annual Technical Conference—ANTEC, Conference Proceedings, 2458-2461, 2015.

Yoshida et al., Performance Improvement of Solvent-Type PSA, Fain Kemikaru, 43, 9, 47-52, 2014.

Ouzineb et al., Designed Nanoscale Heterogeneities for Controlling Water-Borne Pressure-Sensitive Adhesive Performance (NSHAPE), FATIPEC Congress, 29th, Recent Innovations and Future Challenges for the Coatings and Ink Industries, 382-400, 2008.

Glotfelter et al., UV Curable Monomers and Oligomers in PSA Applications, Adhesives Age, 40, 3, 50, 53-55, 1997.

Herze et al., Pressure Sensitive Adhesives Obtained by Irradiation, Radcure '86 [Eighty Six], Conf. Proc., 10th, 12/29-12/44, 1986.

Waterson et al., New Cobalt Catalysts for Use in Acrylic Polymerisations, American Chemical Society, Polymer Preprints, Division of Polymer Chemistry, 39, 2, 457-458, 1998.

Haddleton et al., Aqueous Solution Cobalt Mediated Catalytic Chain Transfer Polymerization, American Chemical Society, Polymer Preprints, Division of Polymer Chemistry, 40, 1, 381-382, 1999.

Steward et al., Catalytic Chain Transfer Polymerisation of Functional Methacrylates, American Chemical Society, Polymer Preprints, Division of Polymer Chemistry, 39, 2, 459-460, 1998.

Eason et al., Multifunctional Architecturally Controlled Polymeric Materials From Catalytic Chain Transfer Polymerization, American Chemical Society, Polymer Preprints, Division of Polymer Chemistry, 39, 2, 455-456, 1998.

Liu et al., Backbiting and β²-Scission Reactions in Free-Radical Polymerization of Methyl Acrylate, International Journal of Quantum Chemistry, 114, 5, 345-360, 2014.

Pierik et al., Shining a Light on Catalytic Chain Transfer, Macromolecular Symposia, Chapters 1-3, 182, 43-52, 2002.

Pierik et al., Shining a Light on Catalytic Chain Transfer, Macromolecular Symposia, Chapters 4-8, 182, 43-52, 2002.

International Search Report and Written Opinion for PCT/US2019/067335, mailed May 1, 2020, 12 pages.

International Search Report and Written Opinion for PCT/US2019/067333, mailed May 1, 2020, 10 pages.

International Search Report and Written Opinion for PCT/US2019/067329, mailed May 1, 2020, 12 pages.

Hamzehlou et al., Analyzing the Discrepancies in the Activation Energies of the Backbiting and β²-Scission Reactions in the Radical Polymerization of N-Butyl Acrylate, Polymer Chemistry, 7, 11, 2069-2077, 2016. (Abstract only).

Liu et al., Thermally Induced Aerobic Autopolymerization of Methyl Methacrylate in Amide-Type Solvents: Simultaneous Polymerization During Induction via Direct in Situ O2 Activation, Macromolecular Chemistry and Physics, 216, 11, 1201-1211, 2015. (Abstract only).

Liu et al., Modeling Spin-Forbidden Monomer Self-Initiation Reactions in Spontaneous Free-Radical Polymerization of Acrylates and Methacrylates, Journal of Physical Chemistry A, 118, 40, 9310-9318, 2014. (Abstract only).

Moghadam et al., Computational Study of Chain Transfer to Monomer Reactions in High-Temperature Polymerization of Alkyl Acrylates, Journal of Physical Chemistry A, 117, 12, 2605-2618, 2013.

Liu et al., Computational Study of Cyclohexanone-Monomer CO-Initiation Mechanism in Thermal Homo-Polymerization of Methyl Acrylate and Methyl Methacrylate, Journal of Physical Chemistry A, 116, 22, 5337-5348, 2012. (Abstract only).

Katzer et al., Thermal Polymerization of Styrene, Part 1—Bulk Polymerization, Macromolecular Reaction Engineering, 6, 5, 213-224, 2012. (Abstract only).

Rier et al., Macroscopic Mechanistic Modeling and Optimization of a Self-Initiated High-Temperature Polymerization Reactor, 5991445, 2011.

Srinivasan et al., Computational Evidence for Self-Initiation in Spontaneous High-Temperature Polymerization of Methyl Methacrylate, Journal of Physical Chemistry A, 115, 6, 1125-1132, 2011. (Abstract only).

Srinivasan et al., Self-Initiation Mechanism in Spontaneous Thermal Polymerization of Ethyl and N-Butyl Acrylate: A Theoretical Study, Journal of Physical Chemistry A, 114, 30, 7975-7983, 2010. (Abstract only).

Srinivasan et al., Understanding Kinetics of Spontaneous Thermal Polymerization of Alkyl Acrylates: An Experimental Study, 2008. (Abstract only).

Hart-Smith et al., Living Star Polymer Formation: Detailed Assessment of Poly(Acrylate) Radical Reaction Pathways via ESI-MS, Macromolecules, 41, 9, 3023-3041, 2008. (Abstract only).

Jachuck et al., Continuous Photopolymerization of N-Butyl Acrylate Using a Narrow Channel Reactor, Macromolecules, 41, 9, 3053-3062, 2008. (Abstract only).

Rantow et al., Global Parametric Identifiability of Mechanistic Models in Chain Polymerization, 2006, 1657188, 2006. (Abstract only).

Rantow et al., Spontaneous Polymerization and Chain Microstructure Evolution in High-Temperature Solution Polymerization of N-Butyl Acrylate, Polymer, 47, 4, 1423-1435, 2006. (Abstract only).

Quan et al., High-Temperature Homopolymerization of Ethyl Acrylate and N-Butyl Acrylate: Polymer Characterization, Macromolecules, 38, 18, 7619-7628, 2005. (Abstract only).

Rantow et al., Optimal Control of a High-Temperature Semi-Batch Solution Polymerization Reactor, 5, ThC08.2, 2005. (Abstract only).

Peck et al., Secondary Reactions in the High-Temperature Free Radical Polymerization of Butyl Acrylate, Macromolecules, 37, 16, 5944-5951, 2004. (Abstract only).

Barner-Kowollik et al., Probing Mechanistic Features of Conventional, Catalytic and Living Free Radical Polymerizations Using

(56) References Cited

OTHER PUBLICATIONS

Soft Ionization Mass Spectrometric, Polymer, 45, 23, 7791-7805, 2004, Techniques. (Abstract only).
Gallagher et al., Acrylic Triblock Copolymers Incorporating Isosorbide for Pressure Sensitive Adhesives, ACS Sustainable Chemistry and Engineering, 4, 6, 3379-3387, 2016. (Abstract only).
Callies et al., Combined Effect of Chain Extension and Supramolecular Interactions on Rheological and Adhesive Properties of Acrylic Pressure-Sensitive Adhesives, ACS Applied Materials and Interfaces, 8, 48, 33307-33315, 2016.
Ingale et al., Effect of Molecular Weight on Performance Properties of Pressure-Sensitive Adhesive of Poly (2-Ethylhexyl Acrylate) Synthesized by RAFT-Mediated Miniemulsion Polymerization, Journal of Adhesion, 92, 3, 236-256, 2016. (Abstract only).
Saindane et al., Influence of Dioctyl Maleate Concentration on Performance Behavior of Water Based Pressure-Sensitive Adhesives via Reversible Additionâ€Fragmentation Chain Transfer Emulsion Polymerization, Journal of Adhesion, 92, 12, 950-981, 2016. (Abstract only).
Nasiri et al., Sustainable Glucose-Based Block Copolymers Exhibit Elastomeric and Adhesive Behavior, Polymer Chemistry, 7, 33, 5233-5240, 2016. (Abstract only).
Gridnev et al., Catalytic Chain Transfer in Free-Radical Polymerizations, Chemical Reviews, 101, 12, 3611-3659, 2001. (1st page).
Li et al., In Situ Synthesis and Properties of Hydrogenated Rosin/Polyacrylate Composite Miniemulsions-Based Pressure Sensitive Adhesives, Journal of Adhesion Science and Technology, 29, 20, 2220-2232, 2015. (Abstract only).
Gurney et al., Mechanical Properties of a Waterborne Pressure-Sensitive Adhesive With a Percolating Poly(Acrylic Acid)-Based Diblock Copolymer Network: Effect of PH, Journal of Colloid and Interface Science, 448, 8-16, 2015. (Abstract only).
Debuigne, Overview of Cobalt-Mediated Radical Polymerization: Roots, State of the Art and Future Prospects, Progress in Polymer Science (Oxford), 34, 3, 211-239, 2009. (Abstract only).
Kajtna et al., Synthesis and Dynamic Mechanical Analysis of Nanocomposite UV Crosslinkable 100% Solid Acrylic Pressure Sensitive Adhesives, International Journal of Adhesion and Adhesives, 49, 18-25, 2014. (Abstract only).
Khanjani et al., Emulsion Semi-Batch Terpolymerization Process Using Hybrid Emulsifiers for Synthesizing New Emulsion Pressure Sensitive Adhesives (EPSAS), Journal of Adhesion, 90, 2, 174-194, 2014. (Abstract only).
Davis et al., Cobalt-Mediated Free-Radical Polymerization of Acrylic Monomers, Trends in Polymer Science, 3, 11, 365-373, 1995. (Abstract only).
Bae et al., Adhesion Performance and Surface Characteristics of Low Surface Energy PSAS Fluorinated by UV Polymerization, Polymer Engineering and Science, 53, 9, 1968-1978, 2013. (Abstract only).
Kajtna et al., "Design of Experiments" Analysis in Study of Solventless UV Crosslinkable Acrylic Pressure Sensitive Adhesives, International Journal of Adhesion and Adhesives, 41, 152-159, 2013. (Abstract only).
Bae et al., Adhesion Performance and Thermal Stability of Fluorinated PSAS as a Crosslinking System, Journal of Adhesion Science and Technology, 26, 1-3, 361-379, 2012. (Abstract only).
Haddleton et al., "Identifying The Nature Of The Active Species In The Polymerization Of Methacrylates: Inhibition Of Methyl Methacrylate Homopolymerizations And Reactivity Ratios For Copolymerization Of Methyl Methacrylate/N-Butyl Methacrylate In Classical Anionic, Alkyllithium/Trialkylaluminum-Initiated, Group Transfer Polymerization, Atom Transfer Radical Polymerization, Catalytic Chain Transfer, And Classical Free Radical Polymerization," Macromolecules 1997, 30, 14, 3992-3998. (Abstract only).
Sato et al., Facile Synthesis of Main-Chain Degradable Block Copolymers for Performance Enhanced Dismantlable Adhesion, ACS Applied Materials and Interfaces, 4, 4, 2057-2064, 2012. (Abstract only).
Inui et al., Pressure-Sensitive Adhesion System Using Acrylate Block Copolymers in Response to Photoirradiation and Postbaking as the Dual External Stimuli for On-Demand Dismantling, ACS Applied Materials and Interfaces, 4, 4, 2124-2132, 2012. (Abstract only).
Kajtna et al., Solventless UV Crosslinkable Acrylic Pressure Sensitive Adhesives, International Journal of Adhesion and Adhesives, 31, 8, 822-831, 2011. (Abstract only).
Jullian et al., Structure and Rheology of Di- and Triblock Copolymers of Polystyrene and Poly(N-Butyl Acrylate), Journal of Rheology, 55, 2, 379-400, 2011. (Abstract only).
Kajtna et al., UV Crosslinkable Microsphere Pressure Sensitive Adhesives-Influence on Adhesive Properties, International Journal of Adhesion and Adhesives, 31, 1, 29-35, 2011. (Abstract only).
Jullian et al., Rheological Characterization and Molecular Modeling of Poly(N-Butyl Acrylate), Applied Rheology, 20, 3, 1-11, 2010. (Abstract only).
Czech et al., Getting on the Right Tack: How Photoinitiator Type, Amount and Curing Affect PSA Performance, European Coatings Journal, 11, 34, 36-38, 2010. (Abstract only).
Jeusette et al., Microscopic Morphology of Blends Between a New "All-Acrylate" Radial Block Copolymer and a Rosin Ester Resin for Pressure Sensitive Adhesives, European Polymer Journal, 44, 12, 3931-3940, 2008. (Abstract only).
Do et al., UV-Curing Behavior and Adhesion Performance of Polymeric Photoinitiators Blended With Hydrogenated Rosin Epoxy Methacrylate for UV-Crosslinkable Acrylic Pressure Sensitive Adhesives, European Polymer Journal, 44, 11, 3871-3882, 2008. (Abstract only).
Simal et al., Adhesive Properties of a Radial Acrylic Block Co-Polymer With a Rosin Ester Resin, Journal of Adhesion Science and Technology, 21, 7, 559-574, 2007. (Abstract only).
Eslami et al., Morphological and Physical Properties of Triblock Copolymers of Methyl Methacrylate and 2-Ethylhexyl Methacrylate, Macromolecular Materials and Engineering, 291, 9, 1104-1118, 2006. (Abstract only).
Yamamoto et al., Synthesis and PSA Performance Study for Novel Acrylic and Butyl Acrylate Block Copolymers, International Journal of Adhesion and Adhesives, 22, 1, 37-40, 2002. (Abstract only).
Class et al., The Viscoelastic Properties of Rubber-Resin Blends. II. The Effect of Resin Molecular Weight, Journal of Applied Polymer Science, 30, 2, 815-24, 1985. (Abstract only).

* cited by examiner

ADHESIVE COMPOSITION AND METHODS OF FORMING THE SAME

CROSS-REFERENCE TO RELATED APPLICATION(S)

This application claims priority under 35 U.S.C. § 119(e) to U.S. Provisional Patent Application No. 62/786,025, entitled "ADHESIVE COMPOSITION AND METHODS OF FORMING THE SAME," by Yubo CUI et al., filed Dec. 28, 2018, which is assigned to the current assignee hereof and is incorporated herein by reference in its entirety.

FIELD OF THE DISCLOSURE

The present disclosure relates to an adhesive composition and methods of forming the same. The present disclosure further relates to a foam tape that includes an adhesive composition and methods of forming the same.

BACKGROUND

Pressure sensitive adhesives are used to attach a variety of substrates in a number of industrial and consumer markets. Depending on specific applications, pressure sensitive adhesives may be designed either as one single layer or as multiple layers. The substrates can be of similar nature, or of very different nature. The substrates of very different nature tend to be more challenging to be attached, especially when the substrate on one side is made of thermoplastic olefins including polypropylene and polypropylene/ethylene propylene diene terpolymer. Typically, pressure sensitive adhesives designed for these thermoplastic materials tend to lack sufficient cohesive strength as well as long-term stability. These issues become more critical in those applications where the pressure sensitive adhesives are required to possess both high adhesion and high cohesion, and are often exposed to elements in nature for many years. Therefore, there is a strong need to develop pressure sensitive adhesive compositions that retain high overall performance on thermoplastic olefins even after years of exposure.

SUMMARY

According to a first aspect, an adhesive composition may include at least about 2 wt. % and not greater than 49 wt. % of a (meth)acrylic based polymeric component A for a total weight of the adhesive composition, at least about 51 wt. % of a (meth)acrylic based polymeric component B for a total weight of the adhesive composition; and at least about 0.1 wt. % and not greater than about 30 wt. % of a tackifier component for a total weight of the adhesive composition. The (meth)acrylic based polymeric component A may have a glass transition temperature (Tg) of at least about 40° C. The (meth)acrylic based polymeric component B may have a glass transition temperature (Tg) of not greater than about 20° C. The (meth)acrylic based polymeric component B may further be acid-free.

According to another aspect, an adhesive composition may include at least about 2 wt. % and not greater than 49 wt. % of a (meth)acrylic based polymeric component A for a total weight of the adhesive composition, at least about 51 wt. % of a (meth)acrylic based polymeric component B for a total weight of the adhesive composition, and at least about 0.1 wt. % and not greater than about 30 wt. % of a tackifier component for a total weight of the adhesive composition. The (meth)acrylic based polymeric component A may have a glass transition temperature (Tg) of at least about 40° C. The (meth)acrylic based polymeric component B may have a glass transition temperature (Tg) of not greater than about 20° C. The (meth)acrylic based polymeric component B may further be a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

According to yet another aspect, an adhesive composition may include at least about 2 wt. % and not greater than 49 wt. % of a (meth)acrylic based polymeric component A for a total weight of the adhesive composition, at least about 51 wt. % of a (meth)acrylic based polymeric component B for a total weight of the adhesive composition, and at least about 0.1 wt. % and not greater than about 30 wt. % of a tackifier component for a total weight of the adhesive composition. The (meth)acrylic based polymeric component B may further be a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate. The (meth)acrylic based polymeric component B may include a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

According to still another aspect, a method of forming an adhesive composition may include providing a pre-adhesive mixture, mixing the pre-adhesive mixture, and polymerizing the pre-adhesive mixture to form the adhesive composition. The pre-adhesive mixture may include a pre-adhesive (meth)acrylic based polymeric component A, a pre-adhesive (meth)acrylic based polymeric component B, a pre-adhesive tackifier component. The pre-adhesive (meth)acrylic based polymeric component A may be fully polymerized prior to being provided for the pre-adhesive mixture. The pre-adhesive (meth)acrylic based polymeric component B may be unpolymerized prior to being provided for the pre-adhesive mixture.

According to still another aspect, a monolayer foam tape may include a foam core comprising hollow microspheres within an adhesive composition. The adhesive composition may include at least about 2 wt. % and not greater than 49 wt. % of a (meth)acrylic based polymeric component A for a total weight of the adhesive composition, at least about 51 wt. % of a (meth)acrylic based polymeric component B for a total weight of the adhesive composition; and at least about 0.1 wt. % and not greater than about 30 wt. % of a tackifier component for a total weight of the adhesive composition. The (meth)acrylic based polymeric component A may have a glass transition temperature (Tg) of at least about 40° C. The (meth)acrylic based polymeric component B may have a glass transition temperature (Tg) of not greater than about 20° C. The (meth)acrylic based polymeric component B may further be acid-free.

According to yet another aspect, a monolayer foam tape may include a foam core comprising hollow microspheres within an adhesive composition. The adhesive composition may include at least about 2 wt. % and not greater than 49 wt. % of a (meth)acrylic based polymeric component A for a total weight of the adhesive composition, at least about 51 wt. % of a (meth)acrylic based polymeric component B for a total weight of the adhesive composition, and at least about 0.1 wt. % and not greater than about 30 wt. % of a tackifier component for a total weight of the adhesive composition. The (meth)acrylic based polymeric component A may have a glass transition temperature (Tg) of at least about 40° C. The (meth)acrylic based polymeric component B may have a glass transition temperature (Tg) of not greater than about 20° C. The (meth)acrylic based polymeric component B may further be a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth) acrylate.

According to another aspect, a monolayer foam tape may include a foam core comprising hollow microspheres within an adhesive composition. The adhesive composition may include at least about 2 wt. % and not greater than 49 wt. % of a (meth)acrylic based polymeric component A for a total weight of the adhesive composition, at least about 51 wt. % of a (meth)acrylic based polymeric component B for a total weight of the adhesive composition, and at least about 0.1 wt. % and not greater than about 30 wt. % of a tackifier component for a total weight of the adhesive composition. The (meth)acrylic based polymeric component B may further be a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth) acrylate. The (meth)acrylic based polymeric component B may include a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth) acrylate.

According to still another aspect, a foam tape may include a foam core and a first adhesive layer overlying a first surface of the foam core. The foam core may include hollow microspheres within a foam material. The first adhesive layer may include a first adhesive composition. The first adhesive composition may include at least about 2 wt. % and not greater than 49 wt. % of a (meth)acrylic based polymeric component A for a total weight of the first adhesive composition, at least about 51 wt. % of a (meth)acrylic based polymeric component B for a total weight of the first adhesive composition; and at least about 0.1 wt. % and not greater than about 30 wt. % of a tackifier component for a total weight of the first adhesive composition. The (meth) acrylic based polymeric component A may have a glass transition temperature (Tg) of at least about 40° C. The (meth)acrylic based polymeric component B may have a glass transition temperature (Tg) of not greater than about 20° C. The (meth)acrylic based polymeric component B may further be acid-free.

According to yet another aspect, a foam tape may include a foam core and a first adhesive layer overlying a first surface of the foam core. The foam core may include hollow microspheres within a foam material. The first adhesive layer may include a first adhesive composition. The first adhesive composition may include at least about 2 wt. % and not greater than 49 wt. % of a (meth)acrylic based polymeric component A for a total weight of the first adhesive composition, at least about 51 wt. % of a (meth)acrylic based polymeric component B for a total weight of the first adhesive composition, and at least about 0.1 wt. % and not greater than about 30 wt. % of a tackifier component for a total weight of the first adhesive composition. The (meth) acrylic based polymeric component A may have a glass transition temperature (Tg) of at least about 40° C. The (meth)acrylic based polymeric component B may have a glass transition temperature (Tg) of not greater than about 20° C. The (meth)acrylic based polymeric component B may further be a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

According to another aspect, a foam tape may include a foam core and a first adhesive layer overlying a first surface of the foam core. The foam core may include hollow microspheres within a foam material. The first adhesive layer may include a first adhesive composition. The first adhesive composition may include at least about 2 wt. % and not greater than 49 wt. % of a (meth)acrylic based polymeric component A for a total weight of the first adhesive composition, at least about 51 wt. % of a (meth)acrylic based polymeric component B for a total weight of the first adhesive composition, and at least about 0.1 wt. % and not greater than about 30 wt. % of a tackifier component for a total weight of the first adhesive composition. The (meth)acrylic based polymeric component B may further be a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate. The (meth)acrylic based polymeric component B may include a reaction product of polymerizable material that may include at least about 40 wt. % and not greater than about 99 wt. % of a monomer component b1 for a total weight of the (meth)acrylic based polymeric component B and at least about 1 wt. % and not greater than about 60 wt. % of a monomer component b2 for a totally weight of the (meth)acrylic based polymeric component B. The monomer component b1 may be a C1-C24 acrylic ester, and the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to an adhesive composition and methods of forming an adhesive composition, and more particularly to an adhesive composition having superior adhesion properties and methods of forming the same.

Figure 1:
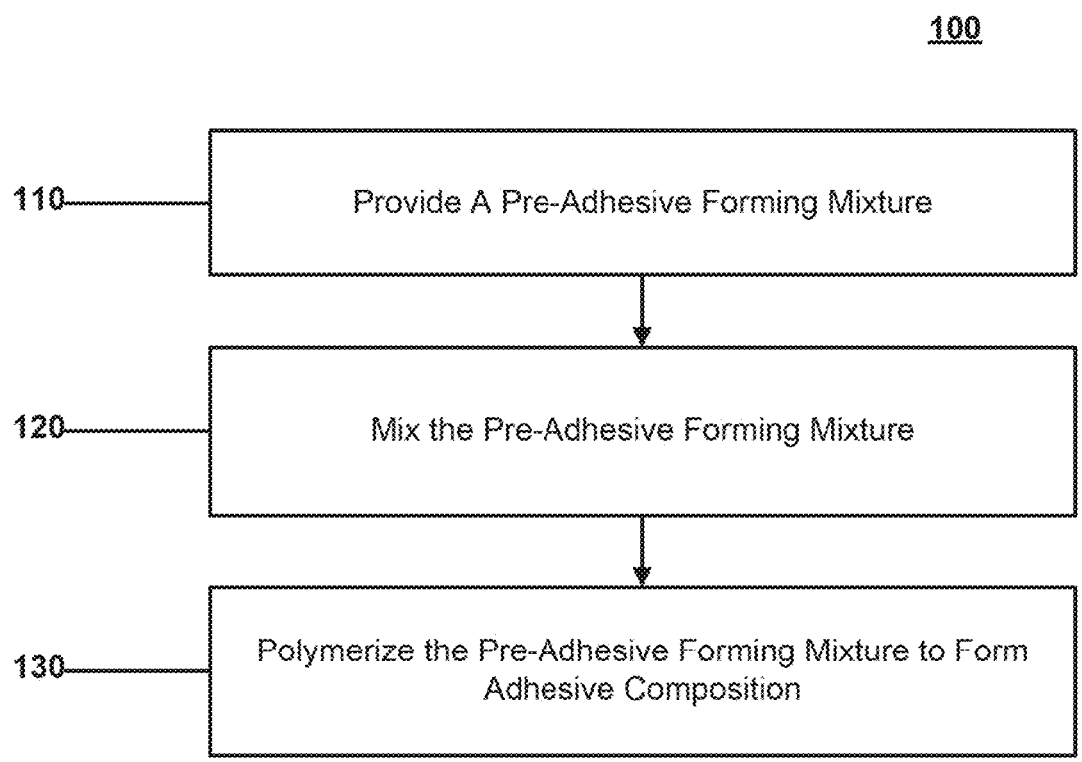
FIG. 1 includes a diagram showing an adhesive composition forming method according to embodiments described herein.

For purposes of illustration, FIG. 1 includes a diagram showing an adhesive composition forming method 100 according to particular embodiments described herein. The adhesive composition forming method 100 may include a first step 110 of providing a pre-adhesive mixture, a second step 120 of mixing the pre-adhesive mixture, and a third step 130 of polymerizing the pre-adhesive mixture to form the adhesive composition.

Referring to the first step 110, according to certain embodiments, the pre-adhesive mixture may include a pre-adhesive (meth)acrylic based polymeric component A that is fully polymerized prior to being added to the forming mixture, a pre-adhesive (meth)acrylic based polymeric component B that is unpolymerized prior to being added to the forming mixture, and a pre-adhesive tackifier component.

According to particular embodiments, the pre-adhesive (meth)acrylic based polymeric component A may be referred as a high glass transition temperature (Tg) pre-adhesive (meth)acrylic based polymeric component. According to still other embodiments, the pre-adhesive (meth)acrylic based polymeric component A may have a particular glass transition temperature (Tg) as estimated by the Fox Equation, based on the Tgs of the homopolymer of constituent monomers and the weight percent thereof. For example, the pre-adhesive (meth)acrylic based polymeric component A may have a glass transition temperature (Tg) of at least about 40° C., such as, at least about 45° C. or at least about 50° C. or at least about 55° C. or at least about 60° C. or at least about 65° C. or at least about 70° C. or at least about 75° C.

or even at least about 80° C. It will be appreciated that the glass transition temperature of the pre-adhesive (meth)acrylic based polymeric component A may be within a range between any of the values noted above. It will be further appreciated that the glass transition temperature of the pre-adhesive (meth)acrylic based polymeric component A may be any value between any of the values noted above.

According to still other embodiments, the pre-adhesive (meth)acrylic based polymeric component A may have a particular molecular weight. For example, the pre-adhesive (meth)acrylic based polymeric component A may have a molecular weight of at least about 5,000 g/mol, such as, at least about 6,000 g/mol or at least about 7,000 g/mol or at least about 8,000 g/mol or at least about 9,000 g/mol or at least about 10,000 g/mol or at least about 11,000 g/mol or at least about 12,000 g/mol or at least about 13,000 g/mol or at least about 14,000 g/mol or at least about 15,000 g/mol or at least about 16,000 g/mol or at least about 17,000 g/mol or at least about 18,000 g/mol or at least about 19,000 g/mol or even at least about 20,000 g/mol. According to still other embodiments, the pre-adhesive (meth)acrylic based polymeric component A may have a molecular weight of not greater than about 200,000 g/mol, such as, not greater than about 150,000 g/mol or even not greater than about 100,000 g/mol. It will be appreciated that the molecular weight of the pre-adhesive (meth)acrylic based polymeric component A may be within a range between any of the minimum and maximum values noted above. It will be further appreciated that the molecular weight of the pre-adhesive (meth)acrylic based polymeric component A may be any value between any of the minimum and maximum values noted above.

According to still other embodiments, the pre-adhesive (meth)acrylic based polymeric component A may contain a very low level of acidic monomers, or may even be free of any acidic monomers. According to certain embodiments, the level of acidic monomers in the pre-adhesive (meth)acrylic based polymeric component A may be not greater than about 10% by weight, such as, not greater than about 5% by weight, or even not greater than about 0% by weight. Accordingly, the overall level of acidic monomers in the adhesive may be not greater than about 2% by weight, such as, not greater than about 1% by weight, or even not greater than about 0% by weight.

According to particular embodiments, the pre-adhesive (meth)acrylic based polymeric component B may be referred as a low glass transition temperature (Tg) pre-adhesive (meth)acrylic based polymeric component. According to still other embodiments, the pre-adhesive (meth)acrylic based polymeric component B may have a particular glass transition temperature (Tg) as estimated by the Fox Equation, based on the Tgs of the homopolymer of constituent monomers and the weight percent thereof. For example, the pre-adhesive (meth)acrylic based polymeric component B may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the pre-adhesive (meth)acrylic based polymeric component B may be within a range between any of the values noted above. It will be further appreciated that the glass transition temperature of the pre-adhesive (meth)acrylic based polymeric component B may be any value between any of the values noted above.

According to still other embodiments, the pre-adhesive (meth)acrylic based polymeric component B may have a particular molecular weight. For example, the pre-adhesive (meth)acrylic based polymeric component A may have a molecular weight of at least about 100,000 g/mol, such as, at least about 110,000 g/mol or at least about 120,000 g/mol or at least about 130,000 g/mol or at least about 140,000 g/mol or at least about 150,000 g/mol or at least about 160,000 g/mol or at least about 170,000 g/mol or at least about 180,000 g/mol or at least about 190,000 g/mol or even at least about 200,000 g/mol. It will be appreciated that the molecular weight of the pre-adhesive (meth)acrylic based polymeric component B may be within a range between any of the minimum and maximum values noted above. It will be further appreciated that the molecular weight of the pre-adhesive (meth)acrylic based polymeric component B may be any value between any of the minimum and maximum values noted above.

According to still other embodiments, the pre-adhesive (meth)acrylic based polymeric component B may be acid-free. For purposes of embodiments described herein, the term "acid-free" may be defined as having no acid functional monomers. According to certain embodiments, the overall level of acidic monomers in the adhesive may be not greater than about 2% by weight, such as, not greater than about 1% by weight, or even not greater than about 0% by weight.

According to yet other embodiments, the pre-adhesive mixture may include a particular content of the pre-adhesive (meth)acrylic based polymeric component A. For example, the content of the pre-adhesive (meth)acrylic based polymeric component A in the pre-adhesive mixture may be at least about 2.0 wt. % for a total weight of the pre-adhesive mixture, such as, at least about 2.5 wt. % or at least about 3.0 wt. % or at least about or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.5 wt. % or at least about 9.0 wt. % or at least about 9.5 wt. % or even at least about 10.0 wt. %. According to still other embodiments, the content of the pre-adhesive (meth)acrylic based polymeric component A in the pre-adhesive mixture may be not greater than about 49.0 wt. % for a total weight of the pre-adhesive mixture, such as, not greater than about 47.0 wt. % or not greater than about 45.0 wt. % or not greater than about 42.0 wt. % or not greater than about 40.0 wt. % or not greater than about 37.0 wt. % or not greater than about 35.0 wt. % or not greater than about 32.0 wt. % or not greater than about 30.0 wt. % or not greater than about 27.0 wt. % or not greater than about 25.0 wt. % or not greater than about 22.0 wt. % or not greater than about 20.0 wt. % or not greater than about 17.0 wt. % or not greater than about 15.0 wt. % or even not greater than about 12.0 wt. %. It will be appreciated that the content of the pre-adhesive (meth)acrylic based polymeric component A in the pre-adhesive mixture may be within a range between any of the minimum and maximum values noted above. It will be further appreciated that the content of the pre-adhesive (meth)acrylic based polymeric component A in the pre-adhesive mixture may be any value between any of the minimum and maximum values noted above.

According to still other embodiments, the pre-adhesive (meth)acrylic based polymeric component A may include a pre-adhesive monomer component a1 and a pre-adhesive monomer component a2.

According to certain embodiments, the pre-adhesive monomer component a1 may be an ethylenically unsaturated monomer. According to still other embodiments, the pre-adhesive monomer component a1 may include, but is not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, and propyl methacrylate, admantyl acrylate, norbornyl acrylate, or mixtures thereof.

According to still other embodiments, the pre-adhesive monomer component a2 may be an acidic monomer or a non-acidic functional polar monomer.

According to certain embodiments, the pre-adhesive monomer component a2 may be an acidic monomer selected from ethylenically unsaturated carboxylic acids, ethylenically unsaturated sulfonic acids, ethylenically unsaturated phosphonic acids, and mixtures thereof. According to still other embodiments, the pre-adhesive monomer component a2 may include an acidic monomer selected from, but is not limited to, an acrylic acid, methacrylic acid, itaconic acid, fumaric acid, crotonic acid, citraconic acid, maleic acid, oleic acid, f3-carboxyethyl(meth)acrylate, 2-sulfoethyl methacrylate, styrene sulfonic acid, 2-acrylamido-2-methyl-propanesulfonic acid, vinylphosphonic acid, or mixtures thereof.

According to certain embodiments, the pre-adhesive monomer component a2 may be a non-acidic functional monomers selected from, but are not limited to, hydroxyl containing (meth)acrylic monomers, and nitrogen-containing monomers having a primary, secondary or tertiary amino groups, or an N,N-dialkylaminoalkyl (meth)acrylate. According to certain embodiments, the pre-adhesive monomer component a2 may be a non-acidic functional monomers selected from, but are not limited to, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the pre-adhesive monomer component a2 may be N-hydroxyalkyl (meth)acrylamide. The N-hydroxyalkyl (meth)acrylamide may be represented by the following formula: $CH_2=C(R1)CONHR2$, where R1 represents a hydrogen atom or methyl group, and R2 represents an alkyl group having 1 to 8 carbon atoms and at least one hydroxyl group. According to certain embodiments, the pre-adhesive monomer component a2 may be selected from, but are not limited to, n-hydroxymethyl acrylamide, n-hydroxymethyl methacrylamide n-hydroxyethyl acrylamide, n-hydroxyethyl methacrylamide, or mixtures thereof.

According to still other embodiments, the pre-adhesive (meth)acrylic based polymeric component A may include a particular content of the pre-adhesive monomer component a1. For example, the content of the pre-adhesive monomer component a1 in the pre-adhesive (meth)acrylic based polymeric component A may be at least about 40 wt. % for a total weight of the pre-adhesive (meth)acrylic based polymeric component A, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the pre-adhesive monomer component a1 in the pre-adhesive (meth)acrylic based polymeric component A may be not greater than about 99 wt. % for a total weight of the pre-adhesive (meth)acrylic based polymeric component A, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the pre-adhesive monomer component a1 in the pre-adhesive (meth)acrylic based polymeric component A may be within a range between any of the minimum and maximum values noted above. It will be further appreciated that the content of the content of the pre-adhesive monomer component a1 in the pre-adhesive (meth)acrylic based polymeric component A may be any value between any of the minimum and maximum values noted above.

According to still other embodiments, the pre-adhesive (meth)acrylic based polymeric component A may include a particular content of the pre-adhesive monomer component a2. For example, the content of the pre-adhesive monomer component a2 in the pre-adhesive (meth)acrylic based polymeric component A may be at least about 0.1 wt. % for a total weight of the pre-adhesive (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the pre-adhesive monomer component a2 in the pre-adhesive (meth)acrylic based polymeric component A may be not greater than about 20.0 wt. % for a total weight of the pre-adhesive (meth)acrylic based polymeric component A, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or not greater than about 12.0 wt. %. It will be appreciated that the content of the pre-adhesive monomer component a2 in the pre-adhesive (meth)acrylic based polymeric component A may be within a range between any of the minimum and maximum values noted above. It will be further appreciated that the content of the content of the pre-adhesive monomer component a2 in the pre-adhesive (meth)acrylic based polymeric component A may be any value between any of the minimum and maximum values noted above.

According to still other embodiments, the pre-adhesive (meth)acrylic based polymeric component A may further include a pre-adhesive monomer component a3. According to particular embodiments, the pre-adhesive monomer component a3 may be different than both the pre-adhesive monomer component a1 and the pre-adhesive monomer component a2. According to still other embodiments, component a2 and a3 may interact to strengthen the cohesion of component A in the final adhesive. Such interactions include, but are not limited to, hydrogen bonding, acid-base pairs, ion pairs, or combination thereof.

According to certain embodiments, the pre-adhesive monomer component a3 may be an ethylenically unsaturated monomer. According to still other embodiments, the pre-adhesive monomer component a3 may include an acidic monomer having an acidic group and an ethylenically unsaturated group. According to certain embodiments, the pre-adhesive monomer component a3 may include, but are not limited to, those selected from ethylenically unsaturated carboxylic acids, ethylenically unsaturated sulfonic acids, ethylenically unsaturated phosphonic acids, and mixtures thereof. Examples of such compounds include, but are not limited to, those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid or mixtures thereof.

According to still other embodiments, the pre-adhesive monomer component a3 may include a hydroxy-containing acrylic ester monomer having a hydroxyl group and an ethylenically unsaturated group. According to certain embodiments, the pre-adhesive monomer component a3 may include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, n-hydroxymethyl acrylamide, n-hydroxyethyl acrylamide and mixtures thereof. According to still other embodiments, the pre-adhesive monomer component a3 may include a nitrogen-containing monomer having a primary, secondary or a tertiary amino group or an N, N-dialkylaminoalkyl (meth)acrylate and a ethylenically unsaturated group.

According to still other embodiments, the pre-adhesive monomer component a3 may include a vinyl monomer. According to certain embodiments, the pre-adhesive monomer component a3 may include, but are not limited to, but are not limited to, those selected from N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide or mixtures thereof.

According to still other embodiments, the pre-adhesive (meth)acrylic based polymeric component A may include a particular content of the pre-adhesive monomer component a3. For example, the content of the pre-adhesive monomer component a3 in the pre-adhesive (meth)acrylic based polymeric component A may be at least about 0.1 wt. % for a total weight of the pre-adhesive (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the pre-adhesive monomer component a3 in the pre-adhesive (meth)acrylic based polymeric component A may be not greater than about 60 wt. % for a total weight of the pre-adhesive (meth)acrylic based polymeric component A, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the pre-adhesive monomer component a3 in the pre-adhesive (meth)acrylic based polymeric component A may be within a range between any of the minimum and maximum values noted above. It will be further appreciated that the content of the content of the pre-adhesive monomer component a3 in the pre-adhesive (meth)acrylic based polymeric component A may be any value between any of the minimum and maximum values noted above.

According to yet other embodiments, the pre-adhesive mixture may include a particular content of the pre-adhesive (meth)acrylic based polymeric component B. For example, the content of the pre-adhesive (meth)acrylic based polymeric component B in the pre-adhesive mixture may be at least about 51 wt. % for a total weight of the pre-adhesive mixture, such as, at least about 53 wt. % or at least about 55 wt. % or at least about or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to still other embodiments, the content of the pre-adhesive (meth)acrylic based polymeric component B in the pre-adhesive mixture may be not greater than about 98 wt. % for a total weight of the pre-adhesive mixture, such as, not greater than about 95 wt. % or not greater than about 92 wt. % or not greater than about 90 wt. % or not greater than about 87 wt. % or not greater than about 85 wt. % or not greater than about 82 wt. % or even not greater than about 80 wt. %. It will be appreciated that the content of the pre-adhesive (meth)acrylic based polymeric component B in the pre-adhesive mixture may be within a range between any of the minimum and maximum values noted above. It will be further appreciated that the content of the pre-adhesive (meth)acrylic based polymeric component B in the pre-adhesive mixture may be any value between any of the minimum and maximum values noted above.

According to still other embodiments, the pre-adhesive (meth)acrylic based polymeric component B may include a pre-adhesive monomer component b1 and a pre-adhesive monomer component b2.

According to certain embodiments, the pre-adhesive monomer component b1 may be a C1-C24 acrylic ester, methacrylate ester or mixtures thereof. According to still other embodiments, the alkyl group of component b1 can be straight-chained, branched with one or more branching sites, or cyclic. According to yet other embodiments, the alkyl groups may include, but are not limited to, those selected from methyl, ethyl, propyl, isopropyl, butyl, isobutyl, pentyl, 2-pentyl, hexyl, heptyl, octyl, isooctyl, 2-ethylhexyl, tert-octyl, nonyl, decyl, 2-propylheptyl, undecyl, tridecyl acrylate, (2-isopropyl-5-methyl)hexyl, tetradecyl, hexadecyl, octadecyl, branched alkyl group having 16 to 22 C atoms and including at least two branching sites, phenyl, benzyl, cyclohexyl, isobornyl, admantyl, 3,3,5 trimethylcyclohexyl, norbornyl or mixtures thereof. According to particular embodiments, the alkyl groups may include, but are not limited to, those selected from butyl, isooctyl and 2-ethylhexyl.

According to still other embodiments, the pre-adhesive monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth) acrylate. According to still other embodiments, component b2 may form hydrogen bonding within component B, or form favorable interactions with component A. Such favorable interactions of component b2 with component A include, but are not limited to, hydrogen bonding, acid-base pairs, ion pairs, and combination thereof. Useful monomers for b2 include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the pre-adhesive (meth)acrylic based polymeric component B may include a particular content of the pre-adhesive monomer component b1. For example, the content of the pre-adhesive monomer component b1 in the pre-adhesive (meth)acrylic based polymeric component B may be at least about 40 wt. % for a total weight of the pre-adhesive (meth)acrylic based polymeric component B, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the pre-adhesive monomer component b1 in the pre-adhesive (meth)acrylic based polymeric component B may be not greater than about 99 wt. % for a total weight of the pre-adhesive (meth)acrylic based polymeric component B, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the pre-adhesive monomer component b1 in the pre-adhesive (meth)acrylic based polymeric component B may be within a range between any of the minimum and maximum values noted above. It will be further appreciated that the content of the content of the pre-adhesive monomer component b1 in the pre-adhesive (meth)acrylic based polymeric component B may be any value between any of the minimum and maximum values noted above.

According to still other embodiments, the pre-adhesive (meth)acrylic based polymeric component B may include a particular content of the pre-adhesive monomer component b2. For example, the content of the pre-adhesive monomer component b2 in the pre-adhesive (meth)acrylic based polymeric component B may be at least about 1 wt. % for a total weight of the pre-adhesive (meth)acrylic based polymeric component B, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to yet other embodiments, the content of the pre-adhesive monomer component b2 in the pre-adhesive (meth)acrylic based polymeric component B may be not greater than about 60 wt. % for a total weight of the pre-adhesive (meth)acrylic based polymeric component B, such as, not greater than about 57 wt. % or not greater than about 55 wt. % or not greater than about 52 wt. % or not greater than about 50 wt. % or not greater than about 47 wt. % or not greater than about 45 wt. % or not greater than about 42 wt. % or not greater than about 40 wt. % or not greater than about 37 wt. % or not greater than about 35 wt. % or not greater than about 32 wt. % or not greater than about 30 wt. % or not greater than about 27 wt. % or not greater than about 25 wt. % or not greater than about 23 wt. % or not greater than about 20 wt. %. It will be appreciated that the content of the pre-adhesive monomer component b2 in the pre-adhesive (meth)acrylic based polymeric component B may be within a range between any of the minimum and maximum values noted above. It will be further appreciated that the content of the content of the pre-adhesive monomer component b2 in the pre-adhesive (meth)acrylic based polymeric component B may be any value between any of the minimum and maximum values noted above.

According to still other embodiments, the pre-adhesive (meth)acrylic based polymeric component B may further include a pre-adhesive monomer component b3. According to particular embodiments, the pre-adhesive monomer component b3 may be different than both the pre-adhesive monomer component b1 and the pre-adhesive monomer component b2. According to particular embodiments, component b3 may form favorable interactions with component b2. Such favorable interactions may include, but are not limited to, hydrogen bonding, acid-base pairs, or ion pairs or their combinations. Useful monomers for b3 exclude any acidic monomers.

According to still other embodiments, the pre-adhesive (meth)acrylic based polymeric component B may include a particular content of the pre-adhesive monomer component b3. For example, the content of the pre-adhesive monomer component b3 in the pre-adhesive (meth)acrylic based polymeric component B may be at least about 0.1 wt. % for a total weight of the pre-adhesive (meth)acrylic based polymeric component B, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the pre-adhesive monomer component b3 in the pre-adhesive (meth)acrylic based polymeric component B may be not greater than about 60 wt. % for a total weight of the pre-adhesive (meth)acrylic based polymeric component B, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the pre-adhesive monomer component b3 in the pre-adhesive (meth)acrylic based polymeric component B may be within a range between any of the minimum and maximum values noted above. It will be further appreciated that the content of the content of the pre-adhesive monomer component b3 in the pre-adhesive (meth)acrylic based polymeric component B may be any value between any of the minimum and maximum values noted above.

According to certain embodiments, the pre-adhesive tackifier component may include C5, C9, C5/C9, dicyclopentadiene, terpene, or their hydrogenated resins, or combinations thereof.

According to yet other embodiments, the pre-adhesive mixture may include a particular content of the pre-adhesive tackifier component. For example, the content of the pre-adhesive tackifier component in the pre-adhesive mixture may be at least about at least about 0.1 wt. % for a total weight of the pre-adhesive mixture, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the pre-adhesive tackifier component in the pre-adhesive mixture may be not greater than about 30 wt. % for a total weight of the pre-adhesive mixture, such as, not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the pre-adhesive tackifier component in the pre-adhesive mixture may be within a range between any of the minimum and maximum values noted above. It will be further appreciated that the content of the pre-adhesive tackifier component in the pre-adhesive mixture may be any value between any of the minimum and maximum values noted above.

Referring now to the adhesive composition formed according to embodiments described herein, the adhesive composition may include a (meth)acrylic based polymeric component A, a (meth)acrylic based polymeric component B, and a tackifier component.

According to particular embodiments, the (meth)acrylic based polymeric component A may be referred as a high glass transition temperature (Tg) (meth)acrylic based polymeric component. According to still other embodiments, the (meth)acrylic based polymeric component A may have a particular glass transition temperature (Tg) as estimated by the Fox Equation, based on the Tgs of the homopolymer of constituent monomers and the weight percent thereof. For example, the (meth)acrylic based polymeric component A may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or even at least about 80° C. It will be appreciated that the glass transition temperature of the (meth)acrylic based polymeric component A may be within a range between any of the values noted above. It will be further appreciated that the glass transition temperature of the (meth)acrylic based polymeric component A may be any value between any of the values noted above.

According to still other embodiments, the (meth)acrylic based polymeric component A may have a particular molecular weight. For example, the (meth)acrylic based polymeric component A may have a molecular weight of at least about 5,000 g/mol, such as, at least about 6,000 g/mol or at least about 7,000 g/mol or at least about 8,000 g/mol or at least about 9,000 g/mol or at least about 10,000 g/mol or at least about 11,000 g/mol or at least about 12,000 g/mol or at least about 13,000 g/mol or at least about 14,000 g/mol or at least about 15,000 g/mol or at least about 16,000 g/mol or at least about 17,000 g/mol or at least about 18,000 g/mol or at least about 19,000 g/mol or even at least about 20,000 g/mol. According to still other embodiments, the (meth)acrylic based polymeric component A may have a molecular weight of not greater than about 200,000 g/mol, such as, not greater than about 150,000 g/mol or even not greater than about 100,000 g/mol. It will be appreciated that the molecular weight of the (meth)acrylic based polymeric component A may be within a range between any of the minimum and maximum values noted above. It will be further appreciated that the molecular weight of the (meth)acrylic based polymeric component A may be any value between any of the minimum and maximum values noted above.

According to still other embodiments, the (meth)acrylic based polymeric component A may contain a very low level of acidic monomers, or may even be free of any acidic monomers. According to certain embodiments, the level of acidic monomers in the (meth)acrylic based polymeric component A may be not greater than about 10% by weight, such as, not greater than about 5% by weight, or even not greater than about 0% by weight. Accordingly, the overall level of acidic monomers in the adhesive may be not greater than about 2% by weight, such as, not greater than about 1% by weight, or even not greater than about 0% by weight.

According to particular embodiments, the (meth)acrylic based polymeric component B may be referred as a low glass transition temperature (Tg) (meth)acrylic based polymeric component. According to still other embodiments, the (meth)acrylic based polymeric component B may have a particular glass transition temperature (Tg) as estimated by the Fox Equation, based on the Tgs of the homopolymer of constituent monomers and the weight percent thereof. For example, the (meth)acrylic based polymeric component B may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the (meth)acrylic based polymeric component B may be within a range between any of the values noted above. It will be further appreciated that the glass transition temperature of the (meth)acrylic based polymeric component B may be any value between any of the values noted above.

According to still other embodiments, the (meth)acrylic based polymeric component B may have a particular molecular weight. For example, the (meth)acrylic based polymeric component A may have a molecular weight of at least about 100,000 g/mol, such as, at least about 110,000 g/mol or at least about 120,000 g/mol or at least about 130,000 g/mol or at least about 140,000 g/mol or at least about 150,000 g/mol or at least about 160,000 g/mol or at least about 170,000 g/mol or at least about 180,000 g/mol or at least about 190,000 g/mol or even at least about 200,000 g/mol. It will be appreciated that the molecular weight of the (meth)acrylic based polymeric component B may be within a range between any of the minimum and maximum values noted above. It will be further appreciated that the molecular weight of the (meth)acrylic based polymeric component B may be any value between any of the minimum and maximum values noted above.

According to still other embodiments, the (meth)acrylic based polymeric component B may be acid-free. For purposes of embodiments described herein, the term "acid-free" may be defined as having no acid functional monomers. According to certain embodiments, the overall level of acidic monomers in the adhesive may be not greater than about 2% by weight, such as, not greater than about 1% by weight, or even not greater than about 0% by weight.

According to yet other embodiments, the adhesive composition may include a particular content of the (meth)acrylic based polymeric component A. For example, the content of the (meth)acrylic based polymeric component A in the adhesive composition may be at least about 2.0 wt. % for a total weight of the adhesive composition, such as, at least about 2.5 wt. % or at least about 3.0 wt. % or at least about or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.5 wt. % or at least about 9.0 wt. % or at least about 9.5 wt. % or even at least about 10.0 wt. %. According to still other embodiments, the content of the (meth)acrylic based polymeric component A in the adhesive composition may be not greater than about 49.0 wt. % for a total weight of the adhesive composition, such as, not greater than about 47.0 wt. % or not greater than about 45.0 wt. % or not greater than about 42.0 wt. % or not greater than about 40.0 wt. % or not greater than about 37.0 wt. % or not greater than about 35.0 wt. % or not greater than about 32.0 wt. % or not greater than about 30.0 wt. % or not greater than about 27.0 wt. % or not greater than about 25.0 wt. % or not greater than about 22.0 wt. % or not greater than about 20.0 wt. % or not greater than about 17.0 wt. % or not greater than about 15.0 wt. % or even not greater than about 12.0 wt. %. It will be appreciated that the content of the (meth)acrylic based polymeric component A in the adhesive composition may be within a range between any of the minimum and maximum values noted above. It will be further appreciated that the content of the (meth)acrylic based polymeric component A in the adhesive composition may be any value between any of the minimum and maximum values noted above.

According to still other embodiments, the (meth)acrylic based polymeric component A may include a monomer component a1 and a monomer component a2.

According to certain embodiments, the monomer component a1 may be an ethylenically unsaturated monomer. According to still other embodiments, the monomer component a1 may include, but is not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, and propyl methacrylate, admantyl acrylate, norbornyl acrylate, or mixtures thereof.

According to still other embodiments, the monomer component a2 may be an acidic monomer or a non-acidic functional polar monomer.

According to certain embodiments, the monomer component a2 may be an acidic monomer selected from ethylenically unsaturated carboxylic acids, ethylenically unsaturated sulfonic acids, ethylenically unsaturated phosphonic acids, and mixtures thereof. According to still other embodiments, the monomer component a2 may include an acidic monomer selected from, but is not limited to, an acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, or mixtures thereof.

According to certain embodiments, the monomer component a2 may be a non-acidic functional monomers selected from, but are not limited to, hydroxyl containing (meth)acrylic monomers, and nitrogen-containing monomers having a primary, secondary or tertiary amino groups, or an N,N-dialkylaminoalkyl (meth)acrylate. According to certain embodiments, the monomer component a2 may be a non-acidic functional monomers selected from, but are not limited to, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the monomer component a2 may be N-hydroxyalkyl (meth)acrylamide. The N-hydroxyalkyl (meth)acrylamide may be represented by the following formula: $CH_2=C(R1)CONHR2$, where R1 represents a hydrogen atom or methyl group, and R2 represents an alkyl group having 1 to 8 carbon atoms and at least one hydroxyl group. According to certain embodiments, the monomer component a2 may be selected from, but are not limited to, n-hydroxymethyl acrylamide, n-hydroxymethyl methacrylamide n-hydroxyethyl acrylamide, n-hydroxyethyl methacrylamide, or mixtures thereof.

According to still other embodiments, the (meth)acrylic based polymeric component A may include a particular content of the monomer component a1. For example, the content of the monomer component a1 in the (meth)acrylic based polymeric component A may be at least about 40 wt. % for a total weight of the (meth)acrylic based polymeric component A, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the monomer component a1 in the (meth)acrylic based polymeric component A may be not greater than about 99 wt. % for a total weight of the (meth)acrylic based polymeric component A, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component a1 in the (meth)acrylic based polymeric component A may be within a range between any of the minimum and maximum values noted above. It will be further appreciated that the content of the content of the monomer component a1 in the (meth)acrylic based polymeric component A may be any value between any of the minimum and maximum values noted above.

According to still other embodiments, the (meth)acrylic based polymeric component A may include a particular content of the monomer component a2. For example, the content of the monomer component a2 in the (meth)acrylic based polymeric component A may be at least about 0.1 wt. % for a total weight of the (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a2 in the (meth)acrylic based polymeric component A may be not greater than about 20.0 wt. % for a total weight of the (meth)acrylic based polymeric component A, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or not greater than about 12.0 wt. %. It will be appreciated that the content of the monomer component a2 in the (meth)acrylic based polymeric component A may be within a range between any of the minimum and maximum values noted above. It will be further appreciated that the content of the content of the monomer component a2 in the (meth)acrylic based polymeric component A may be any value between any of the minimum and maximum values noted above.

According to still other embodiments, the (meth)acrylic based polymeric component A may further include a monomer component a3. According to particular embodiments, the monomer component a3 may be different than both the monomer component a1 and the monomer component a2. According to still other embodiments, component a2 and a3 may interact to strengthen the cohesion of component A in the final adhesive. Such interactions include, but are not limited to, hydrogen bonding, acid-base pairs, ion pairs, or combination thereof.

According to certain embodiments, the monomer component a3 may be an ethylenically unsaturated monomer. According to still other embodiments, the monomer component a3 may include an acidic monomer having an acidic group and an ethylenically unsaturated group. According to certain embodiments, the monomer component a3 may include, but are not limited to, those selected from ethylenically unsaturated carboxylic acids, ethylenically unsaturated sulfonic acids, ethylenically unsaturated phosphonic acids, and mixtures thereof. Examples of such compounds include, but are not limited to, those selected from acrylic acid, methacrylic acid, itaconic acid, fumaric acid, crotonic acid, citraconic acid, maleic acid, oleic acid, (3-carboxyethyl (meth)acrylate, 2-sulfoethyl methacrylate, styrene sulfonic acid, 2-acrylamido-2-methylpropanesulfonic acid, vinylphosphonic acid or mixtures thereof.

According to still other embodiments, the monomer component a3 may include a hydroxy-containing acrylic ester monomer having a hydroxyl group and an ethylenically unsaturated group. According to certain embodiments, the monomer component a3 may include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, n-hydroxymethyl acrylamide, n-hydroxyethyl acrylamide and mixtures thereof. According to still other embodiments, the monomer component a3 may include a nitrogen-containing monomer having a primary, secondary or a tertiary amino group or an N, N-dialkylaminoalkyl (meth)acrylate and a ethylenically unsaturated group.

According to still other embodiments, the monomer component a3 may include a vinyl monomer. According to certain embodiments, the monomer component a3 may include, but are not limited to, but are not limited to, those selected from N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido) ethyl acrylate, dimethylaminoethyl acrylamide, N-vinylpyrrolidone; N-vinylcaprolactam, acrylamide or mixtures thereof.

According to still other embodiments, the (meth)acrylic based polymeric component A may include a particular content of the monomer component a3. For example, the content of the monomer component a3 in the (meth)acrylic based polymeric component A may be at least about 0.1 wt. % for a total weight of the (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a3 in the (meth)acrylic based polymeric component A may be not greater than about 60 wt. % for a total weight of the (meth)acrylic based polymeric component A, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component a3 in the (meth)acrylic based polymeric component A may be within a range between any of the minimum and maximum values noted above. It will be further appreciated that the content of the content of the monomer component a3 in the (meth)acrylic based polymeric component A may be any value between any of the minimum and maximum values noted above.

According to yet other embodiments, the adhesive composition may include a particular content of the (meth) acrylic based polymeric component B. For example, the content of the (meth)acrylic based polymeric component B in the adhesive composition may be at least about 51 wt. % for a total weight of the adhesive composition, such as, at least about 53 wt. % or at least about 55 wt. % or at least about or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to still other embodiments, the content of the (meth)acrylic based polymeric component B in the adhesive composition may be not greater than about 98 wt. % for a total weight of the adhesive composition, such as, not greater than about 95 wt. % or not greater than about 92 wt. % or not greater than about 90 wt. % or not greater than about 87 wt. % or not greater than about 85 wt. % or not greater than about 82 wt. % or even not greater than about 80 wt. %. It will be appreciated that the content of the (meth)acrylic based polymeric component B in the adhesive composition may be within a range between any of the minimum and maximum values noted above. It will be further appreciated that the content of the (meth)acrylic based polymeric component B in the adhesive composition may be any value between any of the minimum and maximum values noted above.

According to still other embodiments, the (meth)acrylic based polymeric component B may include a monomer component b1 and a monomer component b2.

According to certain embodiments, the monomer component b1 may be a C1-C24 acrylic ester, methacrylate ester or mixtures thereof. According to still other embodiments, the alkyl group of component b1 can be straight-chained, branched with one or more branching sites, or cyclic. According to yet other embodiments, the alkyl groups may include, but are not limited to, those selected from methyl, ethyl, propyl, isopropyl, butyl, isobutyl, pentyl, 2-pentyl, hexyl, heptyl, octyl, isooctyl, 2-ethylhexyl, tert-octyl, nonyl, decyl, 2-propylheptyl, undecyl, tridecyl acrylate, (2-isopropyl-5-methyl)hexyl, tetradecyl, hexadecyl, octadecyl, branched alkyl group having 16 to 22 C atoms and including at least two branching sites, phenyl, benzyl, cyclohexyl, isobornyl, admantyl, 3,3,5 trimethylcyclohexyl, norbornyl or mixtures thereof. According to particular embodiments, the alkyl groups may include, but are not limited to, those selected from butyl, isooctyl and 2-ethylhexyl.

According to still other embodiments, the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate. According to still other embodiments, component b2 may form hydrogen bonding within component B, or form favorable interactions with component A. Such favorable interactions of component b2 with component A include, but are not limited to, hydrogen bonding, acid-base pairs, ion pairs, and combination thereof. Useful monomers for b2 include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the (meth)acrylic based polymeric component B may include a particular content of the monomer component b1. For example, the content of the monomer component b1 in the (meth)acrylic based polymeric component B may be at least about 40 wt. % for a total weight of the (meth)acrylic based polymeric component B, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the monomer component b1 in the (meth)acrylic based polymeric component B may be not greater than about 99 wt. % for a total weight of the (meth)acrylic based polymeric component B, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component b1 in the (meth)acrylic based polymeric component B may be within a range between any of the minimum and maximum values noted above. It will be further appreciated that the content of the content of the monomer component b1 in the (meth)acrylic based polymeric component B may be any value between any of the minimum and maximum values noted above.

According to still other embodiments, the (meth)acrylic based polymeric component B may include a particular content of the monomer component b2. For example, the content of the monomer component b2 in the (meth)acrylic based polymeric component B may be at least about 1 wt. % for a total weight of the (meth)acrylic based polymeric component B, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to yet other embodiments, the content of the monomer component b2 in the (meth)acrylic based polymeric component B may be not greater than about 60 wt. % for a total weight of the (meth)acrylic based polymeric component B, such as, not greater than about 57 wt. % or not greater than about 55 wt. % or not greater than about 52 wt. % or not greater than about 50 wt. % or not greater than about 47 wt. % or not greater than about 45 wt. % or not greater than about 42 wt. % or not greater than about 40 wt. % or not greater than about 37 wt. % or not greater than about 35 wt. % or not greater than about 32 wt. % or not greater than about 30 wt. % or not greater than about 27 wt. % or not greater than about 25 wt. % or not greater than about 23 wt. % or not greater than about 20 wt. %. It will be appreciated that the content of the monomer component b2 in the (meth)acrylic based polymeric component B may be within a range between any of the minimum and maximum values noted above. It will be further appreciated that the content of the content of the monomer component b2 in the (meth)acrylic based polymeric component B may be any value between any of the minimum and maximum values noted above.

According to still other embodiments, the (meth)acrylic based polymeric component B may further include a monomer component b3. According to particular embodiments, the monomer component b3 may be different than both the monomer component b 1 and the monomer component b2. According to particular embodiments, component b3 may form favorable interactions with component b2. Such favorable interactions may include, but are not limited to, hydrogen bonding, acid-base pairs, or ion pairs or their combinations. Useful monomers for b3 exclude any acidic monomers.

According to still other embodiments, the (meth)acrylic based polymeric component B may include a particular content of the monomer component b3. For example, the content of the monomer component b3 in the (meth)acrylic based polymeric component B may be at least about 0.1 wt. % for a total weight of the (meth)acrylic based polymeric component B, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component b3 in the (meth)acrylic based polymeric component B may be not greater than about 60 wt. % for a total weight of the (meth)acrylic based polymeric component B, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component b3 in the (meth)acrylic based polymeric component B may be within a range between any of the minimum and maximum values noted above. It will be further appreciated that the content of the content of the monomer component b3 in the (meth)acrylic based polymeric component B may be any value between any of the minimum and maximum values noted above.

According to certain embodiments, the tackifier component may include C5, C9, C5/C9, dicyclopentadiene, terpene, or their hydrogenated resins, or combinations thereof.

According to yet other embodiments, the adhesive composition may include a particular content of the tackifier component. For example, the content of the tackifier component in the adhesive composition may be at least about at least about 0.1 wt. % for a total weight of the adhesive composition, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the tackifier component in the adhesive composition may be not greater than about 30 wt. % for a total weight of the adhesive composition, such as, not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the tackifier component in the adhesive composition may be within a range between any of the minimum and maximum values noted above. It will be further appreciated that the content of the tackifier component in the adhesive composition may be any value between any of the minimum and maximum values noted above.

According to still other embodiments, the adhesive formed according to embodiments described herein may be applied as an adhesive layer on a substrate to form a tape. According to more particular embodiments, the substrate of the tape may include any material selected from the group of polytetrafluoroethylene, polyethylene terephthalate, polyethylene, polypropylene, polyvinyl chloride, polyimide, polyethylene naphthalate, polyphenylene Sulfide, ethylene tetrafluoroethylene, fluorinated ethylene propylene, aluminum foil or combinations thereof.

Referring now to a monolayer foam tape, embodiments described herein may further be generally directed to a monolayer foam tape that includes the adhesive composition formed according to embodiments described herein.

Figure 2:
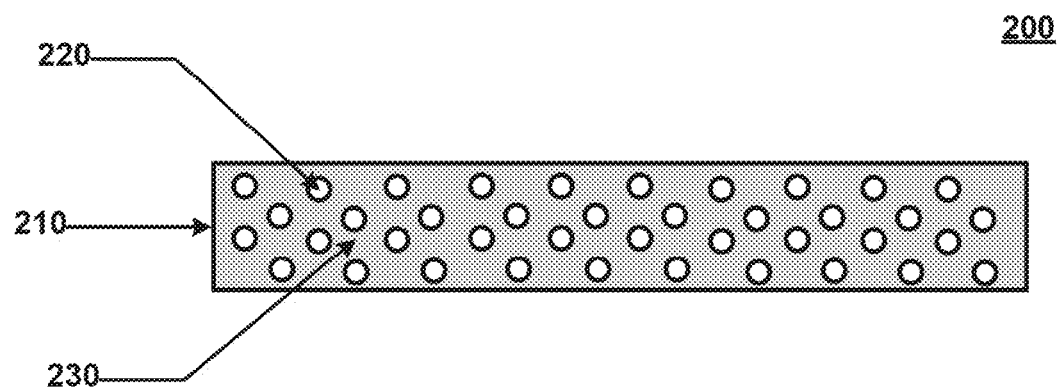
FIG. 2 includes an illustration showing the configuration of a monolayer foam tape formed according to embodiments described herein.

For purposes of illustration, FIG. 2 includes an illustration showing the configuration of a monolayer foam tape 200 formed according to embodiments described herein. As shown in FIG. 2, the monolayer foam tape 200 may include a foam core 210. The foam core 210 may include hollow microspheres 220 within an adhesive composition 230.

According to certain embodiments, the monolayer foam tape 200 may have a particular thickness. For example, the monolayer foam tape 200 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the monolayer foam tape 200 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the monolayer foam tape 200 may be within a range between any of the minimum and maximum values noted above. It will be further appreciated that the thickness of the monolayer foam tape 200 may be any value between any of the minimum and maximum values noted above.

According to certain embodiments, the foam core 210 may have a particular thickness. For example, the foam core 210 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the foam core 210 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the foam core 210 may be within a range between any of the minimum and maximum values noted above. It will be further appreciated that the thickness of the foam core 210 may be any value between any of the minimum and maximum values noted above.

According to particular embodiments, the hollow microspheres 220 may be a particular material. For example, the hollow microspheres 220 may be glass beads. According to still other embodiments, the hollow microspheres 220 may be polymeric microspheres. According to yet other embodiments, the hollow microspheres 220 may be a combination of glass beads and polymeric microspheres.

Referring now to the adhesive composition 230 formed according to embodiments described herein, the adhesive composition 230 may include a (meth)acrylic based polymeric component A, a (meth)acrylic based polymeric component B, and a tackifier component.

According to particular embodiments, the (meth)acrylic based polymeric component A of the adhesive composition 230 may be referred as a high glass transition temperature (Tg) (meth)acrylic based polymeric component. According to still other embodiments, the (meth)acrylic based polymeric component A of the adhesive composition 230 may have a particular glass transition temperature (Tg) as estimated by the Fox Equation, based on the Tgs of the homopolymer of constituent monomers and the weight percent thereof. For example, the (meth)acrylic based polymeric component A of the adhesive composition 230 may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or even at least about 80° C. It will be appreciated that the glass transition temperature of the (meth)acrylic based polymeric component A of the adhesive composition 230 may be within a range between any of the values noted above. It will be further appreciated that the glass transition temperature of the (meth)acrylic based polymeric component A of the adhesive composition 230 may be any value between any of the values noted above.

According to still other embodiments, the (meth)acrylic based polymeric component A of the adhesive composition 230 may have a particular molecular weight. For example, the (meth)acrylic based polymeric component A of the adhesive composition 230 may have a molecular weight of at least about 5,000 g/mol, such as, at least about 6,000 g/mol or at least about 7,000 g/mol or at least about 8,000 g/mol or at least about 9,000 g/mol or at least about 10,000 g/mol or at least about 11,000 g/mol or at least about 12,000 g/mol or at least about 13,000 g/mol or at least about 14,000 g/mol or at least about 15,000 g/mol or at least about 16,000 g/mol or at least about 17,000 g/mol or at least about 18,000 g/mol or at least about 19,000 g/mol or even at least about 20,000 g/mol. According to still other embodiments, the (meth)acrylic based polymeric component A of the adhesive composition 230 may have a molecular weight of not greater than about 200,000 g/mol, such as, not greater than about 150,000 g/mol or even not greater than about 100,000 g/mol. It will be appreciated that the molecular weight of the (meth)acrylic based polymeric component A of the adhesive composition 230 may be within a range between any of the minimum and maximum values noted above. It will be further appreciated that the molecular weight of the (meth)acrylic based polymeric component A of the adhesive composition 230 may be any value between any of the minimum and maximum values noted above.

According to still other embodiments, the (meth)acrylic based polymeric component A of the adhesive composition 230 may contain a very low level of acidic monomers, or may even be free of any acidic monomers. According to certain embodiments, the level of acidic monomers in the (meth)acrylic based polymeric component A of the adhesive composition 230 may be not greater than about 10% by weight, such as, not greater than about 5% by weight, or even not greater than about 0% by weight. Accordingly, the overall level of acidic monomers in the adhesive may be not greater than about 2% by weight, such as, not greater than about 1% by weight, or even not greater than about 0% by weight.

According to particular embodiments, the (meth)acrylic based polymeric component B of the adhesive composition 230 may be referred as a low glass transition temperature (Tg) (meth)acrylic based polymeric component. According to still other embodiments, the (meth)acrylic based polymeric component B of the adhesive composition 230 may have a particular glass transition temperature (Tg) as estimated by the Fox Equation, based on the Tgs of the homopolymer of constituent monomers and the weight percent thereof. For example, the (meth)acrylic based polymeric component B of the adhesive composition 230 may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the (meth)acrylic based polymeric component B of the adhesive composition 230 may be within a range between any of the values noted above. It will be further appreciated that the glass transition temperature of the (meth)acrylic based polymeric component B of the adhesive composition 230 may be any value between any of the values noted above.

According to still other embodiments, the (meth)acrylic based polymeric component B of the adhesive composition 230 may have a particular molecular weight. For example, the (meth)acrylic based polymeric component A of the adhesive composition 230 may have a molecular weight of at least about 100,000 g/mol, such as, at least about 110,000 g/mol or at least about 120,000 g/mol or at least about 130,000 g/mol or at least about 140,000 g/mol or at least about 150,000 g/mol or at least about 160,000 g/mol or at least about 170,000 g/mol or at least about 180,000 g/mol or at least about 190,000 g/mol or even at least about 200,000 g/mol. It will be appreciated that the molecular weight of the (meth)acrylic based polymeric component B of the adhesive composition 230 may be within a range between any of the minimum and maximum values noted above. It will be further appreciated that the molecular weight of the (meth)acrylic based polymeric component B of the adhesive composition 230 may be any value between any of the minimum and maximum values noted above.

According to still other embodiments, the (meth)acrylic based polymeric component B of the adhesive composition 230 may be acid-free. For purposes of embodiments described herein, the term "acid-free" may be defined as having no acid functional monomers. According to certain embodiments, the overall level of acidic monomers in the adhesive may be not greater than about 2% by weight, such as, not greater than about 1% by weight, or even not greater than about 0% by weight.

According to yet other embodiments, the adhesive composition 230 may include a particular content of the (meth)acrylic based polymeric component A of the adhesive composition 230. For example, the content of the (meth)acrylic based polymeric component A of the adhesive composition 230 in the adhesive composition 230 may be at least about 2.0 wt. % for a total weight of the adhesive composition 230, such as, at least about 2.5 wt. % or at least about 3.0 wt. % or at least about or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.5 wt. % or at least about 9.0 wt. % or at least about 9.5 wt. % or even at least about 10.0 wt. %. According to still other embodiments, the content of the (meth)acrylic based polymeric component A of the adhesive composition 230 in the adhesive composition 230 may be not greater than about 49.0 wt. % for a total weight of the adhesive composition 230, such as, not greater than about 47.0 wt. % or not greater than about 45.0 wt. % or not greater than about 42.0 wt. % or not greater than about 40.0 wt. % or not greater than about 37.0 wt. % or not greater than about 35.0 wt. % or not greater than about 32.0 wt. % or not greater than about 30.0 wt. % or not greater than about 27.0 wt. % or not greater than about 25.0 wt. % or not greater than about 22.0 wt. % or not greater than about 20.0 wt. % or not greater than about 17.0 wt. % or not greater than about 15.0 wt. % or even not greater than about 12.0 wt. %. It will be appreciated that the content of the (meth)acrylic based polymeric component A of the adhesive composition 230 in the adhesive composition 230 may be within a range between any of the minimum and maximum values noted above. It will be further appreciated that the content of the (meth)acrylic based polymeric component A of the adhesive composition 230 in the adhesive composition 230 may be any value between any of the minimum and maximum values noted above.

According to still other embodiments, the (meth)acrylic based polymeric component A of the adhesive composition 230 may include a monomer component a1 and a monomer component a2.

According to certain embodiments, the monomer component a1 may be an ethylenically unsaturated monomer. According to still other embodiments, the monomer component a1 may include, but is not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, and propyl methacrylate, admantyl acrylate, norbornyl acrylate, or mixtures thereof.

According to still other embodiments, the monomer component a2 may be an acidic monomer or a non-acidic functional polar monomer.

According to certain embodiments, the monomer component a2 may be an acidic monomer selected from ethylenically unsaturated carboxylic acids, ethylenically unsaturated sulfonic acids, ethylenically unsaturated phosphonic acids, and mixtures thereof. According to still other embodiments, the monomer component a2 may include an acidic monomer selected from, but is not limited to, an acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, or mixtures thereof.

According to certain embodiments, the monomer component a2 may be a non-acidic functional monomers selected from, but are not limited to, hydroxyl containing (meth) acrylic monomers, and nitrogen-containing monomers having a primary, secondary or tertiary amino groups, or an N,N-dialkylaminoalkyl (meth)acrylate. According to certain embodiments, the monomer component a2 may be a non-acidic functional monomers selected from, but are not limited to, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the monomer component a2 may be N-hydroxyalkyl (meth)acrylamide. The N-hydroxyalkyl (meth)acrylamide may be represented by the following formula: $CH_2=C(R1)CONHR2$, where R1 represents a hydrogen atom or methyl group, and R2 represents an alkyl group having 1 to 8 carbon atoms and at least one hydroxyl group. According to certain embodiments, the monomer component a2 may be selected from, but are not limited to, n-hydroxymethyl acrylamide, n-hydroxymethyl methacrylamide n-hydroxyethyl acrylamide, n-hydroxyethyl methacrylamide, or mixtures thereof.

According to still other embodiments, the (meth)acrylic based polymeric component A of the adhesive composition 230 may include a particular content of the monomer component a1. For example, the content of the monomer component a1 in the (meth)acrylic based polymeric component A of the adhesive composition 230 may be at least about 40 wt. % for a total weight of the (meth)acrylic based polymeric component A of the adhesive composition 230, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the monomer component a1 in the (meth)acrylic based polymeric component A of the adhesive composition 230 may be not greater than about 99 wt. % for a total weight of the (meth)acrylic based polymeric component A of the adhesive composition 230, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component a1 in the (meth)acrylic based polymeric component A of the adhesive composition 230 may be within a range between any of the minimum and maximum values noted above. It will be further appreciated that the content of the content of the monomer component a1 in the (meth)acrylic based polymeric component A of the adhesive composition 230 may be any value between any of the minimum and maximum values noted above.

According to still other embodiments, the (meth)acrylic based polymeric component A of the adhesive composition 230 may include a particular content of the monomer component a2. For example, the content of the monomer component a2 in the (meth)acrylic based polymeric component A of the adhesive composition 230 may be at least about 0.1 wt. % for a total weight of the (meth)acrylic based polymeric component A of the adhesive composition 230, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a2 in the (meth)acrylic based polymeric component A of the adhesive composition 230 may be not greater than about 20.0 wt. % for a total weight of the (meth)acrylic based polymeric component A of the adhesive composition 230, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or not greater than about 12.0 wt. %. It will be appreciated that the content of the monomer component a2 in the (meth)acrylic based polymeric component A of the adhesive composition 230 may be within a range between any of the minimum and maximum values noted above. It will be further appreciated that the content of the content of the monomer component a2 in the (meth)acrylic based polymeric component A of the adhesive composition 230 may be any value between any of the minimum and maximum values noted above.

According to still other embodiments, the (meth)acrylic based polymeric component A of the adhesive composition 230 may further include a monomer component a3. According to particular embodiments, the monomer component a3 may be different than both the monomer component a1 and the monomer component a2. According to still other embodiments, component a2 and a3 may interact to strengthen the cohesion of component A in the final adhesive. Such interactions include, but are not limited to, hydrogen bonding, acid-base pairs, ion pairs, or combination thereof.

According to certain embodiments, the monomer component a3 may be an ethylenically unsaturated monomer. According to still other embodiments, the monomer component a3 may include an acidic monomer having an acidic group and an ethylenically unsaturated group. According to certain embodiments, the monomer component a3 may include, but are not limited to, those selected from ethylenically unsaturated carboxylic acids, ethylenically unsaturated sulfonic acids, ethylenically unsaturated phosphonic acids, and mixtures thereof. Examples of such compounds include, but are not limited to, those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid or mixtures thereof.

According to still other embodiments, the monomer component a3 may include a hydroxy-containing acrylic ester monomer having a hydroxyl group and an ethylenically unsaturated group. According to certain embodiments, the monomer component a3 may include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, n-hydroxymethyl acrylamide, n-hydroxyethyl acrylamide and mixtures thereof. According to still other embodiments, the monomer component a3 may include a nitrogen-containing monomer having a primary, secondary or a tertiary amino group or an N, N-dialkylaminoalkyl (meth)acrylate and a ethylenically unsaturated group.

According to still other embodiments, the monomer component a3 may include a vinyl monomer. According to certain embodiments, the monomer component a3 may include, but are not limited to, but are not limited to, those selected from N-methyl acrylamide, N-ethyl acrylamide, N-hexyl acrylamide, N-octyl acrylamide, t-butyl acrylamide, N,N-dimethyl acrylamide, N,N~dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido) ethyl acrylate, dimethylaminoethyl acrylamide, N-vinylpyrrolidone; N-vinylcaprolactam, acrylamide or mixtures thereof.

According to still other embodiments, the (meth)acrylic based polymeric component A of the adhesive composition 230 may include a particular content of the monomer component a3. For example, the content of the monomer component a3 in the (meth)acrylic based polymeric component A of the adhesive composition 230 may be at least about 0.1 wt. % for a total weight of the (meth)acrylic based polymeric component A of the adhesive composition 230, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a3 in the (meth)acrylic based polymeric component A of the adhesive composition 230 may be not greater than about 60 wt. % for a total weight of the (meth)acrylic based polymeric component A of the adhesive composition 230, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component a3 in the (meth)acrylic based polymeric component A of the adhesive composition 230 may be within a range between any of the minimum and maximum values noted above. It will be further appreciated that the content of the content of the monomer component a3 in the (meth) acrylic based polymeric component A of the adhesive composition 230 may be any value between any of the minimum and maximum values noted above.

According to yet other embodiments, the adhesive composition 230 may include a particular content of the (meth) acrylic based polymeric component B of the adhesive composition 230. For example, the content of the (meth)acrylic based polymeric component B of the adhesive composition 230 in the adhesive composition 230 may be at least about 51 wt. % for a total weight of the adhesive composition 230, such as, at least about 53 wt. % or at least about 55 wt. % or at least about or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to still other embodiments, the content of the (meth)acrylic based polymeric component B of the adhesive composition 230 in the adhesive composition 230 may be not greater than about 98 wt. % for a total weight of the adhesive composition 230, such as, not greater than about 95 wt. % or not greater than about 92 wt. % or not greater than about 90 wt. % or not greater than about 87 wt. % or not greater than about 85 wt. % or not greater than about 82 wt. % or even not greater than about 80 wt. %. It will be appreciated that the content of the (meth)acrylic based polymeric component B of the adhesive composition 230 in the adhesive composition 230 may be within a range between any of the minimum and maximum values noted above. It will be further appreciated that the content of the (meth)acrylic based polymeric component B of the adhesive composition 230 in the adhesive composition 230 may be any value between any of the minimum and maximum values noted above.

According to still other embodiments, the (meth)acrylic based polymeric component B of the adhesive composition 230 may include a monomer component b1 and a monomer component b2.

According to certain embodiments, the monomer component b1 may be a C1-C24 acrylic ester, methacrylate ester or mixtures thereof. According to still other embodiments, the alkyl group of component b1 can be straight-chained, branched with one or more branching sites, or cyclic. According to yet other embodiments, the alkyl groups may include, but are not limited to, those selected from methyl, ethyl, propyl, isopropyl, butyl, isobutyl, pentyl, 2-pentyl, hexyl, heptyl, octyl, isooctyl, 2-ethylhexyl, tert-octyl, nonyl, decyl, 2-propylheptyl, undecyl, tridecyl acrylate, (2-isopropyl-5-methyl)hexyl, tetradecyl, hexadecyl, octadecyl, branched alkyl group having 16 to 22 C atoms and including at least two branching sites, phenyl, benzyl, cyclohexyl, isobornyl, admantyl, 3,3,5 trimethylcyclohexyl, norbornyl or mixtures thereof. According to particular embodiments, the alkyl groups may include, but are not limited to, those selected from butyl, isooctyl and 2-ethylhexyl.

According to still other embodiments, the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate. According to still other embodiments, component b2 may form hydrogen bonding within component B, or form favorable interactions with component A. Such favorable interactions of component b2 with component A include, but are not limited to, hydrogen bonding, acid-base pairs, ion pairs, and combination thereof. Useful monomers for b2 include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the (meth)acrylic based polymeric component B of the adhesive composition 230 may include a particular content of the monomer component b1. For example, the content of the monomer component b1 in the (meth)acrylic based polymeric component B of the adhesive composition 230 may be at least about 40 wt. % for a total weight of the (meth)acrylic based polymeric component B of the adhesive composition 230, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the monomer component b1 in the (meth)acrylic based polymeric component B of the adhesive composition 230 may be not greater than about 99 wt. % for a total weight of the (meth)acrylic based polymeric component B of the adhesive composition 230, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component b1 in the (meth)acrylic based polymeric component B of the adhesive composition 230 may be within a range between any of the minimum and maximum values noted above. It will be further appreciated that the content of the content of the monomer component b 1 in the (meth)acrylic based polymeric component B of the adhesive composition 230 may be any value between any of the minimum and maximum values noted above.

According to still other embodiments, the (meth)acrylic based polymeric component B of the adhesive composition 230 may include a particular content of the monomer component b2. For example, the content of the monomer component b2 in the (meth)acrylic based polymeric component B of the adhesive composition 230 may be at least about 1 wt. % for a total weight of the (meth)acrylic based polymeric component B of the adhesive composition 230, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to yet other embodiments, the content of the monomer component b2 in the (meth)acrylic based polymeric component B of the adhesive composition 230 may be not greater than about 60 wt. % for a total weight of the (meth)acrylic based polymeric component B of the adhesive composition 230, such as, not greater than about 57 wt. % or not greater than about 55 wt. % or not greater than about 52 wt. % or not greater than about 50 wt. % or not greater than about 47 wt. % or not greater than about 45 wt. % or not greater than about 42 wt. % or not greater than about 40 wt. % or not greater than about 37 wt. % or not greater than about 35 wt. % or not greater than about 32 wt. % or not greater than about 30 wt. % or not greater than about 27 wt. % or not greater than about 25 wt. % or not greater than about 23 wt. % or not greater than about 20 wt. %. It will be appreciated that the content of the monomer component b2 in the (meth)acrylic based polymeric component B of the adhesive composition 230 may be within a range between any of the minimum and maximum values noted above. It will be further appreciated that the content of the content of the monomer component b2 in the (meth)acrylic based polymeric component B of the adhesive composition 230 may be any value between any of the minimum and maximum values noted above.

According to still other embodiments, the (meth)acrylic based polymeric component B of the adhesive composition 230 may further include a monomer component b3. According to particular embodiments, the monomer component b3 may be different than both the monomer component b1 and the monomer component b2. According to particular embodiments, component b3 may form favorable interactions with component b2. Such favorable interactions may include, but are not limited to, hydrogen bonding, acid-base pairs, or ion pairs or their combinations. Useful monomers for b3 exclude any acidic monomers.

According to still other embodiments, the (meth)acrylic based polymeric component B of the adhesive composition 230 may include a particular content of the monomer component b3. For example, the content of the monomer component b3 in the (meth)acrylic based polymeric component B of the adhesive composition 230 may be at least about 0.1 wt. % for a total weight of the (meth)acrylic based polymeric component B of the adhesive composition 230, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component b3 in the (meth)acrylic based polymeric component B of the adhesive composition 230 may be not greater than about 60 wt. % for a total weight of the (meth)acrylic based polymeric component B of the adhesive composition 230, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component b3 in the (meth)acrylic based polymeric component B of the adhesive composition 230 may be within a range between any of the minimum and maximum values noted above. It will be further appreciated that the content of the content of the monomer component b3 in the (meth)acrylic based polymeric component B of the adhesive composition 230 may be any value between any of the minimum and maximum values noted above.

According to certain embodiments, the tackifier component of the adhesive composition 230 may include C5, C9, C5/C9, dicyclopentadiene, terpene, or their hydrogenated resins, or combinations thereof.

According to yet other embodiments, the adhesive composition 230 may include a particular content of the tackifier component of the adhesive composition 230. For example, the content of the tackifier component of the adhesive composition 230 in the adhesive composition 230 may be at least about at least about 0.1 wt. % for a total weight of the adhesive composition 230, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the tackifier component of the adhesive composition 230 in the adhesive composition 230 may be not greater than about 30 wt. % for a total weight of the adhesive composition 230, such as, not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the tackifier component in the adhesive composition 230 may be within a range between any of the minimum and maximum values noted above. It will be further appreciated that the content of the tackifier component in the adhesive composition 230 may be any value between any of the minimum and maximum values noted above.

Referring now to a foam tape, embodiments described herein may further be generally directed to a foam tape that includes a foam core and at least a first adhesive layer overlying a first surface of the foam core where the first adhesive layer includes the adhesive composition formed according to embodiments described herein.

Figure 3:
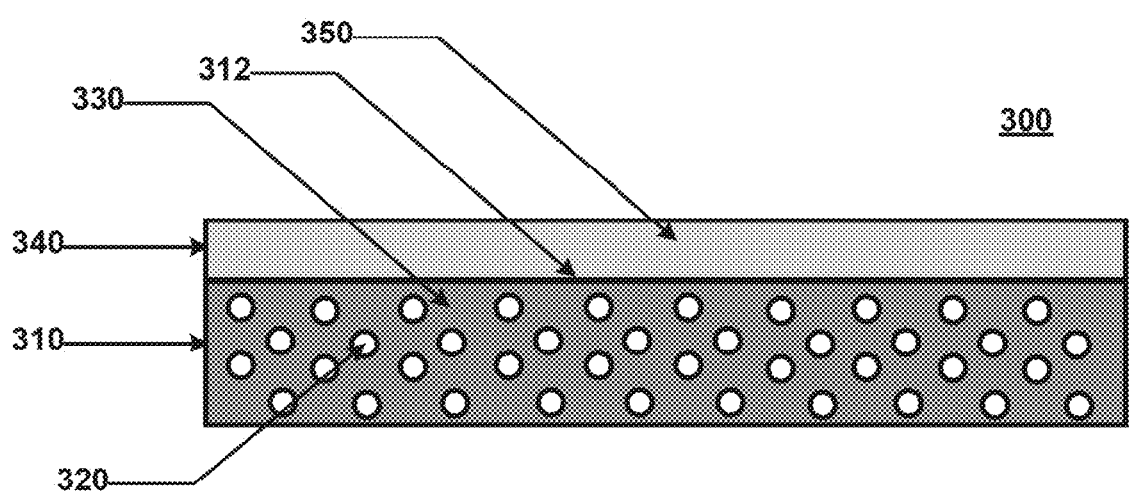
FIG. 3 includes an illustration showing the configuration of a foam tape having a single adhesive layer formed according to embodiments described herein.

For purposes of illustration, FIG. 3 includes an illustration showing the configuration of a foam tape 300 formed according to embodiments described herein. Foam tape 300 may include a foam core 310 and a first adhesive layer 340 overlying a first surface 312 of the foam core 310. The foam core 310 may include hollow microspheres 320 within a foam material 330. The first adhesive layer 340 may include a first adhesive composition 350.

According to certain embodiments, the foam tape 300 may have a particular thickness. For example, the foam tape 300 may have a thickness of at least about 0.10 mm, such as, at least about 0.15 mm or at least about 0.20 mm or at least about 0.25 mm or at least about 0.30 mm or at least about 0.35 mm or at least about 0.40 mm or at least about 0.45 mm or even at least about 0.50 mm. It will be appreciated that the thickness of the foam core 300 may be within a range between any of the values noted above. It will be further appreciated that the thickness of the foam tape 300 may be any value between any of the values noted above.

According to certain embodiments, the foam core 310 may have a particular thickness. For example, the foam core 310 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the foam core 310 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the foam core 310 may be within a range between any of the minimum and maximum values noted above. It will be further appreciated that the thickness of the foam core 310 may be any value between any of the minimum and maximum values noted above.

According to particular embodiments, the hollow microspheres 320 may be a particular material. For example, the hollow microspheres 320 may be glass beads. According to still other embodiments, the hollow microspheres 320 may be polymeric microspheres. According to yet other embodiments, the hollow microspheres 320 may be a combination of glass beads and polymeric microspheres.

According to still other embodiments, the foam material 330 may be a particular material. For example, the foam material 330 may be an acrylic material. According to still other embodiments, the foam material 330 may be a polyurethane material. According to yet other embodiments, the foam material 330 may be a polyethylene material. According to still other embodiments, the foam material 330 may be a PVC material. According to other embodiments, the foam material 330 may be any combination an acrylic material, a polyurethane material, a polyethylene material, or a PVC material.

According to still other embodiments, the foam material 330 may be an acrylic foam. According to yet other embodiments, the foam material 330 may be a polyurethane foam.

According to certain embodiments, the first adhesive layer 340 may have a particular thickness. For example, the first adhesive layer 340 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the first adhesive layer 340 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the first adhesive layer 340 may be within a range between any of the minimum and maximum values noted above. It will be further appreciated that the thickness of the first adhesive layer 340 may be any value between any of the minimum and maximum values noted above.

Referring now to the first adhesive composition 350 of the first adhesive layer 340 formed according to embodiments described herein, the first adhesive composition 350 may include a (meth)acrylic based polymeric component A, a (meth)acrylic based polymeric component B, and a tackifier component.

According to particular embodiments, the (meth)acrylic based polymeric component A of the first adhesive composition 350 may be referred as a high glass transition temperature (Tg) (meth)acrylic based polymeric component. According to still other embodiments, the (meth)acrylic based polymeric component A of the first adhesive composition 350 may have a particular glass transition temperature (Tg) as estimated by the Fox Equation, based on the Tgs of the homopolymer of constituent monomers and the weight percent thereof. For example, the (meth)acrylic based polymeric component A of the first adhesive composition 350 may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or even at least about 80° C. It will be appreciated that the glass transition temperature of the (meth)acrylic based polymeric component A of the first adhesive composition 350 may be within a range between any of the values noted above. It will be further appreciated that the glass transition temperature of the (meth)acrylic based polymeric component A of the first adhesive composition 350 may be any value between any of the values noted above.

According to still other embodiments, the (meth)acrylic based polymeric component A of the first adhesive composition 350 may have a particular molecular weight. For example, the (meth)acrylic based polymeric component A of the first adhesive composition 350 may have a molecular weight of at least about 5,000 g/mol, such as, at least about 6,000 g/mol or at least about 7,000 g/mol or at least about 8,000 g/mol or at least about 9,000 g/mol or at least about 10,000 g/mol or at least about 11,000 g/mol or at least about 12,000 g/mol or at least about 13,000 g/mol or at least about 14,000 g/mol or at least about 15,000 g/mol or at least about 16,000 g/mol or at least about 17,000 g/mol or at least about 18,000 g/mol or at least about 19,000 g/mol or even at least about 20,000 g/mol. According to still other embodiments, the (meth)acrylic based polymeric component A of the first adhesive composition 350 may have a molecular weight of not greater than about 200,000 g/mol, such as, not greater than about 150,000 g/mol or even not greater than about 100,000 g/mol. It will be appreciated that the molecular weight of the (meth)acrylic based polymeric component A of the first adhesive composition 350 may be within a range between any of the minimum and maximum values noted above. It will be further appreciated that the molecular weight of the (meth)acrylic based polymeric component A of the first adhesive composition 350 may be any value between any of the minimum and maximum values noted above.

According to still other embodiments, the (meth)acrylic based polymeric component A of the first adhesive composition 350 may contain a very low level of acidic monomers, or may even be free of any acidic monomers. According to certain embodiments, the level of acidic monomers in the (meth)acrylic based polymeric component A of the first adhesive composition 350 may be not greater than about 10% by weight, such as, not greater than about 5% by weight, or even not greater than about 0% by weight. Accordingly, the overall level of acidic monomers in the adhesive may be not greater than about 2% by weight, such as, not greater than about 1% by weight, or even not greater than about 0% by weight.

According to particular embodiments, the (meth)acrylic based polymeric component B of the first adhesive composition 350 may be referred as a low glass transition temperature (Tg) (meth)acrylic based polymeric component. According to still other embodiments, the (meth)acrylic based polymeric component B of the first adhesive composition 350 may have a particular glass transition temperature (Tg) as estimated by the Fox Equation, based on the Tgs of the homopolymer of constituent monomers and the weight percent thereof. For example, the (meth)acrylic based polymeric component B of the first adhesive composition 350 may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the (meth)acrylic based polymeric component B of the first adhesive composition 350 may be within a range between any of the values noted above. It will be further appreciated that the glass transition temperature of the (meth)acrylic based polymeric component B of the first adhesive composition 350 may be any value between any of the values noted above.

According to still other embodiments, the (meth)acrylic based polymeric component B of the first adhesive composition 350 may have a particular molecular weight. For example, the (meth)acrylic based polymeric component A of the first adhesive composition 350 may have a molecular weight of at least about 100,000 g/mol, such as, at least about 110,000 g/mol or at least about 120,000 g/mol or at least about 130,000 g/mol or at least about 140,000 g/mol or at least about 150,000 g/mol or at least about 160,000 g/mol or at least about 170,000 g/mol or at least about 180,000 g/mol or at least about 190,000 g/mol or even at least about 200,000 g/mol. It will be appreciated that the molecular weight of the (meth)acrylic based polymeric component B of the first adhesive composition 350 may be within a range between any of the minimum and maximum values noted above. It will be further appreciated that the molecular weight of the (meth)acrylic based polymeric component B of the first adhesive composition 350 may be any value between any of the minimum and maximum values noted above.

According to still other embodiments, the (meth)acrylic based polymeric component B of the first adhesive composition 350 may be acid-free. For purposes of embodiments described herein, the term "acid-free" may be defined as having no acid functional monomers. According to certain embodiments, the overall level of acidic monomers in the adhesive may be not greater than about 2% by weight, such as, not greater than about 1% by weight, or even not greater than about 0% by weight.

According to yet other embodiments, the first adhesive composition 350 may include a particular content of the (meth)acrylic based polymeric component A of the first adhesive composition 350. For example, the content of the (meth)acrylic based polymeric component A of the first adhesive composition 350 in the first adhesive composition 350 may be at least about 2.0 wt. % for a total weight of the first adhesive composition 350, such as, at least about 2.5 wt. % or at least about 3.0 wt. % or at least about or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.5 wt. % or at least about 9.0 wt. % or at least about 9.5 wt. % or even at least about 10.0 wt. %. According to still other embodiments, the content of the (meth)acrylic based polymeric component A of the first adhesive composition 350 in the first adhesive composition 350 may be not greater than about 49.0 wt. % for a total weight of the first adhesive composition 350, such as, not greater than about 47.0 wt. % or not greater than about 45.0 wt. % or not greater than about 42.0 wt. % or not greater than about 40.0 wt. % or not greater than about 37.0 wt. % or not greater than about 35.0 wt. % or not greater than about 32.0 wt. % or not greater than about 30.0 wt. % or not greater than about 27.0 wt. % or not greater than about 25.0 wt. % or not greater than about 22.0 wt. % or not greater than about 20.0 wt. % or not greater than about 17.0 wt. % or not greater than about 15.0 wt. % or even not greater than about 12.0 wt. %. It will be appreciated that the content of the (meth)acrylic based polymeric component A in the first adhesive composition 350 may be within a range between any of the minimum and maximum values noted above. It will be further appreciated that the content of the (meth)acrylic based polymeric component A in the first adhesive composition 350 may be any value between any of the minimum and maximum values noted above.

According to still other embodiments, the (meth)acrylic based polymeric component A of the first adhesive composition 350 may include a monomer component a1 and a monomer component a2.

According to certain embodiments, the monomer component a1 may be an ethylenically unsaturated monomer. According to still other embodiments, the monomer component a1 may include, but is not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, and propyl methacrylate, admantyl acrylate, norbornyl acrylate, or mixtures thereof.

According to still other embodiments, the monomer component a2 may be an acidic monomer or a non-acidic functional polar monomer.

According to certain embodiments, the monomer component a2 may be an acidic monomer selected from ethylenically unsaturated carboxylic acids, ethylenically unsaturated sulfonic acids, ethylenically unsaturated phosphonic acids, and mixtures thereof. According to still other embodiments, the monomer component a2 may include an acidic monomer selected from, but is not limited to, an acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, or mixtures thereof.

According to certain embodiments, the monomer component a2 may be a non-acidic functional monomers selected from, but are not limited to, hydroxyl containing (meth) acrylic monomers, and nitrogen-containing monomers having a primary, secondary or tertiary amino groups, or an N,N-dialkylaminoalkyl (meth)acrylate. According to certain embodiments, the monomer component a2 may be a non-acidic functional monomers selected from, but are not limited to, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the monomer component a2 may be N-hydroxyalkyl (meth)acrylamide. The N-hydroxyalkyl (meth)acrylamide may be represented by the following formula: $CH_2=C(R1)CONHR2$, where R1 represents a hydrogen atom or methyl group, and R2 represents an alkyl group having 1 to 8 carbon atoms and at least one hydroxyl group. According to certain embodiments, the monomer component a2 may be selected from, but are not limited to, n-hydroxymethyl acrylamide, n-hydroxymethyl methacrylamide n-hydroxyethyl acrylamide, n-hydroxyethyl methacrylamide, or mixtures thereof.

According to still other embodiments, the (meth)acrylic based polymeric component A of the first adhesive composition 350 may include a particular content of the monomer component a1. For example, the content of the monomer component a1 in the (meth)acrylic based polymeric component A of the first adhesive composition 350 may be at least about 40 wt. % for a total weight of the (meth)acrylic based polymeric component A of the first adhesive composition 350, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the monomer component a1 in the (meth)acrylic based polymeric component A of the first adhesive composition 350 may be not greater than about 99 wt. % for a total weight of the (meth)acrylic based polymeric component A of the first adhesive composition 350, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component a1 in the (meth)acrylic based polymeric component A of the first adhesive composition 350 may be within a range between any of the minimum and maximum values noted above. It will be further appreciated that the content of the content of the monomer component a1 in the (meth) acrylic based polymeric component A of the first adhesive composition 350 may be any value between any of the minimum and maximum values noted above.

According to still other embodiments, the (meth)acrylic based polymeric component A of the first adhesive composition 350 may include a particular content of the monomer component a2. For example, the content of the monomer component a2 in the (meth)acrylic based polymeric component A of the first adhesive composition 350 may be at least about 0.1 wt. % for a total weight of the (meth)acrylic based polymeric component A of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a2 in the (meth)acrylic based polymeric component A of the first adhesive composition 350 may be not greater than about 20.0 wt. % for a total weight of the (meth)acrylic based polymeric component A of the first adhesive composition 350, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or not greater than about 12.0 wt. %. It will be appreciated that the content of the monomer component a2 in the (meth)acrylic based polymeric component A of the first adhesive composition 350 may be within a range between any of the minimum and maximum values noted above. It will be further appreciated that the content of the content of the monomer component a2 in the (meth)acrylic based polymeric component A of the first adhesive composition 350 may be any value between any of the minimum and maximum values noted above.

According to still other embodiments, the (meth)acrylic based polymeric component A of the first adhesive composition 350 may further include a monomer component a3. According to particular embodiments, the monomer component a3 may be different than both the monomer component a1 and the monomer component a2. According to still other embodiments, component a2 and a3 may interact to strengthen the cohesion of component A in the final adhesive. Such interactions include, but are not limited to, hydrogen bonding, acid-base pairs, ion pairs, or combination thereof.

According to certain embodiments, the monomer component a3 may be an ethylenically unsaturated monomer. According to still other embodiments, the monomer component a3 may include an acidic monomer having an acidic group and an ethylenically unsaturated group. According to certain embodiments, the monomer component a3 may include, but are not limited to, those selected from ethylenically unsaturated carboxylic acids, ethylenically unsaturated sulfonic acids, ethylenically unsaturated phosphonic acids, and mixtures thereof. Examples of such compounds include, but are not limited to, those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid or mixtures thereof.

According to still other embodiments, the monomer component a3 may include a hydroxy-containing acrylic ester monomer having a hydroxyl group and an ethylenically unsaturated group. According to certain embodiments, the monomer component a3 may include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, n-hydroxymethyl acrylamide, n-hydroxyethyl acrylamide and mixtures thereof. According to still other embodiments, the monomer component a3 may include a nitrogen-containing monomer having a primary, secondary or a tertiary amino group or an N, N-dialkylaminoalkyl (meth)acrylate and a ethylenically unsaturated group.

According to still other embodiments, the monomer component a3 may include a vinyl monomer. According to certain embodiments, the monomer component a3 may include, but are not limited to, but are not limited to, those selected from N-methyl acrylamide, N-ethyl acrylamide, N-hexyl acrylamide, N-octyl acrylamide, t-butyl acrylamide, N,N-dimethyl acrylamide, N,N~dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido) ethyl acrylate, dimethylaminoethyl acrylamide, N-vinylpyrrolidone; N-vinylcaprolactam, acrylamide or mixtures thereof.

According to still other embodiments, the (meth)acrylic based polymeric component A of the first adhesive composition 350 may include a particular content of the monomer component a3. For example, the content of the monomer component a3 in the (meth)acrylic based polymeric component A of the first adhesive composition 350 may be at least about 0.1 wt. % for a total weight of the (meth)acrylic based polymeric component A of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a3 in the (meth)acrylic based polymeric component A of the first adhesive composition 350 may be not greater than about 60 wt. % for a total weight of the (meth)acrylic based polymeric component A of the first adhesive composition 350, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component a3 in the (meth)acrylic based polymeric component A of the first adhesive composition 350 may be within a range between any of the minimum and maximum values noted above. It will be further appreciated that the content of the content of the monomer component a3 in the (meth) acrylic based polymeric component A of the first adhesive composition 350 may be any value between any of the minimum and maximum values noted above.

According to yet other embodiments, the first adhesive composition 350 may include a particular content of the (meth)acrylic based polymeric component B of the first adhesive composition 350. For example, the content of the (meth)acrylic based polymeric component B of the first adhesive composition 350 in the first adhesive composition 350 may be at least about 51 wt. % for a total weight of the first adhesive composition 350, such as, at least about 53 wt. % or at least about 55 wt. % or at least about or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to still other embodiments, the content of the (meth)acrylic based polymeric component B of the first adhesive composition 350 in the first adhesive composition 350 may be not greater than about 98 wt. % for a total weight of the first adhesive composition 350, such as, not greater than about 95 wt. % or not greater than about 92 wt. % or not greater than about 90 wt. % or not greater than about 87 wt. % or not greater than about 85 wt. % or not greater than about 82 wt. % or even not greater than about 80 wt. %. It will be appreciated that the content of the (meth)acrylic based polymeric component B of the first adhesive composition 350 in the first adhesive composition 350 may be within a range between any of the minimum and maximum values noted above. It will be further appreciated that the content of the (meth)acrylic based polymeric component B of the first adhesive composition 350 in the first adhesive composition 350 may be any value between any of the minimum and maximum values noted above.

According to still other embodiments, the (meth)acrylic based polymeric component B of the first adhesive composition 350 may include a monomer component b1 and a monomer component b2.

According to certain embodiments, the monomer component b1 may be a C1-C24 acrylic ester, methacrylate ester or mixtures thereof. According to still other embodiments, the alkyl group of component b1 can be straight-chained, branched with one or more branching sites, or cyclic. According to yet other embodiments, the alkyl groups may include, but are not limited to, those selected from methyl, ethyl, propyl, isopropyl, butyl, isobutyl, pentyl, 2-pentyl, hexyl, heptyl, octyl, isooctyl, 2-ethylhexyl, tert-octyl, nonyl, decyl, 2-propylheptyl, undecyl, tridecyl acrylate, (2-isopropyl-5-methyl)hexyl, tetradecyl, hexadecyl, octadecyl, branched alkyl group having 16 to 22 C atoms and including at least two branching sites, phenyl, benzyl, cyclohexyl, isobornyl, admantyl, 3,3,5 trimethylcyclohexyl, norbornyl or mixtures thereof. According to particular embodiments, the alkyl groups may include, but are not limited to, those selected from butyl, isooctyl and 2-ethylhexyl.

According to still other embodiments, the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate. According to still other embodiments, component b2 may form hydrogen bonding within component B, or form favorable interactions with component A. Such favorable interactions of component b2 with component A include, but are not limited to, hydrogen bonding, acid-base pairs, ion pairs, and combination thereof. Useful monomers for b2 include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylate, N-vinylpyrrolidone; N-vinylcaprolactam, acrylamide, n-hydroxymethyl acrylamide, n-hydroxyethyl acrylamide, or mixtures thereof.

According to still other embodiments, the (meth)acrylic based polymeric component B of the first adhesive composition 350 may include a particular content of the monomer component b1. For example, the content of the monomer component b1 in the (meth)acrylic based polymeric component B of the first adhesive composition 350 may be at least about 40 wt. % for a total weight of the (meth)acrylic based polymeric component B of the first adhesive composition 350, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the monomer component b1 in the (meth)acrylic based polymeric component B of the first adhesive composition 350 may be not greater than about 99 wt. % for a total weight of the (meth)acrylic based polymeric component B of the first adhesive composition 350, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component b1 in the (meth)acrylic based polymeric component B of the first adhesive composition 350 may be within a range between any of the minimum and maximum values noted above. It will be further appreciated that the content of the content of the monomer component b1 in the (meth)acrylic based polymeric component B of the first adhesive composition 350 may be any value between any of the minimum and maximum values noted above.

According to still other embodiments, the (meth)acrylic based polymeric component B of the first adhesive composition 350 may include a particular content of the monomer component b2. For example, the content of the monomer component b2 in the (meth)acrylic based polymeric component B of the first adhesive composition 350 may be at least about 1 wt. % for a total weight of the (meth)acrylic based polymeric component B of the first adhesive composition 350, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to yet other embodiments, the content of the monomer component b2 in the (meth)acrylic based polymeric component B of the first adhesive composition 350 may be not greater than about 60 wt. % for a total weight of the (meth)acrylic based polymeric component B of the first adhesive composition 350, such as, not greater than about 57 wt. % or not greater than about 55 wt. % or not greater than about 52 wt. % or not greater than about 50 wt. % or not greater than about 47 wt. % or not greater than about 45 wt. % or not greater than about 42 wt. % or not greater than about 40 wt. % or not greater than about 37 wt. % or not greater than about 35 wt. % or not greater than about 32 wt. % or not greater than about 30 wt. % or not greater than about 27 wt. % or not greater than about 25 wt. % or not greater than about 23 wt. % or not greater than about 20 wt. %. It will be appreciated that the content of the monomer component b2 in the (meth)acrylic based polymeric component B of the first adhesive composition 350 may be within a range between any of the minimum and maximum values noted above. It will be further appreciated that the content of the content of the monomer component b2 in the (meth)acrylic based polymeric component B of the first adhesive composition 350 may be any value between any of the minimum and maximum values noted above.

According to still other embodiments, the (meth)acrylic based polymeric component B of the first adhesive composition 350 may further include a monomer component b3. According to particular embodiments, the monomer component b3 may be different than both the monomer component b1 and the monomer component b2. According to particular embodiments, component b3 may form favorable interactions with component b2. Such favorable interactions may include, but are not limited to, hydrogen bonding, acid-base pairs, or ion pairs or their combinations. Useful monomers for b3 exclude any acidic monomers.

According to still other embodiments, the (meth)acrylic based polymeric component B of the first adhesive composition 350 may include a particular content of the monomer component b3. For example, the content of the monomer component b3 in the (meth)acrylic based polymeric component B of the first adhesive composition 350 may be at least about 0.1 wt. % for a total weight of the (meth)acrylic based polymeric component B of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component b3 in the (meth)acrylic based polymeric component B of the first adhesive composition 350 may be not greater than about 60 wt. % for a total weight of the (meth)acrylic based polymeric component B of the first adhesive composition 350, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component b3 in the (meth)acrylic based polymeric component B of the first adhesive composition 350 may be within a range between any of the minimum and maximum values noted above. It will be further appreciated that the content of the content of the monomer component b3 in the (meth)acrylic based polymeric component B of the first adhesive composition 350 may be any value between any of the minimum and maximum values noted above.

According to certain embodiments, the tackifier component of the first adhesive composition 350 may include C5, C9, C5/C9, dicyclopentadiene, terpene, or their hydrogenated resins, or combinations thereof.

According to yet other embodiments, the first adhesive composition 350 may include a particular content of the tackifier component of the first adhesive composition 350. For example, the content of the tackifier component of the first adhesive composition 350 in the first adhesive composition 350 may be at least about at least about 0.1 wt. % for a total weight of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the tackifier component of the first adhesive composition 350 in the first adhesive composition 350 may be not greater than about 30 wt. % for a total weight of the first adhesive composition 350, such as, not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the tackifier component of the first adhesive composition 350 in the first adhesive composition 350 may be within a range between any of the minimum and maximum values noted above. It will be further appreciated that the content of the tackifier component of the first adhesive composition 350 in the first adhesive composition 350 may be any value between any of the minimum and maximum values noted above.

Figure 4:
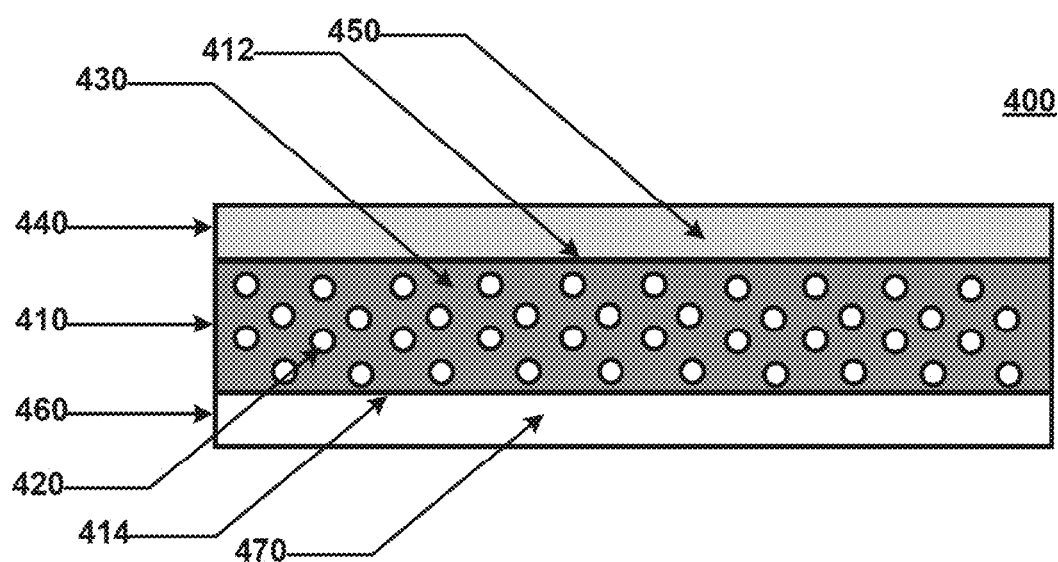
FIG. 4 includes an illustration showing the configuration of a foam tape having two adhesive layers formed according to embodiments described herein.

For purposes of illustration, FIG. 4 includes an illustration showing the configuration of a foam tape 400 formed according to embodiments described herein. Foam tape 400 may include a foam core 410, a first adhesive layer 440 overlying a first surface 412 of the foam core 410 and a second adhesive layer 460 overlying a second surface 414 of the foam core 410. The foam core 410 may include hollow microspheres 420 within a foam material 430. The first adhesive layer 440 may include a first adhesive composition 450 and the second adhesive layer 460 may include a second adhesive composition 470.

It will be appreciated that the foam tape 400 and all components described in reference to the foam tape 400 as shown in FIG. 4 may have any of the characteristics described herein with reference to corresponding components shown in FIG. 3. In particular, the characteristic of foam tape 400, the foam core 410, the hollow microspheres 420, the foam material 430, the first adhesive layer 440 and the first adhesive composition 450 shown in FIG. 4 may have any of the corresponding characteristics described herein in reference to foam tape 300, the foam core 310, the hollow microspheres 320, the foam material 330, the first adhesive layer 340 and the first adhesive composition 350 shown in FIG. 3.

According to certain embodiments, the second adhesive layer 360 may have a particular thickness. For example, the second adhesive layer 360 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the second adhesive layer 360 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the second adhesive layer 360 may be within a range between any of the minimum and maximum values noted above. It will be further appreciated that the thickness of the second adhesive layer 360 may be any value between any of the minimum and maximum values noted above.

Referring now to the second adhesive composition 470 of the second adhesive layer 460 formed according to embodiments described herein, the second adhesive composition 470 may include a (meth)acrylic based polymeric component A, a (meth)acrylic based polymeric component B, and a tackifier component.

According to particular embodiments, the (meth)acrylic based polymeric component A of the second adhesive composition 470 may be referred as a high glass transition temperature (Tg) (meth)acrylic based polymeric component. According to still other embodiments, the (meth)acrylic based polymeric component A of the second adhesive composition 470 may have a particular glass transition temperature (Tg) as estimated by the Fox Equation, based on the Tgs of the homopolymer of constituent monomers and the weight percent thereof. For example, the (meth)acrylic based polymeric component A of the second adhesive composition 470 may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or even at least about 80° C. It will be appreciated that the glass transition temperature of the (meth)acrylic based polymeric component A of the second adhesive composition 470 may be within a range between any of the values noted above. It will be further appreciated that the glass transition temperature of the (meth)acrylic based polymeric component A of the second adhesive composition 470 may be any value between any of the values noted above.

According to still other embodiments, the (meth)acrylic based polymeric component A of the second adhesive composition 470 may have a particular molecular weight. For example, the (meth)acrylic based polymeric component A of the second adhesive composition 470 may have a molecular weight of at least about 5,000 g/mol, such as, at least about 6,000 g/mol or at least about 7,000 g/mol or at least about 8,000 g/mol or at least about 9,000 g/mol or at least about 10,000 g/mol or at least about 11,000 g/mol or at least about 12,000 g/mol or at least about 13,000 g/mol or at least about 14,000 g/mol or at least about 15,000 g/mol or at least about 16,000 g/mol or at least about 17,000 g/mol or at least about 18,000 g/mol or at least about 19,000 g/mol or even at least about 20,000 g/mol. According to still other embodiments, the (meth)acrylic based polymeric component A of the second adhesive composition 470 may have a molecular weight of not greater than about 200,000 g/mol, such as, not greater than about 150,000 g/mol or even not greater than about 100,000 g/mol. It will be appreciated that the molecular weight of the (meth)acrylic based polymeric component A of the second adhesive composition 470 may be within a range between any of the minimum and maximum values noted above. It will be further appreciated that the molecular weight of the (meth)acrylic based polymeric component A of the second adhesive composition 470 may be any value between any of the minimum and maximum values noted above.

According to still other embodiments, the (meth)acrylic based polymeric component A of the second adhesive composition 470 may contain a very low level of acidic monomers, or may even be free of any acidic monomers. According to certain embodiments, the level of acidic monomers in the (meth)acrylic based polymeric component A of the second adhesive composition 470 may be not greater than about 10% by weight, such as, not greater than about 5% by weight, or even not greater than about 0% by weight. Accordingly, the overall level of acidic monomers in the adhesive may be not greater than about 2% by weight, such as, not greater than about 1% by weight, or even not greater than about 0% by weight.

According to particular embodiments, the (meth)acrylic based polymeric component B of the second adhesive composition 470 may be referred as a low glass transition temperature (Tg) (meth)acrylic based polymeric component. According to still other embodiments, the (meth)acrylic based polymeric component B of the second adhesive composition 470 may have a particular glass transition temperature (Tg) as estimated by the Fox Equation, based on the Tgs of the homopolymer of constituent monomers and the weight percent thereof. For example, the (meth)acrylic based polymeric component B of the second adhesive composition 470 may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the (meth)acrylic based polymeric component B of the second adhesive composition 470 may be within a range between any of the values noted above. It will be further appreciated that the glass transition temperature of the (meth)acrylic based polymeric component B of the second adhesive composition 470 may be any value between any of the values noted above.

According to still other embodiments, the (meth)acrylic based polymeric component B of the second adhesive composition 470 may have a particular molecular weight. For example, the (meth)acrylic based polymeric component A of the second adhesive composition 470 may have a molecular weight of at least about 100,000 g/mol, such as, at least about 110,000 g/mol or at least about 120,000 g/mol or at least about 130,000 g/mol or at least about 140,000 g/mol or at least about 150,000 g/mol or at least about 160,000 g/mol or at least about 170,000 g/mol or at least about 180,000 g/mol or at least about 190,000 g/mol or even at least about 200,000 g/mol. It will be appreciated that the molecular weight of the (meth)acrylic based polymeric component B of the second adhesive composition 470 may be within a range between any of the minimum and maximum values noted above. It will be further appreciated that the molecular weight of the (meth)acrylic based polymeric component B of the second adhesive composition 470 may be any value between any of the minimum and maximum values noted above.

According to still other embodiments, the (meth)acrylic based polymeric component B of the second adhesive composition 470 may be acid-free. For purposes of embodiments described herein, the term "acid-free" may be defined as having no acid functional monomers. According to certain embodiments, the overall level of acidic monomers in the adhesive may be not greater than about 2% by weight, such as, not greater than about 1% by weight, or even not greater than about 0% by weight.

According to yet other embodiments, the second adhesive composition 470 may include a particular content of the (meth)acrylic based polymeric component A of the first adhesive composition 350. For example, the content of the (meth)acrylic based polymeric component A of the second adhesive composition 470 in the second adhesive composition 470 may be at least about 2.0 wt. % for a total weight of the first adhesive composition 350, such as, at least about 2.5 wt. % or at least about 3.0 wt. % or at least about or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.5 wt. % or at least about 9.0 wt. % or at least about 9.5 wt. % or even at least about 10.0 wt. %. According to still other embodiments, the content of the (meth)acrylic based polymeric component A of the second adhesive composition 470 in the second adhesive composition 470 may be not greater than about 49.0 wt. % for a total weight of the first adhesive composition 350, such as, not greater than about 47.0 wt. % or not greater than about 45.0 wt. % or not greater than about 42.0 wt. % or not greater than about 40.0 wt. % or not greater than about 37.0 wt. % or not greater than about 35.0 wt. % or not greater than about 32.0 wt. % or not greater than about 30.0 wt. % or not greater than about 27.0 wt. % or not greater than about 25.0 wt. % or not greater than about 22.0 wt. % or not greater than about 20.0 wt. % or not greater than about 17.0 wt. % or not greater than about 15.0 wt. % or even not greater than about 12.0 wt. %. It will be appreciated that the content of the (meth)acrylic based polymeric component A in the second adhesive composition 470 may be within a range between any of the minimum and maximum values noted above. It will be further appreciated that the content of the (meth)acrylic based polymeric component A in the second adhesive composition 470 may be any value between any of the minimum and maximum values noted above.

According to still other embodiments, the (meth)acrylic based polymeric component A of the second adhesive composition 470 may include a monomer component a1 and a monomer component a2.

According to certain embodiments, the monomer component a1 may be an ethylenically unsaturated monomer. According to still other embodiments, the monomer component a1 may include, but is not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, and propyl methacrylate, admantyl acrylate, norbornyl acrylate, or mixtures thereof.

According to still other embodiments, the monomer component a2 may be an acidic monomer or a non-acidic functional polar monomer.

According to certain embodiments, the monomer component a2 may be an acidic monomer selected from ethylenically unsaturated carboxylic acids, ethylenically unsaturated sulfonic acids, ethylenically unsaturated phosphonic acids, and mixtures thereof. According to still other embodiments, the monomer component a2 may include an acidic monomer selected from, but is not limited to, an acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, or mixtures thereof.

According to certain embodiments, the monomer component a2 may be a non-acidic functional monomers selected from, but are not limited to, hydroxyl containing (meth)acrylic monomers, and nitrogen-containing monomers having a primary, secondary or tertiary amino groups, or an N,N-dialkylaminoalkyl (meth)acrylate. According to certain embodiments, the monomer component a2 may be a non-acidic functional monomers selected from, but are not limited to, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N~dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the monomer component a2 may be N-hydroxyalkyl (meth)acrylamide. The N-hydroxyalkyl (meth)acrylamide may be represented by the following formula: $CH_2=C(R1)CONHR2$, where R1 represents a hydrogen atom or methyl group, and R2 represents an alkyl group having 1 to 8 carbon atoms and at least one hydroxyl group. According to certain embodiments, the monomer component a2 may be selected from, but are not limited to, n-hydroxymethyl acrylamide, n-hydroxymethyl methacrylamide n-hydroxyethyl acrylamide, n-hydroxyethyl methacrylamide, or mixtures thereof.

According to still other embodiments, the (meth)acrylic based polymeric component A of the second adhesive composition 470 may include a particular content of the monomer component a1. For example, the content of the monomer component a1 in the (meth)acrylic based polymeric component A of the second adhesive composition 470 may be at least about 40 wt. % for a total weight of the (meth)acrylic based polymeric component A of the first adhesive composition 350, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt. % or at least about 88 wt. % or even at least about 90 wt. %. According to yet other embodiments, the content of the monomer component a1 in the (meth)acrylic based polymeric component A of the second adhesive composition 470 may be not greater than about 99 wt. % for a total weight of the (meth)acrylic based polymeric component A of the first adhesive composition 350, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component a1 in the (meth)acrylic based polymeric component A of the second adhesive composition 470 may be within a range between any of the minimum and maximum values noted above. It will be further appreciated that the content of the content of the monomer component a1 in the (meth)acrylic based polymeric component A of the second adhesive composition 470 may be any value between any of the minimum and maximum values noted above.

According to still other embodiments, the (meth)acrylic based polymeric component A of the second adhesive composition 470 may include a particular content of the monomer component a2. For example, the content of the monomer component a2 in the (meth)acrylic based polymeric component A of the second adhesive composition 470 may be at least about 0.1 wt. % for a total weight of the (meth)acrylic based polymeric component A of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a2 in the (meth)acrylic based polymeric component A of the second adhesive composition 470 may be not greater than about 20.0 wt. % for a total weight of the (meth)acrylic based polymeric component A of the first adhesive composition 350, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or not greater than about 12.0 wt. %. It will be appreciated that the content of the monomer component a2 in the (meth)acrylic based polymeric component A of the second adhesive composition 470 may be within a range between any of the minimum and maximum values noted above. It will be further appreciated that the content of the content of the monomer component a2 in the (meth)acrylic based polymeric component A of the second adhesive composition 470 may be any value between any of the minimum and maximum values noted above.

According to still other embodiments, the (meth)acrylic based polymeric component A of the second adhesive composition 470 may further include a monomer component a3. According to particular embodiments, the monomer component a3 may be different than both the monomer component a1 and the monomer component a2. According to still other embodiments, component a2 and a3 may interact to strengthen the cohesion of component A in the final adhesive. Such interactions include, but are not limited to, hydrogen bonding, acid-base pairs, ion pairs, or combination thereof.

According to certain embodiments, the monomer component a3 may be an ethylenically unsaturated monomer. According to still other embodiments, the monomer component a3 may include an acidic monomer having an acidic group and an ethylenically unsaturated group. According to certain embodiments, the monomer component a3 may include, but are not limited to, those selected from ethylenically unsaturated carboxylic acids, ethylenically unsaturated sulfonic acids, ethylenically unsaturated phosphonic acids, and mixtures thereof. Examples of such compounds include, but are not limited to, those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid or mixtures thereof.

According to still other embodiments, the monomer component a3 may include a hydroxy-containing acrylic ester monomer having a hydroxyl group and an ethylenically unsaturated group. According to certain embodiments, the monomer component a3 may include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, n-hydroxymethyl acrylamide, n-hydroxyethyl acrylamide and mixtures thereof. According to still other embodiments, the monomer component a3 may include a nitrogen-containing monomer having a primary, secondary or a tertiary amino group or an N, N-dialkylaminoalkyl (meth)acrylate and a ethylenically unsaturated group.

According to still other embodiments, the monomer component a3 may include a vinyl monomer. According to certain embodiments, the monomer component a3 may include, but are not limited to, but are not limited to, those selected from N-methyl acrylamide, N-ethyl acrylamide, N-hexyl acrylamide, N-octyl acrylamide, t-butyl acrylamide, N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)

ethyl acrylate, dimethylaminoethyl acrylamide, N-vinylpyrrolidone; N-vinylcaprolactam, acrylamide or mixtures thereof.

According to still other embodiments, the (meth)acrylic based polymeric component A of the second adhesive composition 470 may include a particular content of the monomer component a3. For example, the content of the monomer component a3 in the (meth)acrylic based polymeric component A of the second adhesive composition 470 may be at least about 0.1 wt. % for a total weight of the (meth)acrylic based polymeric component A of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component a3 in the (meth)acrylic based polymeric component A of the second adhesive composition 470 may be not greater than about 60 wt. % for a total weight of the (meth)acrylic based polymeric component A of the first adhesive composition 350, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component a3 in the (meth)acrylic based polymeric component A of the second adhesive composition 470 may be within a range between any of the minimum and maximum values noted above. It will be further appreciated that the content of the content of the monomer component a3 in the (meth)acrylic based polymeric component A of the second adhesive composition 470 may be any value between any of the minimum and maximum values noted above.

According to yet other embodiments, the second adhesive composition 470 may include a particular content of the (meth)acrylic based polymeric component B of the first adhesive composition 350. For example, the content of the (meth)acrylic based polymeric component B of the second adhesive composition 470 in the second adhesive composition 470 may be at least about 51 wt. % for a total weight of the first adhesive composition 350, such as, at least about 53 wt. % or at least about 55 wt. % or at least about or at least about 58 wt. % or at least about 60 wt. % or at least about 63 wt. % or at least about 65 wt. % or at least about 68 wt. % or at least about 70 wt. % or at least about 73 wt. % or even at least about 75 wt. %. According to still other embodiments, the content of the (meth)acrylic based polymeric component B of the second adhesive composition 470 in the second adhesive composition 470 may be not greater than about 98 wt. % for a total weight of the first adhesive composition 350, such as, not greater than about 95 wt. % or not greater than about 92 wt. % or not greater than about 90 wt. % or not greater than about 87 wt. % or not greater than about 85 wt. % or not greater than about 82 wt. % or even not greater than about 80 wt. %. It will be appreciated that the content of the (meth)acrylic based polymeric component B of the second adhesive composition 470 in the second adhesive composition 470 may be within a range between any of the minimum and maximum values noted above. It will be further appreciated that the content of the (meth)acrylic based polymeric component B of the second adhesive composition 470 in the second adhesive composition 470 may be any value between any of the minimum and maximum values noted above.

According to still other embodiments, the (meth)acrylic based polymeric component B of the second adhesive composition 470 may include a monomer component b1 and a monomer component b2.

According to certain embodiments, the monomer component b1 may be a C1-C24 acrylic ester, methacrylate ester or mixtures thereof. According to still other embodiments, the alkyl group of component b1 can be straight-chained, branched with one or more branching sites, or cyclic. According to yet other embodiments, the alkyl groups may include, but are not limited to, those selected from methyl, ethyl, propyl, isopropyl, butyl, isobutyl, pentyl, 2-pentyl, hexyl, heptyl, octyl, isooctyl, 2-ethylhexyl, tert-octyl, nonyl, decyl, 2-propylheptyl, undecyl, tridecyl acrylate, (2-isopropyl-5-methyl)hexyl, tetradecyl, hexadecyl, octadecyl, branched alkyl group having 16 to 22 C atoms and including at least two branching sites, phenyl, benzyl, cyclohexyl, isobornyl, admantyl, 3,3,5 trimethylcyclohexyl, norbornyl or mixtures thereof. According to particular embodiments, the alkyl groups may include, but are not limited to, those selected from butyl, isooctyl and 2-ethylhexyl.

According to still other embodiments, the monomer component b2 may be an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate. According to still other embodiments, component b2 may form hydrogen bonding within component B, or form favorable interactions with component A. Such favorable interactions of component b2 with component A include, but are not limited to, hydrogen bonding, acid-base pairs, ion pairs, and combination thereof. Useful monomers for b2 include, but are not limited to, those selected from 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methyl acrylamide, N-ethyl acrylamide, N-hexyl acrylamide, N-octyl acrylamide, t-butyl acrylamide, N,N-dimethyl acrylamide, N,N--dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, B-(dimethylamido)ethyl acrylate, dimethylaminoethyl acrylamide, N-vinylpyrrolidone; N-vinylcaprolactam, acrylamide, n-hydroxymethyl acrylamide, n-hydroxyethyl acrylamide, or mixtures thereof.

According to still other embodiments, the (meth)acrylic based polymeric component B of the second adhesive composition 470 may include a particular content of the monomer component b1. For example, the content of the monomer component b1 in the (meth)acrylic based polymeric component B of the second adhesive composition 470 may be at least about 40 wt. % for a total weight of the (meth)acrylic based polymeric component B of the first adhesive composition 350, such as, at least about 43 wt. % or at least about 45 wt. % or at least about 48 wt. % or at least about 50 wt. % or at least about 53 wt. % or at least about 55 wt. % or at least about 58 wt. % or at least about 63 wt. % or at least about 65 wt. % or at least about 68 wt. % or at least about 70 wt. % or at least about 73 wt. % or at least about 75 wt. % or at least about 78 wt. % or at least about 80 wt. % or at least about 83 wt. % or at least about 85 wt.

% or at least about 88 wt. % or even at least about 90 wt. %. According to yet other embodiments, the content of the monomer component b1 in the (meth)acrylic based polymeric component B of the second adhesive composition 470 may be not greater than about 99 wt. % for a total weight of the (meth)acrylic based polymeric component B of the first adhesive composition 350, such as, not greater than about 98.5 wt. % or not greater than about 98 wt. % or not greater than about 97.5 wt. % or not greater than about 97.0 wt. % or not greater than about 96.5 wt. % or not greater than about 96.0 wt. % or not greater than about 95.5 wt. % or not greater than about 95.0 wt. %. It will be appreciated that the content of the monomer component b1 in the (meth)acrylic based polymeric component B of the second adhesive composition 470 may be within a range between any of the minimum and maximum values noted above. It will be further appreciated that the content of the content of the monomer component b1 in the (meth)acrylic based polymeric component B of the second adhesive composition 470 may be any value between any of the minimum and maximum values noted above.

According to still other embodiments, the (meth)acrylic based polymeric component B of the second adhesive composition 470 may include a particular content of the monomer component b2. For example, the content of the monomer component b2 in the (meth)acrylic based polymeric component B of the second adhesive composition 470 may be at least about 1 wt. % for a total weight of the (meth) acrylic based polymeric component B of the first adhesive composition 350, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to yet other embodiments, the content of the monomer component b2 in the (meth)acrylic based polymeric component B of the second adhesive composition 470 may be not greater than about 60 wt. % for a total weight of the (meth)acrylic based polymeric component B of the first adhesive composition 350, such as, not greater than about 57 wt. % or not greater than about 55 wt. % or not greater than about 52 wt. % or not greater than about 50 wt. % or not greater than about 47 wt. % or not greater than about 45 wt. % or not greater than about 42 wt. % or not greater than about 40 wt. % or not greater than about 37 wt. % or not greater than about 35 wt. % or not greater than about 32 wt. % or not greater than about 30 wt. % or not greater than about 27 wt. % or not greater than about 25 wt. % or not greater than about 23 wt. % or not greater than about 20 wt. %. It will be appreciated that the content of the monomer component b2 in the (meth)acrylic based polymeric component B of the second adhesive composition 470 may be within a range between any of the minimum and maximum values noted above. It will be further appreciated that the content of the content of the monomer component b2 in the (meth)acrylic based polymeric component B of the second adhesive composition 470 may be any value between any of the minimum and maximum values noted above.

According to still other embodiments, the (meth)acrylic based polymeric component B of the second adhesive composition 470 may further include a monomer component b3. According to particular embodiments, the monomer component b3 may be different than both the monomer component b1 and the monomer component b2. According to particular embodiments, component b3 may form favorable interactions with component b2. Such favorable interactions may include, but are not limited to, hydrogen bonding, acid-base pairs, or ion pairs or their combinations. Useful monomers for b3 exclude any acidic monomers.

According to still other embodiments, the (meth)acrylic based polymeric component B of the second adhesive composition 470 may include a particular content of the monomer component b3. For example, the content of the monomer component b3 in the (meth)acrylic based polymeric component B of the second adhesive composition 470 may be at least about 0.1 wt. % for a total weight of the (meth)acrylic based polymeric component B of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the monomer component b3 in the (meth)acrylic based polymeric component B of the second adhesive composition 470 may be not greater than about 60 wt. % for a total weight of the (meth)acrylic based polymeric component B of the first adhesive composition 350, such as, not greater than about 55 wt. % or not greater than about 50 wt. % or not greater than about 45 wt. % or not greater than about 40 wt. % or not greater than about 35 wt. % or not greater than about 30 wt. % or not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the monomer component b3 in the (meth)acrylic based polymeric component B of the second adhesive composition 470 may be within a range between any of the minimum and maximum values noted above. It will be further appreciated that the content of the content of the monomer component b3 in the (meth)acrylic based polymeric component B of the second adhesive composition 470 may be any value between any of the minimum and maximum values noted above.

According to certain embodiments, the tackifier component of the second adhesive composition 470 may include C5, C9, C5/C9, dicyclopentadiene, terpene, or their hydrogenated resins, or combinations thereof.

According to yet other embodiments, the second adhesive composition 470 may include a particular content of the tackifier component of the first adhesive composition 350. For example, the content of the tackifier component of the second adhesive composition 470 in the second adhesive composition 470 may be at least about at least about 0.1 wt. % for a total weight of the first adhesive composition 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or even at least about 7.0 wt. %. According to yet other embodiments, the content of the tackifier component of the second adhesive composition 470 in the second adhesive composition 470 may be not greater than about 30 wt. % for a total weight of the first adhesive composition 350, such as, not greater than about 25 wt. % or not greater than about 20 wt. % or not greater than about 18 wt. % or not greater than about 15 wt. % or not greater than about 13 wt. % or not greater than about 10 wt. %. It will be appreciated that the content of the tackifier component of the second adhesive composition 470 in the second adhesive composition 470 may be within a range between any of the minimum and maximum values noted above. It will be further appreciated that the content of the tackifier component of the second adhesive composition 470 in the second adhesive composition 470 may be any value between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

An adhesive composition comprising: at least about 2 wt. % and not greater than 49 wt. % of a (meth)acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth) acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B is acid-free.

Embodiment 2

An adhesive composition comprising: at least about 2 wt. % and not greater than 49 wt. % of a (meth)acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth) acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 3

An adhesive composition comprising: at least about 2 wt. % and not greater than 49 wt. % of a (meth)acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth) acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth) acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate, and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 4

The adhesive composition of any one of embodiments 2 and 3, wherein the (meth)acrylic based polymeric component B is acid-free.

Embodiment 5

The adhesive composition of any one of embodiments 1, 2 and 3, wherein the total wt. % of acidic monomers in the (meth)acrylic based polymeric component A is less than 10%.

Embodiment 6

The adhesive composition of any one of embodiments 1, 2 and 3, wherein the (meth)acrylic based polymeric component A has a molecular weight of at least about 5,000 g/mol.

Embodiment 7

The adhesive composition of embodiment 3, wherein the (meth)acrylic based polymeric component A has a glass transition temperature (Tg) of at least about 40° C.

Embodiment 8

The adhesive composition of embodiment 3, wherein the (meth)acrylic based polymeric component B has a glass transition temperature (Tg) of not greater than about 20° C.

Embodiment 9

The adhesive composition of any one of embodiments 1 and 2, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate.

Embodiment 10

The adhesive composition of any one of embodiments 1, 2 and 3, wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 11

The adhesive composition of any one of embodiments 3 and 9, wherein the monomer component a2 is an ethylenically unsaturated functional monomer selected from the group consisting of hydroxyl containing (meth)acrylic ester or acrylamide.

Embodiment 12

The adhesive composition of any one of embodiments 3 and 9, wherein the monomer component a2 is N-hydroxyalkyl (meth)acrylamide.

Embodiment 13

The adhesive composition of embodiment 12, wherein the N-hydroxyalkyl(meth)acrylamide has a hydroxylalkyl group having 1 to 8 carbon atoms.

Embodiment 14

The adhesive composition of embodiment 13, wherein the hydroxylalkyl group is represented by the following formula: CH2=C(R1)CONHR2, where R1 represents a hydrogen atom or methyl group, and R2 represents an alkyl group having 1 to 8 carbon atoms and at least one hydroxyl group.

Embodiment 15

The adhesive composition of any one of embodiments 3 and 9, wherein the (meth)acrylic based polymeric component A further comprises at least about 0.1 wt. % and not greater than about 60 wt. % of a monomer component a3 for a total weight of the (meth)acrylic based polymeric component A, wherein the monomer component a3 is an ethylenically unsaturated monomer and wherein the monomer component a3 is different than both the monomer component a1 and the monomer component a2.

Embodiment 16

The adhesive composition of embodiment 15, wherein the monomer component a3 comprises: i. an acidic monomer having an acidic group and an ethylenically unsaturated group, ii. a hydroxy-containing acrylic ester monomer having a hydroxyl group and an ethylenically unsaturated group, iii. a nitrogen-containing monomer having a primary, secondary or a tertiary amino group or an N, N-dialkylaminoalkyl (meth)acrylate and a ethylenically unsaturated group, iv. a vinyl monomer, or v. a combination thereof.

Embodiment 17

The adhesive composition of any one of embodiments 3 and 10, wherein the (meth)acrylic based polymeric component B further comprises at least about 0.1 wt. % and not greater than about 60 wt. % of a monomer component b3 for a total weight of the (meth)acrylic based polymeric component A, wherein the monomer component b3 is an ethylenically unsaturated monomer and wherein the monomer component b3 is different than both the monomer component b1 and the monomer component b2.

Embodiment 18

The adhesive composition of embodiment 17, wherein the monomer component b3 comprises: i. a hydroxy-containing acrylic ester monomer having a hydroxyl group and an ethylenically unsaturated group, ii. a nitrogen-containing monomer having a primary, secondary or a tertiary amino group or an N, N-dialkylaminoalkyl (meth)acrylate and a ethylenically unsaturated group, iii. a vinyl monomer, or iv. a combination thereof.

Embodiment 19

The adhesive composition of any one of embodiments 1, 2 and 3, wherein the tackifier component comprises C5, C9, C5/C9, dicyclopentadiene, terpene, or their hydrogenated resins, or combinations thereof.

Embodiment 20

A method of forming an adhesive composition, wherein the method comprises providing a pre-adhesive mixture comprising: a pre-adhesive (meth)acrylic based polymeric component A, wherein the pre-adhesive (meth)acrylic based polymeric component A is fully polymerized; a pre-adhesive (meth)acrylic based polymeric component B, wherein the pre-adhesive (meth)acrylic based polymeric component B is unpolymerized; and a pre-adhesive tackifier component; mixing the pre-adhesive mixture; and polymerizing the pre-adhesive mixture to form the adhesive composition.

Embodiment 21

The method of embodiment 20, wherein the pre-adhesive mixture comprises: at least about 2 wt. % and not greater than 49 wt. % of the pre-adhesive (meth)acrylic based polymeric component A for a total weight of the pre-adhesive mixture; at least about 51 wt. % of the pre-adhesive (meth)acrylic based polymeric component B for a total weight of the pre-adhesive mixture; and at least about 0.1 wt. % and not greater than about 30 wt. % of the tackifier component for a total weight of the pre-adhesive mixture, wherein the pre-adhesive (meth)acrylic based polymeric component A has a glass transition temperature (Tg) of at least about 40° C., wherein the pre-adhesive (meth)acrylic based polymeric component B has a glass transition temperature (Tg) of not greater than about 20° C., and wherein the pre-adhesive (meth)acrylic based polymeric component B is acid-free.

Embodiment 22

The method of embodiment 20, wherein the pre-adhesive mixture comprises: at least about 2 wt. % and not greater than 49 wt. % of the pre-adhesive (meth)acrylic based polymeric component A for a total weight of the pre-adhesive mixture; at least about 51 wt. % of the pre-adhesive (meth)acrylic based polymeric component B for a total weight of the pre-adhesive mixture; and at least about 0.1 wt. % and not greater than about 30 wt. % of the pre-adhesive tackifier component for a total weight of the pre-adhesive mixture, wherein the pre-adhesive (meth)acrylic based polymeric component A has a glass transition temperature (Tg) of at least about 40° C., wherein the pre-adhesive (meth) acrylic based polymeric component B has a glass transition temperature (Tg) of not greater than about 20° C., and wherein the pre-adhesive (meth)acrylic based polymeric component B comprises a reaction product of polymerizable material comprising: at least about 40 wt. % and not greater than about 99 wt. % of a pre-adhesive monomer component b1 for a total weight of the pre-adhesive (meth)acrylic based polymeric component B, wherein the pre-adhesive monomer component b1 is a C1-C24 acrylic ester, and at least about 1 wt. % and not greater than about 60 wt. % of a pre-adhesive monomer component b2 for a totally weight of the pre-adhesive (meth)acrylic based polymeric component B, wherein the pre-adhesive monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 23

The method of embodiment 20, wherein the pre-adhesive mixture comprises: at least about 2 wt. % and not greater than 49 wt. % of a pre-adhesive (meth)acrylic based polymeric component A for a total weight of the pre-adhesive mixture; at least about 51 wt. % of a pre-adhesive (meth) acrylic based polymeric component B for a total weight of the pre-adhesive mixture; and at least about 0.1 wt. % and not greater than about 30 wt. % of a tackifier component for a total weight of the pre-adhesive mixture, wherein the pre-adhesive (meth)acrylic based polymeric component A comprises a reaction product of polymerizable material comprising: at least about 40 wt. % and not greater than about 99 wt. % of a pre-adhesive monomer component a1 for a total weight of the pre-adhesive (meth)acrylic based polymeric component A, wherein the pre-adhesive monomer component a1 is an ethylenically unsaturated monomer, and at least about 0.1 wt. % and not greater than about 20 wt. % of a pre-adhesive monomer component a2 for a totally weight of the pre-adhesive (meth)acrylic based polymeric component A, wherein the pre-adhesive monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate, and wherein the pre-adhesive (meth)acrylic based polymeric component B comprises a reaction product of polymerizable material comprising: at least about 40 wt. % and not greater than about 99 wt. % of a pre-adhesive monomer component b1 for a total weight of the pre-adhesive (meth)acrylic based polymeric component B, wherein the pre-adhesive monomer component b1 is a C1-C24 acrylic ester, and at least about 1 wt. % and not greater than about 60 wt. % of a pre-adhesive monomer component b2 for a totally weight of the pre-adhesive (meth)acrylic based polymeric component B, wherein the pre-adhesive monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 24

The method of any one of embodiments 22 and 23, wherein the pre-adhesive (meth)acrylic based polymeric component B is acid-free.

Embodiment 25

The method of any one of embodiments 21, 22 and 23, wherein the total wt. % of acidic monomers in the (meth) acrylic based polymeric component A is less than 10%.

Embodiment 26

The method of any one of embodiments 21, 22 and 23, wherein the pre-adhesive (meth)acrylic based polymeric component A has a molecular weight of at least about 5,000 g/mol.

Embodiment 27

The method of embodiment 23, wherein the pre-adhesive (meth)acrylic based polymeric component A has a glass transition temperature (Tg) of at least about 40° C.

Embodiment 28

The method of embodiment 23, wherein the pre-adhesive (meth)acrylic based polymeric component B has a glass transition temperature (Tg) of not greater than about 20° C.

Embodiment 29

The method of any one of embodiments 21 and 23, wherein the pre-adhesive (meth)acrylic based polymeric component A comprises a reaction product of polymerizable material comprising: at least about 40 wt. % and not greater than about 99 wt. % of a pre-adhesive monomer component a1 for a total weight of the pre-adhesive (meth)acrylic based polymeric component A, wherein the pre-adhesive monomer component a1 is an ethylenically unsaturated monomer, and at least about 0.1 wt. % and not greater than about 20 wt. % of a pre-adhesive monomer component a2 for a totally weight of the pre-adhesive (meth)acrylic based polymeric component A, wherein the pre-adhesive monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate.

Embodiment 30

The method of any one of embodiments 21, 22 and 23, wherein the pre-adhesive (meth)acrylic based polymeric component B comprises a reaction product of polymerizable material comprising: at least about 40 wt. % and not greater than about 99 wt. % of a pre-adhesive monomer component b1 for a total weight of the pre-adhesive (meth)acrylic based polymeric component B, wherein the pre-adhesive monomer component b1 is a C1-C24 acrylic ester, and at least about 1 wt. % and not greater than about 60 wt. % of a pre-adhesive monomer component b2 for a totally weight of the pre-adhesive (meth)acrylic based polymeric component B, wherein the pre-adhesive monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 31

The method of any one of embodiments 23 and 30, wherein the pre-adhesive monomer component a2 is an ethylenically unsaturated functional monomer selected from the group consisting of a hydroxyl containing (meth)acrylic ester or an acrylamide.

Embodiment 32

The method of any one of embodiments 23 and 30, wherein the pre-adhesive monomer component a2 is N-hydroxyalkyl (meth)acrylamide.

Embodiment 33

The method of embodiment 32, wherein the N-hydroxyalkyl(meth)acrylamide has a hydroxylalkyl group having 1 to 8 carbon atoms.

Embodiment 34

The method of embodiment 33, wherein the hydroxylalkyl group is represented by the following formula: CH2=C(R1)CONHR2, where R1 represents a hydrogen atom or methyl group, and R2 represents an alkyl group having 1 to 8 carbon atoms and at least one hydroxyl group.

Embodiment 35

The method of any one of embodiments 23 and 29, wherein the pre-adhesive (meth)acrylic based polymeric component A further comprises at least about 0.1 wt. % and not greater than about 60 wt. % of a pre-adhesive monomer component a3 for a total weight of the pre-adhesive (meth)acrylic based polymeric component A, wherein the pre-adhesive monomer component a3 is an ethylenically unsaturated monomer and wherein the pre-adhesive monomer component a3 is different than both the pre-adhesive monomer component a1 and the pre-adhesive monomer component a2.

Embodiment 36

The method of embodiment 35, wherein the pre-adhesive monomer component a3 comprises: i. an acidic monomer having an acidic group and an ethylenically unsaturated group, ii. a hydroxy-containing acrylic ester monomer having a hydroxyl group and an ethylenically unsaturated group, iii. a nitrogen-containing monomer having a primary, secondary or a tertiary amino group or an N, N-dialkylaminoalkyl (meth)acrylate and a ethylenically unsaturated group, iv. a vinyl monomer, or v. a combination thereof.

Embodiment 37

The method of any one of embodiments 23 and 30, wherein the pre-adhesive (meth)acrylic based polymeric component B further comprises at least about 0.1 wt. % and not greater than about 60 wt. % of a pre-adhesive monomer component b3 for a total weight of the pre-adhesive (meth) acrylic based polymeric component B, wherein the pre-adhesive monomer component b3 is an ethylenically unsaturated monomer and wherein the pre-adhesive monomer component b3 is different than both the pre-adhesive monomer component b1 and the pre-adhesive monomer component b2.

Embodiment 38

The pre-adhesive mixture of embodiment 37, wherein the pre-adhesive monomer component b3 comprises: i. a hydroxy-containing acrylic ester monomer having a hydroxyl group and an ethylenically unsaturated group, ii. a nitrogen-containing monomer having a primary, secondary or a tertiary amino group or an N, N-dialkylaminoalkyl (meth)acrylate and a ethylenically unsaturated group, iii. a vinyl monomer, or iv. a combination thereof.

Embodiment 39

The method of embodiment 20, wherein the adhesive composition comprises: at least about 2 wt. % and not greater than 49 wt. % of a (meth)acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B is acid-free.

Embodiment 40

The method of embodiment 20, wherein the adhesive composition comprises: at least about 2 wt. % and not greater than 49 wt. % of a (meth)acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt.

% of a tackifier component for a total weight of the adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth) acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 41

The method of embodiment 20, wherein the adhesive composition comprises: at least about 2 wt. % and not greater than 49 wt. % of a (meth)acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate, and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 42

The method of any one of embodiments 40 and 41, wherein the (meth)acrylic based polymeric component B is acid-free.

Embodiment 43

The adhesive composition of any one of embodiments 39, 40 and 41, wherein the total wt. % of acidic monomers in the (meth)acrylic based polymeric component A is less than 10%.

Embodiment 44

The method of any one of embodiments 39, 40 and 41, wherein the (meth)acrylic based polymeric component A has a molecular weight of at least about 5,000 g/mol.

Embodiment 45

The method of embodiment 41, wherein the (meth)acrylic based polymeric component A has a glass transition temperature (Tg) of at least about 40° C.

Embodiment 46

The method of embodiment 41, wherein the (meth)acrylic based polymeric component B has a glass transition temperature (Tg) of not greater than about 20° C.

Embodiment 47

The method of any one of embodiments 39 and 41, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of acidic monomer, hydroxyl containing (meth)acrylic monomer and a nitrogen-containing monomer having a primary, secondary or tertiary amino group or an N,N-dialkylaminoalkyl (meth)acrylate.

Embodiment 48

The method of any one of embodiments 39, 40 and 41, wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 49

The method of any one of embodiments 41 and 47, wherein the monomer component a2 is an ethylenically unsaturated functional monomer selected from the group consisting of hydroxyl containing (meth)acrylic ester or acrylamide.

Embodiment 50

The method of any one of embodiments 41 and 47, wherein the monomer component a2 is N-hydroxyalkyl (meth)acrylamide.

Embodiment 51

The method of embodiment 50, wherein the N-hydroxyalkyl(meth)acrylamide has a hydroxylalkyl group having 1 to 8 carbon atoms.

Embodiment 52

The method of embodiment 51, wherein the hydroxylalkyl group is represented by the following formula: CH2=C(R1)CONHR2, where R1 represents a hydrogen atom or methyl group, and R2 represents an alkyl group having 1 to 8 carbon atoms and at least one hydroxyl group.

Embodiment 53

The method of any one of embodiments 41 and 47, wherein the (meth)acrylic based polymeric component A further comprises at least about 0.1 wt. % and not greater than about 60 wt. % of a monomer component a3 for a total weight of the (meth)acrylic based polymeric component A, wherein the monomer component a3 is an ethylenically unsaturated monomer and wherein the monomer component a3 is different than both the monomer component a1 and the monomer component a2.

Embodiment 54

The method of embodiment 53, wherein the monomer component a3 comprises: i. an acidic monomer having an acidic group and an ethylenically unsaturated group, ii. a hydroxy-containing acrylic ester monomer having a hydroxyl group and an ethylenically unsaturated group, iii. a nitrogen-containing monomer having a primary, secondary or a tertiary amino group or an N, N-dialkylaminoalkyl (meth)acrylate and a ethylenically unsaturated group, iv. a vinyl monomer, or v. a combination thereof.

Embodiment 55

The method of any one of embodiments 41 and 48, wherein the (meth)acrylic based polymeric component B further comprises at least about 0.1 wt. % and not greater than about 60 wt. % of a monomer component b3 for a total weight of the (meth)acrylic based polymeric component A, wherein the monomer component b3 is an ethylenically unsaturated monomer and wherein the monomer component b3 is different than both the monomer component b1 and the monomer component b2.

Embodiment 56

The adhesive composition of embodiment 55, wherein the monomer component b3 comprises: i. a hydroxy-containing acrylic ester monomer having a hydroxyl group and an ethylenically unsaturated group, ii. a nitrogen-containing monomer having a primary, secondary or a tertiary amino group or an N, N-dialkylaminoalkyl (meth)acrylate and a ethylenically unsaturated group, iii. a vinyl monomer, or iv. a combination thereof.

Embodiment 57

A monolayer foam tape comprising: a foam core comprising hollow microspheres within an adhesive composition, wherein the adhesive composition comprises: at least about 2 wt. % and not greater than 49 wt. % of a (meth) acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B is acid-free.

Embodiment 58

A monolayer foam tape comprising: a foam core comprising hollow microspheres within an adhesive composition, wherein the adhesive composition comprises: at least about 2 wt. % and not greater than 49 wt. % of a (meth) acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 59

A monolayer foam tape comprising: a foam core comprising hollow microspheres within an adhesive composition, wherein the adhesive composition comprises: at least about 2 wt. % and not greater than 49 wt. % of a (meth) acrylic based polymeric component A for a total weight of the adhesive composition; at least about 51 wt. % of a (meth)acrylic based polymeric component B for a total weight of the adhesive composition; and at least about 0.1 wt. % and not greater than about 30 wt. % of a tackifier component for a total weight of the adhesive composition, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate, and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 60

The monolayer foam tape of any one of embodiments 57, 58 and 59, wherein the monolayer foam tape has a thickness of at least about 0.125 mm.

Embodiment 61

The monolayer foam tape of any one of embodiments 57, 58 and 59, wherein the monolayer foam tape has a thickness of not greater than about 0.25 mm.

Embodiment 62

The monolayer foam tape of any one of embodiments 57, 58 and 59, wherein the hollow microspheres comprise glass beads, polymeric microspheres or a combination thereof.

Embodiment 63

The monolayer foam tape of any one of embodiments 58 and 59, wherein the (meth)acrylic based polymeric component B is acid-free.

Embodiment 64

The monolayer foam tape of any one of embodiments 57, 58 and 59, wherein the total wt. % of acidic monomers in the (meth)acrylic based polymeric component A is less than 10%.

Embodiment 65

The monolayer foam tape of any one of embodiments 57, 58 and 59, wherein the (meth)acrylic based polymeric component A has a molecular weight of at least about 5,000 g/mol.

Embodiment 66

The monolayer foam tape of embodiment 59, wherein the (meth)acrylic based polymeric component A has a glass transition temperature (Tg) of at least about 40° C.

Embodiment 67

The monolayer foam tape of embodiment 59, wherein the (meth)acrylic based polymeric component B has a glass transition temperature (Tg) of not greater than about 20° C.

Embodiment 68

The monolayer foam tape of any one of embodiments 57 and 58, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate.

Embodiment 69

The monolayer foam tape of any one of embodiments 57, 58 and 59, wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 70

The monolayer foam tape of any one of embodiments 59 and 68, wherein the monomer component a2 is an ethylenically unsaturated functional monomer selected from the group consisting of hydroxyl containing (meth)acrylic ester or acrylamide.

Embodiment 71

The monolayer foam tape of any one of embodiments 59 and 68, wherein the monomer component a2 is N-hydroxyalkyl (meth)acrylamide.

Embodiment 72

The monolayer foam tape of embodiment 71, wherein the N-hydroxyalkyl(meth)acrylamide has a hydroxylalkyl group having 1 to 8 carbon atoms.

Embodiment 73

The monolayer foam tape of embodiment 72, wherein the hydroxylalkyl group is represented by the following formula: CH2=C(R1)CONHR2, where R1 represents a hydrogen atom or methyl group, and R2 represents an alkyl group having 1 to 8 carbon atoms and at least one hydroxyl group.

Embodiment 74

The monolayer foam tape of any one of embodiments 59 and 68, wherein the (meth)acrylic based polymeric component A further comprises at least about 0.1 wt. % and not greater than about 60 wt. % of a monomer component a3 for a total weight of the (meth)acrylic based polymeric component A, wherein the monomer component a3 is an ethylenically unsaturated monomer and wherein the monomer component a3 is different than both the monomer component a1 and the monomer component a2.

Embodiment 75

The monolayer foam tape of embodiment 74, wherein the monomer component a3 comprises: i. an acidic monomer having an acidic group and an ethylenically unsaturated group, ii. a hydroxy-containing acrylic ester monomer having a hydroxyl group and an ethylenically unsaturated group, iii. a nitrogen-containing monomer having a primary, secondary or a tertiary amino group or an N, N-dialkylaminoalkyl (meth)acrylate and a ethylenically unsaturated group, iv. a vinyl monomer, or v. a combination thereof.

Embodiment 76

The monolayer foam tape of any one of embodiments 59 and 69, wherein the (meth)acrylic based polymeric component B further comprises at least about 0.1 wt. % and not greater than about 60 wt. % of a monomer component b3 for a total weight of the (meth)acrylic based polymeric component A, wherein the monomer component b3 is an ethylenically unsaturated monomer and wherein the monomer component b3 is different than both the monomer component b1 and the monomer component b2.

Embodiment 77

The monolayer foam tape of embodiment 76, wherein the monomer component b3 comprises: i. a hydroxy-containing acrylic ester monomer having a hydroxyl group and an ethylenically unsaturated group, ii. a nitrogen-containing monomer having a primary, secondary or a tertiary amino group or an N, N-dialkylaminoalkyl (meth)acrylate and a ethylenically unsaturated group, iii. a vinyl monomer, or iv. a combination thereof.

Embodiment 78

The monolayer foam tape of any one of embodiments 57, 58 and 59, wherein the tackifier component comprises C5, C9, C5/C9, dicyclopentadiene, terpene, or their hydrogenated resins, or combinations thereof.

Embodiment 79

A foam tape comprising: a foam core comprising hollow microspheres within a foam material, and a first adhesive layer overlying a first surface of the foam core, wherein the first adhesive layer comprises a first adhesive composition comprising: at least about 2 wt. % and not greater than 49 wt. % of a (meth)acrylic based polymeric component A for a total weight of the first adhesive composition; at least about 51 wt. % of a (meth)acrylic based polymeric component B for a total weight of the first adhesive composition; and at least about 0.1 wt. % and not greater than about 30 wt. % of a tackifier component for a total weight of the first adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B is acid-free.

Embodiment 80

A foam tape comprising: a foam core comprising hollow microspheres within a foam material, and a first adhesive layer overlying a first surface of the foam core, wherein the first adhesive layer comprises a first adhesive composition comprising: at least about 2 wt. % and not greater than 49 wt. % of a (meth)acrylic based polymeric component A for a total weight of the first adhesive composition; at least about 51 wt. % of a (meth)acrylic based polymeric component B for a total weight of the first adhesive composition; and at least about 0.1 wt. % and not greater than about 30 wt. % of a tackifier component for a total weight of the first adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 81

A foam tape comprising: a foam core comprising hollow microspheres within a foam material, and a first adhesive layer overlying a first surface of the foam core, wherein the first adhesive layer comprises a first adhesive composition comprising: at least about 2 wt. % and not greater than 49 wt. % of a (meth)acrylic based polymeric component A for a total weight of the first adhesive composition; at least about 51 wt. % of a (meth)acrylic based polymeric component B for a total weight of the first adhesive composition; and at least about 0.1 wt. % and not greater than about 30 wt. % of a tackifier component for a total weight of the first adhesive composition, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate, and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 82

The foam tape of any one of embodiments 79, 80 and 81, wherein the first adhesive layer has a thickness of at least about 0.125 mm.

Embodiment 83

The foam tape of any one of embodiments 79, 80 and 81, wherein the first adhesive layer has a thickness of not greater than about 0.25 mm.

Embodiment 84

The foam tape of any one of embodiments 79, 80 and 81, wherein the foam material comprises an acrylic material, a polyurethane material, a polyethylene material, a PVC material or combinations thereof.

Embodiment 85

The foam tape of any one of embodiments 79, 80 and 81, wherein the foam material comprises an acrylic foam or a polyurethane foam.

Embodiment 86

The foam tape of any one of embodiments 79, 80 and 81, wherein the hollow spheres comprise glass beads, polymeric microspheres or a combination thereof.

Embodiment 87

The foam tape of any one of embodiments 80 and 81, wherein the (meth)acrylic based polymeric component B is acid-free.

Embodiment 88

The foam tape of any one of embodiments 79, 80 and 81, wherein the total wt. % of acidic monomers in the (meth) acrylic based polymeric component A is less than 10%.

Embodiment 89

The foam tape of any one of embodiments 79, 80 and 81, wherein the (meth)acrylic based polymeric component A has a molecular weight of at least about 5,000 g/mol.

Embodiment 90

The foam tape of embodiment 81, wherein the (meth) acrylic based polymeric component A has a glass transition temperature (Tg) of at least about 40° C.

Embodiment 91

The foam tape of embodiment 81, wherein the (meth) acrylic based polymeric component B has a glass transition temperature (Tg) of not greater than about 20° C.

Embodiment 92

The foam tape of any one of embodiments 79 and 80, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate.

Embodiment 93

The foam tape of any one of embodiments 79, 80 and 81, wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 94

The foam tape of any one of embodiments 81 and 92, wherein the monomer component a2 is an ethylenically unsaturated functional monomer selected from the group consisting of hydroxyl containing (meth)acrylic ester or acrylamide.

Embodiment 95

The foam tape of any one of embodiments 81 and 92, wherein the monomer component a2 is N-hydroxyalkyl (meth)acrylamide.

Embodiment 96

The foam tape of embodiment 95, wherein the N-hydroxyalkyl(meth)acrylamide has a hydroxylalkyl group having 1 to 8 carbon atoms.

Embodiment 97

The foam tape of embodiment 96, wherein the hydroxylalkyl group is represented by the following formula: $CH2=C(R1)CONHR2$, where R1 represents a hydrogen atom or methyl group, and R2 represents an alkyl group having 1 to 8 carbon atoms and at least one hydroxyl group.

Embodiment 98

The foam tape of any one of embodiments 81 and 92, wherein the (meth)acrylic based polymeric component A further comprises at least about 0.1 wt. % and not greater than about 60 wt. % of a monomer component a3 for a total weight of the (meth)acrylic based polymeric component A, wherein the monomer component a3 is an ethylenically unsaturated monomer and wherein the monomer component a3 is different than both the monomer component a1 and the monomer component a2.

Embodiment 99

The foam tape of embodiment 98, wherein the monomer component a3 comprises: i. an acidic monomer having an acidic group and an ethylenically unsaturated group, ii. a hydroxy-containing acrylic ester monomer having a hydroxyl group and an ethylenically unsaturated group, iii. a nitrogen-containing monomer having a primary, secondary or a tertiary amino group or an N, N-dialkylaminoalkyl (meth)acrylate and a ethylenically unsaturated group, iv. a vinyl monomer, or v. a combination thereof.

Embodiment 100

The foam tape of any one of embodiments 81 and 93, wherein the (meth)acrylic based polymeric component B further comprises at least about 0.1 wt. % and not greater than about 60 wt. % of a monomer component b3 for a total weight of the (meth)acrylic based polymeric component A, wherein the monomer component b3 is an ethylenically unsaturated monomer and wherein the monomer component b3 is different than both the monomer component b1 and the monomer component b2.

Embodiment 101

The foam tape of embodiment 100, wherein the monomer component b3 comprises: i. a hydroxy-containing acrylic ester monomer having a hydroxyl group and an ethylenically unsaturated group, ii. a nitrogen-containing monomer having a primary, secondary or a tertiary amino group or an N, N-dialkylaminoalkyl (meth)acrylate and a ethylenically unsaturated group, iii. a vinyl monomer, or iv. a combination thereof.

Embodiment 102

The foam tape of any one of embodiments 79, 80 and 81, wherein the tackifier component comprises C5, C9, C5/C9, dicyclopentadiene, terpene, or their hydrogenated resins, or combinations thereof.

Embodiment 103

The foam tape of any one of embodiments 79, 80 and 81, wherein the foam tape further comprises a second adhesive layer overlying a second surface of the foam core, wherein the second adhesive layer comprises a second adhesive composition.

Embodiment 104

The foam tape of embodiment 103, wherein the second adhesive composition comprising: at least about 2 wt. % and not greater than 49 wt. % of a (meth)acrylic based polymeric component A for a total weight of the second adhesive composition; at least about 51 wt. % of a (meth)acrylic based polymeric component B for a total weight of the second adhesive composition; and at least about 0.1 wt. % and not greater than about 30 wt. % of a tackifier component for a total weight of the second adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B is acid-free.

Embodiment 105

The foam tape of embodiment 103, wherein the second adhesive composition comprising: at least about 2 wt. % and not greater than 49 wt. % of a (meth)acrylic based polymeric component A for a total weight of the second adhesive composition; at least about 51 wt. % of a (meth)acrylic based polymeric component B for a total weight of the second adhesive composition; and at least about 0.1 wt. % and not greater than about 30 wt. % of a tackifier component for a total weight of the second adhesive composition, wherein the (meth)acrylic based polymeric component A has a glass transition temperature (Tg) of at least about 40° C., wherein the (meth)acrylic based polymeric component B has a glass transition temperature (Tg) of not greater than about 20° C., and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 106

The foam tape of embodiment 103, wherein the second adhesive composition comprising: at least about 2 wt. % and not greater than 49 wt. % of a (meth)acrylic based polymeric component A for a total weight of the second adhesive composition; at least about 51 wt. % of a (meth)acrylic based polymeric component B for a total weight of the second adhesive composition; and at least about 0.1 wt. % and not greater than about 30 wt. % of a tackifier component for a total weight of the second adhesive composition, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate, and wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 107

The foam tape of any one of embodiments 105 and 106, wherein the (meth)acrylic based polymeric component B is acid-free.

Embodiment 108

The foam tape of any one of embodiments 104, 105 and 106, wherein the total wt. % of acidic monomers in the (meth)acrylic based polymeric component A is less than 10%.

Embodiment 109

The foam tape of any one of embodiments 104, 105 and 106, wherein the (meth)acrylic based polymeric component A has a molecular weight of at least about 5,000 g/mol.

Embodiment 110

The foam tape of embodiment 106, wherein the (meth)acrylic based polymeric component A has a glass transition temperature (Tg) of at least about 40° C.

Embodiment 111

The foam tape of embodiment 106, wherein the (meth)acrylic based polymeric component B has a glass transition temperature (Tg) of not greater than about 20° C.

Embodiment 112

The foam tape of any one of embodiments 104 and 105, wherein the (meth)acrylic based polymeric component A comprises a reaction product of polymerizable material comprising: at least about 40 wt. % and not greater than about 99 wt. % of a monomer component a1 for a total weight of the (meth)acrylic based polymeric component A, wherein the monomer component a1 is an ethylenically unsaturated monomer, and at least about 0.1 wt. % and not greater than about 20 wt. % of a monomer component a2 for a totally weight of the (meth)acrylic based polymeric component A, wherein the monomer component a2 is an ethylenically unsaturated functional monomer selected from the group consisting of an acidic monomer, a hydroxyl containing (meth)acrylic monomer and a nitrogen-containing monomer having a primary, secondary or tertiary amino group or an N,N-dialkylaminoalkyl (meth)acrylate.

Embodiment 113

The foam tape of any one of embodiments 104, 105 and 106, wherein the (meth)acrylic based polymeric component B comprises a reaction product of polymerizable material comprising: at least about 40 wt. % and not greater than about 99 wt. % of a monomer component b1 for a total weight of the (meth)acrylic based polymeric component B, wherein the monomer component b1 is a C1-C24 acrylic ester, and at least about 1 wt. % and not greater than about 60 wt. % of a monomer component b2 for a totally weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate.

Embodiment 114

The foam tape of embodiment 112, wherein the monomer component a2 is an ethylenically unsaturated functional monomer selected from the group consisting of hydroxyl containing (meth)acrylic ester or acrylamide.

Embodiment 115

The foam tape of embodiment 112, wherein the monomer component a2 is N-hydroxyalkyl (meth)acrylamide.

Embodiment 116

The foam tape of embodiment 115, wherein the N-hydroxyalkyl(meth)acrylamide has a hydroxylalkyl group having 1 to 8 carbon atoms.

Embodiment 117

The foam tape of embodiment 116, wherein the hydroxylalkyl group is represented by the following formula: CH2=C(R1)CONHR2, where R1 represents a hydrogen atom or methyl group, and R2 represents an alkyl group having 1 to 8 carbon atoms and at least one hydroxyl group.

Embodiment 118

The foam tape of embodiment 112, wherein the (meth)acrylic based polymeric component A further comprises at least about 0.1 wt. % and not greater than about 60 wt. % of a monomer component a3 for a total weight of the (meth)acrylic based polymeric component A, wherein the monomer component a3 is an ethylenically unsaturated monomer and wherein the monomer component a3 is different than both the monomer component a1 and the monomer component a2.

Embodiment 119

The foam tape of embodiment 98, wherein the monomer component a3 comprises: i. an acidic monomer having an acidic group and an ethylenically unsaturated group, ii. a hydroxy-containing acrylic ester monomer having a hydroxyl group and an ethylenically unsaturated group, iii. a nitrogen-containing monomer having a primary, secondary or a tertiary amino group or an N, N-dialkylaminoalkyl (meth)acrylate and a ethylenically unsaturated group, iv. a vinyl monomer, or v. a combination thereof.

Embodiment 120

The foam tape of embodiment 113, wherein the (meth)acrylic based polymeric component B further comprises at least about 0.1 wt. % and not greater than about 60 wt. % of a monomer component b3 for a total weight of the (meth)acrylic based polymeric component A, wherein the monomer component b3 is an ethylenically unsaturated monomer and wherein the monomer component b3 is different than both the monomer component b1 and the monomer component b2.

Embodiment 121

The foam tape of embodiment 120, wherein the monomer component b3 comprises: i. a hydroxy-containing acrylic ester monomer having a hydroxyl group and an ethylenically unsaturated group, ii. a nitrogen-containing monomer having a primary, secondary or a tertiary amino group or an N, N-dialkylaminoalkyl (meth)acrylate and a ethylenically unsaturated group, iii. a vinyl monomer, or iv. a combination thereof.

Embodiment 122

The foam tape of any one of embodiments 104, 105 and 106, wherein the tackifier component comprises C5, C9, C5/C9, dicyclopentadiene, terpene, or their hydrogenated resins, or combinations thereof.

EXAMPLES

The concepts described herein will be further described in the following Examples, which do not limit the scope of the invention described in the claims.
Testing Methods
The following test methods have been used to evaluate adhesives of the invention. All percentages, parts and ratios within the specification, including the examples, and the claims are by weight unless specifically stated otherwise.

Test Method A1: A strip of anodized aluminum (measured 19 mm xx 200 mm×0.125 mm) is positioned on the non-testing adhesive face of a tape sample measured at 10 mm width and at least 100 mm. Pressure is applied to the aluminum by rolling with a 6.8 kg roller. The opposite face (testing side) of the sample is then firmly bonded to either a polypropylene or polypropylene-ethylene propylene diene terpolymer panel pre-cleaned with either heptane or isopropyl alcohol. After conditioned for 24 hours at room temperature and 50% relative humidity, the sample is removed by pulling the aluminum strip at 90° to the adhesive surface at a speed of 30.5 cm/minute. The test value is reported by the force needed to remove the tape from the plastic panel or split the tape. Foam split (FS) is the most desirable failure mode as it indicates adhesion to the substrate is stronger than the internal strength of the foam layer.

Test Method A2: The tape sample is supported on a 2 mil PET film rather than on a strip of anodized aluminum. Everything else remains the same as Test Method A1.

Test Method B1: The non-testing adhesive face of a 2.54 cm×2.54 cm piece of foam tape is positioned onto the center along the long edge of a 7.62 cm×5.08 cm aluminum panel and rolled by a 6.8 Kg weight. The other side (testing side) of the foam tape is applied onto a 7.62 cm×5.08 cm polypropylene or polypropylene-ethylene propylene diene terpolymer panel pre-cleaned with either heptane or isopropyl alcohol and rolled again. After conditioned for 24 hours at room temperature and 50% relative humidity, the assembly is hung at 2 degrees from the vertical for 15 minutes in an air-circulating oven, which has been pre-heated to 70° C., and immediately attached with a 500-gram weight through a pre-drilled hole on the plastic panel. The time at which the weight falls off is recorded in hours. If no failure occurs after 10,000 minutes, the test is discontinued.

Test Method B2: The test conditions are the same except that the oven has been pre-heated to 80° C. instead.

Test Method C: The test conditions are similar to Test Methods A2, except that after conditioned for 24 hours at room temperature and 50% relative humidity the assembly is left inside a 80° C. air-circulating oven for 72 hours. The assembly is then removed from the oven, cooled at room temperature and 50% relative humidity the assembly for 1 hour, and tested.

Test Method D: The average molecular weight M and the polydispersity PDI of the samples are determined in the eluent THF.

Raw Materials: All chemicals were used as received without further purification or treatment.

| Raw materials | Manufacturer |
| --- | --- |
| 2-EHA, 2-ethylhexyl acrylate | Acros Organics |
| AA, acrylic acid | Acros Organics |
| HEAA, 2-hydroxyethyl acrylamide | Sigma-Aldrich |
| NVC, N-vinylcaprolactam | Sigma-Aldrich |
| IBOA, isobornyl acrylate | Sigma-Aldrich |
| 2-HEA, 2-hydroxyethyl acrylate | Sigma-Aldrich |
| BDK, benzil dimethyl ketal | BASF |
| IOTG, isooctyl thioglycolate | Sigma-Aldrich |
| HDDA, 1,6-hexanediol-diacrylate | Sigma-Aldrich |
| Regalrez 1085 | Hydrogenated hydrocarbon tackifier, Eastman Chemical |
| Regalrez 1094 | Hydrogenated hydrocarbon tackifier, Eastman Chemical |
| Regalrez 1126 | Hydrogenated hydrocarbon tackifier, Eastman Chemical |
| Regalite R1125 | Hydrogenated hydrocarbon tackifier, Eastman Chemical |
| Arkon P125 | Hydrogenated hydrocarbon tackifier, Arakawa Chemical |

The adhesive is coated and cured either on a 50 micron PET film, or on a 0.9 mm proprietary acrylic foam core made from around 10% wt of acrylic acid, 90% wt of 2-ethylhexyl acrylate, microspheres and other commonly materials.

Example 1: Samples S1-S4

Sample adhesive compositions S1-S4 were formed according to embodiments described herein. The compositions of the sample adhesive composition S1-S4 are summarized in Table 1 below.

TABLE 1

Adhesive Compositions S1-S4

| | pph in final syrup | | S1 | S2 | S3 | S4 |
|---|---|---|---|---|---|---|
| | | | All syrups | | | |
| | | | Parts in component A and B | | | |
| Component A | 10.7 | HEAA | 2.00 | 2.00 | 2.00 | |
| | | 2-HEA | 1.00 | 1.00 | 1.00 | |
| | | AA | | | | 3.00 |
| | | IBOA | 98.00 | 98.00 | 98.00 | 97.00 |
| Component B | 79.0 | HEAA | 1.00 | 0.50 | 1.00 | 1.00 |
| | | 2-HEA | 4.00 | 2.00 | 4.00 | 4.00 |
| | | 2-EHA | 95.00 | 97.50 | 95.00 | 95.00 |
| Tackifier | 10.0/7.5 | | Regalrez 1094 (10) | Arkon P-125 (7.5) | Regalrez 1126 (10) | Regalrez 1094 (10) |
| IBOA | 10.0 | | | | | |
| BDK | 0.16 | | | | | |
| HDDA | 0.15 | | | | | |

For sample adhesive composition S1, Component A was made by co-polymerizing a mixture of 40 grams of 2.00 pph of HEAA, 1.00 pph of 2-HEA, 98.00 pph of IBOA in the presence of 1.00 pph BDK and 1.00 pph IOTG in a 165×149 mm zip bag, which is immersed in room temperature water and exposed to 365 nm, 5 mW/cm$^2$ UV light for 8 minutes on both sides of the bag. The solids were grinded into fine powder before further use. Component B was made by co-polymerizing a mixture of 300 grams of 1.00 pph HEAA, 4.00 pph 2-HEA and 95.00 pph 2-EHA in the presence of 0.008 pph BDK in a glass jar under 365 nm, 5 mW/cm$^2$ UV light. The mixture was flushed with nitrogen gas for 30 minutes prior to UV exposure, and after UV exposure the viscosity was around 5000 cP. Component A, Component B, tackifier, IBOA, BDK and HDDA in the amounts as indicated in Table 1 were mixed and stirred at 300 RPM for 1 hour to make syrup S1. The syrup was coated between two bars onto the aforementioned 0.9 mm acrylic foam core or onto a 50 micron PET film, and cured under 365 nm, 5 mW/cm$^2$ UV light for 8 minutes to form an adhesive coating with an approximate thickness of 100 microns.

For sample adhesive compositions S2, S3 and S4, Components A and B were made in the same way as sample adhesive composition S1, except that different species and ratio of raw materials were used as shown in Table 1.

Example 2: Comparative Samples C1 and C2

Comparative sample adhesive compositions C1 and C4 were formed for comparison to the sample compositions. The compositions of the comparative sample adhesive compositions C1 and C2 are summarized in Table 2 below.

TABLE 2

Comparative Adhesive Compositions C1 and C2

| | C1 | C2 |
|---|---|---|
| AA | 10.00 | |
| HEAA | | 0.61 |
| 2-HEA | | 1.69 |
| IBOA | | 20.44 |
| 2-EHA | 90.00 | 77.26 |
| Arkon P-125 | | 7.5 |
| BDK | 0.16 | 0.16 |
| HDDA | 0.15 | 0.15 |

Comparative sample C1 was made by co-polymerizing a mixture of 300 grams of 10.00 pph AA and 90.00 pph 2-EHA in the presence of 0.008 pph BDK in a glass jar under 365 nm, 5 mW/cm$^2$ UV light. The mixture was flushed with nitrogen gas for 30 minutes prior to UV exposure, and after UV exposure the viscosity was around 5000 cP. BDK and HDDA in the amounts as indicated in Table 2 were added into the mixture and stirred at 300 RPM for 1 hour to make syrup C1. The syrup was coated between two bars onto the aforementioned 0.9 mm acrylic foam core, and cured under 365 nm, 5 mW/cm$^2$ UV light for 5 minutes to form an adhesive coating with an approximate thickness of 100 microns.

Comparative sample C2 was made by co-polymerizing a mixture of 300 grams of 0.61 pph HEAA, 1.69 pph 2-HEA, 20.44 pph IBOA and 77.26 pph 2-EHA in the presence of 0.008 pph BDK in a glass jar under 365 nm, 5 mW/cm$^2$ UV light. Arkon P-125, BDK and HDDA in the amounts as indicated in Table 2 were added into the mixture and processed in the same way as C1. Note that the overall composition of C2, as measured by the amount of each monomer, crosslinker and tackifier, is the same as sample S2.

The properties and performance of samples S1-S4 and comparative samples C1-C2 are summarized in Table 2 below. The abbreviation AD stands for adhesive failure and the abbreviation FS for foam split.

TABLE 3

Performance of Adhesive Compositions S1-S4

| | Test A1 | Test B1 | Test B2 | Test D |
|---|---|---|---|---|
| S1 | 42.0 N/cm, AD * | >168 hr * | >168 hr * | 41.7 kDa |
| S2 | 32.4 N/cm, AD * | >168 hr * | | 57.4 kDa |
| S3 | 29.4 N/cm, AD * | >154 hr | | 41.8 kDa |
| S4 | 40.7 N/cm, AD ** | | >168 hr ** | 38.6 kDa |
| C1 | 10.0 N/cm, AD * | 1.0 hr * | | |
| C2 | 12.6 N/cm, AD * | 0.4 hr * | | |

(* tested on 90% PP/10% EPDM, ** tested on PP)

The data clearly shows the adhesives of the present invention, with no acidity (S1 to S3) or very low acid levels (S4—0.3% overall acidic monomer use), have superior peel adhesion, as well as superior cohesion performance and temperature resistance as demonstrated in the static shear test at elevated temperature.

Example 3: Samples S5-S9

Sample adhesive compositions S5-S9 were formed according to embodiments described herein. The compositions of the sample adhesive composition S5-S9 are summarized in Table 4 below.

TABLE 4

Adhesive Compositions S5-S9

| | | | All syrups | | | | |
|---|---|---|---|---|---|---|---|
| | | | S5 | S6 | S7 | S8 | S9 |
| | pph in final syrup | | Parts in component A and B | | | | |
| Component A | 10.7 | HEAA | | 1.00 | 2.00 | | |
| | | 2-HEA | | | | 3.00 | |
| | | NVC | | 3.00 | 1.00 | | 6.00 |
| | | AA | 3.00 | | | | |
| | | IBOA | 97.00 | 96.00 | 98.00 | 97.00 | 94.00 |
| Component B | 79.0 | HEAA | 1.50 | 0.50 | 1.00 | 1.00 | 1.50 |
| | | 2-HEA | | | | 4.00 | |
| | | NVC | 3.00 | 2.50 | 3.00 | | 3.00 |
| | | 2-EHA | 95.50 | 97.00 | 96.00 | 95.00 | 95.50 |
| Tackifier | 10.0 | | Regalrez 1085 | Regalite R1125 (7.5 pph) | Regalrez 1094 | Regalrez 1094 | Regalrez 1094 |
| IBOA | 10.0 | | | | | | |
| BDK | 0.16 | | | | | | |
| HDDA | 0.15 | | | | | | |

Samples S5-S9 were made in the same way as sample S1, except that different species and ratio of raw materials were used as shown in Table 4.

The properties and performance of samples S5-S9 were summarized in Table 5 below. The abbreviation AD stands for adhesive failure and the abbreviation FS for foam split.

TABLE 5

Performance of Adhesive Compositions S5-S9

| | Test A1 | Test B1 | Test B2 | Test D |
|---|---|---|---|---|
| S5 | 16.7 N/cm, AD ** | >168 hr ** | | 38.6 kDa |
| S6 | 24.1 N/cm, AD ** | >168 hr ** | | 71.5 kDa |
| S7 | 27.5 N/cm, AD * | | 16 hr * | 34.7 kDa |
| S8 | 36.2 N/cm, AD * | | 3.9 hr * | 38.6 kDa |
| S9 | 26.8 N/cm, AD * | | 16 hr * | 71.0 kDa |

(* tested on 90% PP/10% EPDM, ** tested on PP)

By choosing the combination of Component A and Component B, the adhesives of the present invention may achieve different profiles of peel adhesion and shear cohesion.

Example 4: Samples S10-S13

Sample adhesive compositions S10-S13 were formed according to embodiments described herein. The compositions of the sample adhesive composition S10-S13 are summarized in Table 6 below.

TABLE 6

Adhesive Compositions S10-S13

| | | | All syrups | | | |
|---|---|---|---|---|---|---|
| | | | S10 | S11 | S12 | S13 |
| | pph in final syrup | | Parts in component A and B | | | |
| Component A | 10.7 | HEAA | 0.50 | 2.00 | 0.50 | 2.00 |
| | | 2-HEA | 2.50 | 1.00 | 2.50 | 1.00 |
| | | NVC | | | | |
| | | AA | | | | |
| | | IBOA | 97.00 | 98.00 | 97.00 | 98.00 |
| Component B | 79.0 | HEAA | 0.50 | 0.50 | 0.50 | 0.50 |
| | | 2-HEA | 2.00 | 2.00 | 2.00 | 2.00 |
| | | NVC | | | | |
| | | 2-EHA | 97.50 | 97.50 | 97.50 | 97.50 |
| Tackifier | 7.5 | | Arkon P-125 | Arkon P-125 | Regalrez 1126 | Regalrez 1126 |
| IBOA | 10.0 | | | | | |
| BDK | 0.16 | | | | | |
| HDDA | 0.15 | | | | | |

Samples S10-S13 were made in the same way as sample S1, except that different species and ratio of raw materials were used.

The properties and performance of Examples S2 and S10-S13 were summarized in Table 7.

TABLE 7

Performance of Adhesive Compositions S2 and S10-S13

| | Test A2 | Test C | % change of peel adhesion |
|---|---|---|---|
| S2 | 6.6 N/cm, AD * | 7.0 N/cm, AD * | +6% |
| S10 | 7.7 N/cm, AD * | 6.9 N/cm, AD * | −10% |

TABLE 7-continued

Performance of Adhesive Compositions S2 and S10-S13

|  | Test A2 | Test C | % change of peel adhesion |
| --- | --- | --- | --- |
| S11 | 8.2 N/cm, AD * | 8.7 N/cm, AD * | +6% |
| S12 | 8.2 N/cm, AD * | 7.1 N/cm, AD * | −13% |
| S13 | 8.2 N/cm, AD * | 9.4 N/cm, AD * | +15% |

(* tested on 90% PP/10% EPDM, ** tested on PP)

The data clearly shows the adhesives of the present invention have superior stability when exposed to high temperature over extended period.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An adhesive composition comprising:
   at least about 2 wt. % and not greater than 25 wt. % of a (meth)acrylic based polymeric component A for a total weight of the adhesive composition;
   at least about 73 wt. % of a (meth)acrylic based polymeric component B for a total weight of the adhesive composition; and
   at least about 0.1 wt. % and not greater than about 30 wt. % of a tackifier component for a total weight of the adhesive composition,
   wherein the (meth)acrylic based polymeric component A comprises a reaction product of polymerizable material comprising:
   at least about 40 wt. % and not greater than about 99 wt. % of a monomer component a1 for a total weight of the (meth)acrylic based polymeric component A, wherein the monomer component a1 is an ethylenically unsaturated monomer, and
   at least about 0.1 wt. % and not greater than about 20 wt. % of a monomer component a2 for a total weight of the (meth)acrylic based polymeric component A, and
   wherein the (meth)acrylic based polymeric component B comprises a reaction product of polymerizable material comprising:
   at least about 40 wt. % and not greater than about 99 wt. % of a monomer component b1 for a total weight of the (meth)acrylic based polymeric component B, wherein the monomer component b1 is a C1-C24 acrylic ester, and
   at least about 1 wt. % and not greater than about 60 wt. % of a monomer component b2 for a total weight of the (meth)acrylic based polymeric component B, wherein the monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate,
   wherein the (meth)acrylic based polymeric component A has a weight average molecular weight of at least about 30,000 g/mol and not greater than about 200,000 g/mol,
   wherein the (meth)acrylic based polymeric component B has a weight average molecular weight of at least about 100,000 g/mol, wherein the tackifier component comprises C5, C9, C5/C9, dicyclopentadiene, or their hydrogenated resins, or combinations thereof,
   wherein the monomer component a2 is N-hydroxyalkyl (meth) acrylamide.

2. The adhesive composition of claim 1, wherein the (meth)acrylic based polymeric component B is acid-free.

3. The adhesive composition of claim 1, wherein the (meth)acrylic based polymeric component A further comprises at least about 0.1 wt. % and not greater than about 60 wt. % of a monomer component a3 for a total weight of the (meth)acrylic based polymeric component A, wherein the monomer component a3 is an ethylenically unsaturated monomer and wherein the monomer component a3 is different than both the monomer component a1 and the monomer component a2.

4. The adhesive composition of claim 3, wherein the monomer component a3 comprises:
   i. an acidic monomer having an acidic group and an ethylenically unsaturated group,
   ii. a hydroxy-containing acrylic ester monomer having a hydroxyl group and an ethylenically unsaturated group,
   iii. a nitrogen-containing monomer having a primary, secondary or a tertiary amino group or an N, N-dialkylaminoalkyl (meth)acrylate and a ethylenically unsaturated group,
   iv. a vinyl monomer, or
   v. a combination thereof.

5. The adhesive composition of claim 1, wherein the (meth)acrylic based polymeric component B further comprises at least about 0.1 wt. % and not greater than about 60 wt. % of a monomer component b3 for a total weight of the (meth)acrylic based polymeric component A, wherein the monomer component b3 is an ethylenically unsaturated monomer and wherein the monomer component b3 is different than both the monomer component b1 and the monomer component b2.

6. The adhesive composition of claim 5, wherein the monomer component b3 comprises:
   i. a hydroxy-containing acrylic ester monomer having a hydroxyl group and an ethylenically unsaturated group,
   ii. a nitrogen-containing monomer having a primary, secondary or a tertiary amino group or an N, N-dialkylaminoalkyl (meth)acrylate and a ethylenically unsaturated group,
   iii. a vinyl monomer, or
   iv. a combination thereof.

7. A method of forming an adhesive composition, wherein the method comprises
   providing a pre-adhesive mixture comprising:
      a pre-adhesive (meth)acrylic based polymeric component A, wherein the pre-adhesive (meth)acrylic based polymeric component A is fully polymerized;
      a pre-adhesive (meth)acrylic based polymeric component B at a content of at least about 73 wt. % for a total weight of the pre-adhesive mixture, wherein the pre-adhesive (meth)acrylic based polymeric component B is unpolymerized; and
      a pre-adhesive tackifier component;
         mixing the pre-adhesive mixture; and
         polymerizing the pre-adhesive mixture to form the adhesive composition,
   wherein the (meth)acrylic based polymeric component A has a weight average molecular weight of at least about 30,000 g/mol and not greater than about 200,000 g/mol,
   wherein the (meth)acrylic based polymeric component B has a weight average molecular weight of at least about 100,000 g/mol, and
   wherein an overall level of acidic monomers in the adhesive composition is not greater than about 0% by weight of the adhesive composition, wherein the pre-adhesive mixture comprises:
      at least about 2 wt. % and not greater than 47 wt. % of a pre-adhesive (meth)acrylic based polymeric component A for a total weight of the pre-adhesive mixture;
   and
      at least about 0.1 wt. % and not greater than about 30 wt. % of a tackifier component for a total weight of the pre-adhesive mixture,
   wherein the pre-adhesive (meth)acrylic based polymeric component A comprises a reaction product of polymerizable material comprising:
      at least about 40 wt. % and not greater than about 99 wt. % of a pre-adhesive monomer component a1 for a total weight of the pre-adhesive (meth)acrylic based polymeric component A, wherein the pre-adhesive monomer component a1 is an ethylenically unsaturated monomer, and
      at least about 0.1 wt. % and not greater than about 20 wt. % of a pre-adhesive monomer component a2 for a totally weight of the pre-adhesive (meth)acrylic based polymeric component A,
   wherein the pre-adhesive (meth)acrylic based polymeric component B is acid-free and comprises a reaction product of polymerizable material comprising:
      at least about 40 wt. % and not greater than about 99 wt. % of a pre-adhesive monomer component b1 for a total weight of the pre-adhesive (meth)acrylic based polymeric component B, wherein the pre-adhesive monomer component b1 is a C1-C24 acrylic ester, and
      at least about 1 wt. % and not greater than about 60 wt. % of a pre-adhesive monomer component b2 for a totally weight of the pre-adhesive (meth)acrylic based polymeric component B, wherein the pre-adhesive monomer component b2 is an ethylenically unsaturated functional monomer selected from the group consisting of hydroxyl containing (meth)acrylic monomer and a nitrogen-containing monomer having a primary, secondary or tertiary amino group or an N,N-dialkylaminoalkyl (meth)acrylate, and
   wherein the tackifier component comprises C5, C9, C5/C9, dicyclopentadiene, or their hydrogenated resins, or combinations thereof, and
   wherein the monomer component a2 is N-hydroxyalkyl (meth) acrylamide.

8. The method of claim 7, wherein the pre-adhesive (meth)acrylic based polymeric component A has a glass transition temperature (Tg) of at least about 40° C.

9. The method of claim 7, wherein the pre-adhesive (meth)acrylic based polymeric component B has a glass transition temperature (Tg) of not greater than about 20° C.

* * * * *